United States Patent
Kubo et al.

(10) Patent No.: US 6,950,159 B2
(45) Date of Patent: Sep. 27, 2005

(54) TRANSFLECTIVE LCD DEVICE HAVING LESS DISTANCE BETWEEN TRANSMISSION REGION AND FIRST BUS LINE THAN TRANSMISSION REGION AND SECOND BUS LINE

(75) Inventors: Masumi Kubo, Ikoma (JP); Yozo Narutaki, Yamatokoriyama (JP); Shogo Fujioka, Tenri (JP); Yuko Maruyama, Hamamatsu (JP); Takayuki Shimada, Yamatokoriyama (JP); Youji Yoshimura, Nara (JP); Mikio Katayama, Ikoma (JP); Yutaka Ishii, Nara (JP); Shinya Yamakawa, Ikoma (JP); Atsushi Ban, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/922,020

(22) Filed: Aug. 20, 2004

(65) Prior Publication Data

US 2005/0018118 A1 Jan. 27, 2005

Related U.S. Application Data

(60) Division of application No. 09/927,547, filed on Aug. 13, 2001, now Pat. No. 6,819,379, which is a division of application No. 09/220,792, filed on Dec. 28, 1998, now Pat. No. 6,295,109, which is a continuation-in-part of application No. 09/122,756, filed on Jul. 27, 1998, now Pat. No. 6,195,140.

(30) Foreign Application Priority Data

| Dec. 26, 1997 | (JP) | 9-359047 |
| Mar. 5, 1998 | (JP) | 10-053123 |
| May 25, 1998 | (JP) | 10-142412 |
| Jul. 14, 1998 | (JP) | 10-198459 |
| Jul. 14, 1998 | (JP) | 10-198464 |
| Jul. 16, 1998 | (JP) | 10-201392 |
| Jul. 21, 1998 | (JP) | 10-204136 |

(51) Int. Cl.$^7$ .................................... G02F 1/1135
(52) U.S. Cl. ............................................ 349/114
(58) Field of Search ................... 349/113, 114, 349/42, 43; 257/59, 72

(56) References Cited

U.S. PATENT DOCUMENTS

| 3,748,018 A | 7/1973 | Borden, Jr. ........... 349/68 |
| 4,097,131 A | 6/1978 | Nishiyama ............. 349/113 |
| 4,398,805 A | 8/1983 | Cole .................... 349/68 |
| 4,492,432 A | 1/1985 | Kaufmann et al. ..... 349/131 |

(Continued)

FOREIGN PATENT DOCUMENTS

| JP | 49-21167 | 2/1974 |
| JP | 1 396 828 | 6/1975 |
| JP | 54-10773 | 8/1980 |

(Continued)

OTHER PUBLICATIONS

U.S. Appl. No. 09/927,547 filed Aug. 13, 2001.
English Translation of JP 63–62158 (1989).
English Translation of JP 54–10773 (1980).

(Continued)

Primary Examiner—Tarifur R. Chowdhury
(74) Attorney, Agent, or Firm—Nixon & Vanderhye P.C.

(57) ABSTRACT

A liquid crystal display device includes a first substrate; a second substrate; a liquid crystal layer interposed between the first substrate and the second substrate; a first polarizer provided on a surface of the first substrate which is on the opposite side to the liquid crystal layer; a second polarizer provided on a surface of the second substrate which is on the opposite side to the liquid crystal layer; a first phase compensation element provided between the first polarizer and the liquid crystal layer; and a second phase compensation element provided between the second polarizer and the liquid crystal layer. A plurality of pixel areas are provided for display. The first substrate includes at least one transmissive electrode, and the second substrate includes a reflective electrode region and a transmissive electrode region in correspondence with each of the plurality of pixel areas.

32 Claims, 36 Drawing Sheets

U.S. PATENT DOCUMENTS

| | | | |
|---|---|---|---|
| 5,220,444 A | 6/1993 | Mitsui et al. | 349/113 |
| 5,434,688 A | 7/1995 | Saitoh et al. | 349/86 |
| 5,499,120 A | 3/1996 | Hansen | 349/62 |
| 5,570,214 A | 10/1996 | Abileah et al. | 349/117 |
| 5,658,492 A | 8/1997 | Murashior et al. | 349/184 |
| 5,666,179 A | 9/1997 | Koma | 349/143 |
| 5,724,112 A | 3/1998 | Yoshida et al. | 349/117 |
| 5,743,980 A | 4/1998 | Hsieh et al. | 156/99 |
| 5,753,937 A | 5/1998 | Shimomaki et al. | 257/59 |
| 5,841,494 A | 11/1998 | Hall | 349/98 |
| 5,847,789 A | 12/1998 | Nakamura et al. | 349/99 |
| 5,859,681 A | 1/1999 | VanderPloeg et al. | 349/120 |
| 5,907,379 A | 5/1999 | Kim et al. | 349/141 |
| 5,973,760 A | 10/1999 | Dehmlow | 349/102 |
| 5,978,056 A | 11/1999 | Shintani et al. | 349/137 |
| 6,008,871 A | 12/1999 | Okumura | 349/113 |
| 6,061,110 A | 5/2000 | Hisatake et al. | 349/113 |
| 6,061,112 A | 5/2000 | Ukita et al. | 349/113 |
| 6,081,312 A | 6/2000 | Aminaka et al. | 349/118 |
| 6,195,140 B1 | 2/2001 | Kubo et al. | 349/44 |
| 6,215,538 B1 | 4/2001 | Narutaki et al. | 349/106 |
| 6,295,109 B1 | 9/2001 | Kubo et al. | 349/119 |
| 6,341,002 B1 | 1/2002 | Shimizu et al. | 349/119 |
| 6,452,654 B2 | 9/2002 | Kubo et al. | 349/114 |
| 6,707,519 B1 | 3/2004 | Okumura et al. | 349/114 |
| 6,791,640 B1 | 9/2004 | Okamoto et al. | 349/113 |
| 6,819,379 B2 | 11/2004 | Kubo et al. | 349/114 |
| 2001/0020991 A1 | 9/2001 | Kubo et al. | 349/113 |

FOREIGN PATENT DOCUMENTS

| | | |
|---|---|---|
| JP | 55-103583 | 8/1980 |
| JP | 57-56818 | 4/1982 |
| JP | 59-017530 | 1/1984 |
| JP | 63-62158 | 11/1989 |
| JP | 03-011514 | 1/1991 |
| JP | 03-245122 | 10/1991 |
| JP | 4-75022 A | 3/1992 |
| JP | 04-282613 | 10/1992 |
| JP | 0 538 796 | 4/1993 |
| JP | 05-100114 | 4/1993 |
| JP | 05-113561 | 5/1993 |
| JP | 06-027481 | 2/1994 |
| JP | 06-075237 | 3/1994 |
| JP | 06-337421 | 12/1994 |
| JP | 07-114020 | 5/1995 |
| JP | 07-134300 | 5/1995 |
| JP | 07-175126 | 7/1995 |
| JP | 07-218923 | 8/1995 |
| JP | 7-318929 A | 12/1995 |
| JP | 08-184846 | 7/1996 |
| JP | 08-292413 | 11/1996 |
| JP | 09-33945 | 2/1997 |
| JP | 09-033945 | 2/1997 |
| JP | 9-133930 A | 5/1997 |
| JP | 09-325373 | 12/1997 |
| JP | 11-281972 | 10/1999 |
| WO | WO 99/40480 | 8/1999 |

FIG. 3

| Polarizer 6 |
| Phase compensation element (λ/4 wave plate) 7 |
| Phase compensation element 11 |
| Substrate 1 |
| Transmissive electrode 4 |
| LC layer 5 |
| Reflective electrode region 3 (R) / Transmissive electrode region 8 (T) |
| Substrate 2 |
| Phase compensation element 12 |
| Phase compensation element (λ/4 wave plate) 10 |
| Polarizer 9 |

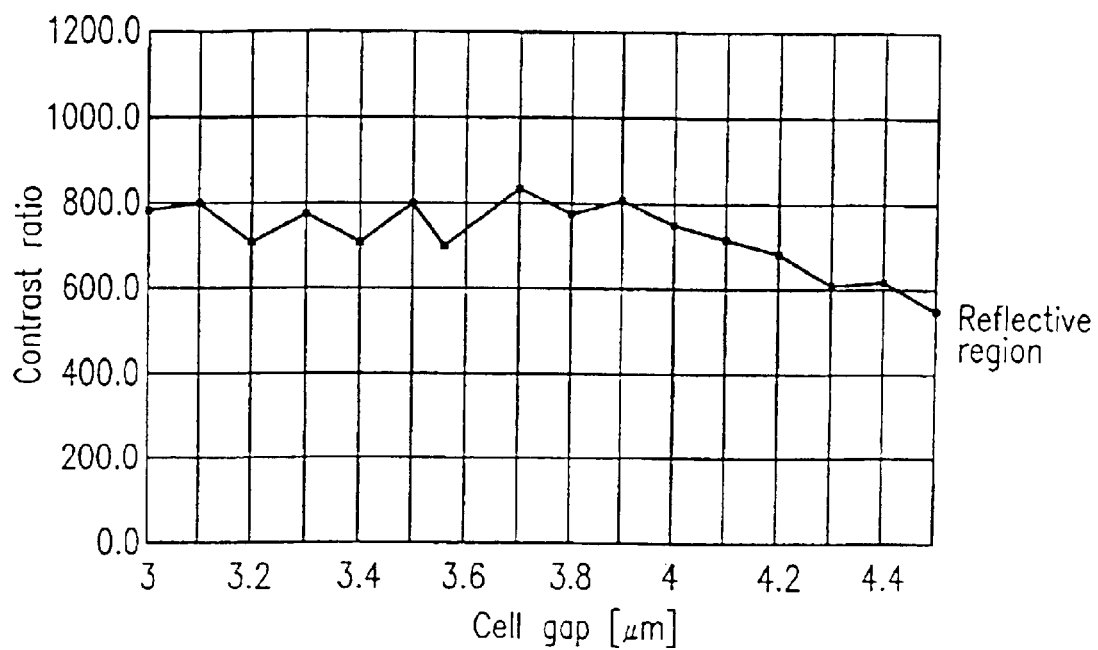

FIG. 17

| Polarizer 6 |
| Phase compensation element 11 |
| Phase compensation element ($\lambda/4$ wave plate) 7 |
| Substrate 1 |
| Transmissive electrode 4 |
| LC layer 5 |
| Reflective electrode region 3 (R) / Transmissive electrode region 8 (T) |
| Substrate 2 |
| Phase compensation element ($\lambda/4$ wave plate) 10 |
| Phase compensation element 12 |
| Polarizer 9 |

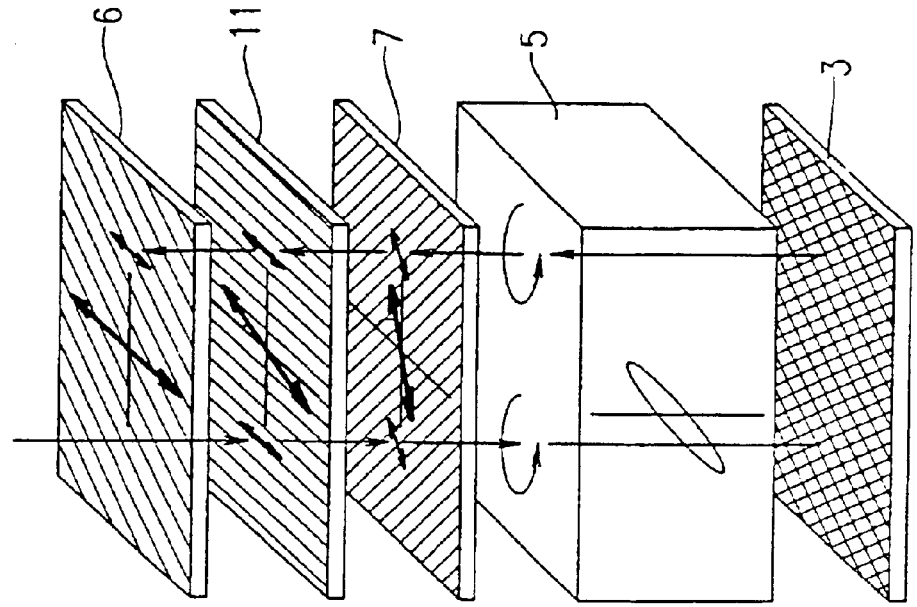
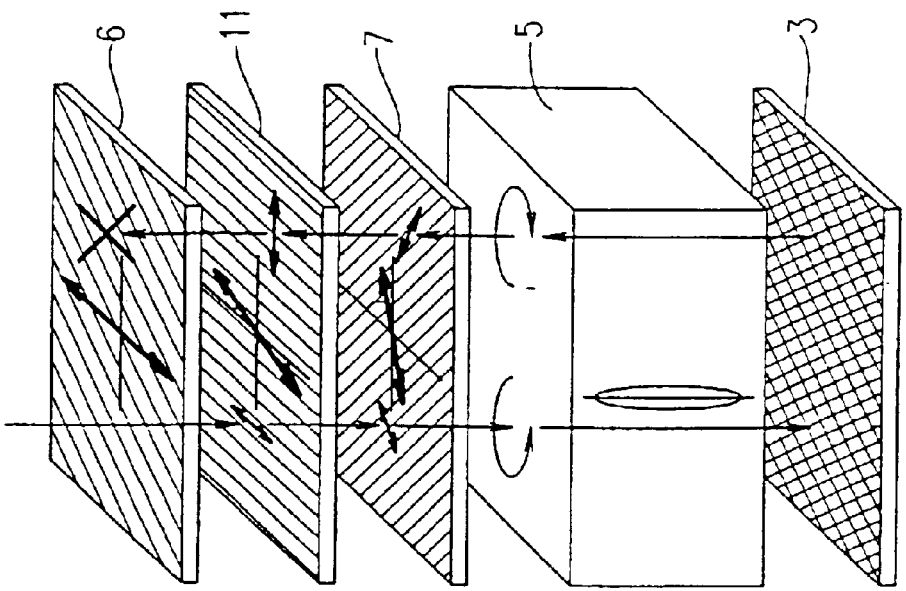

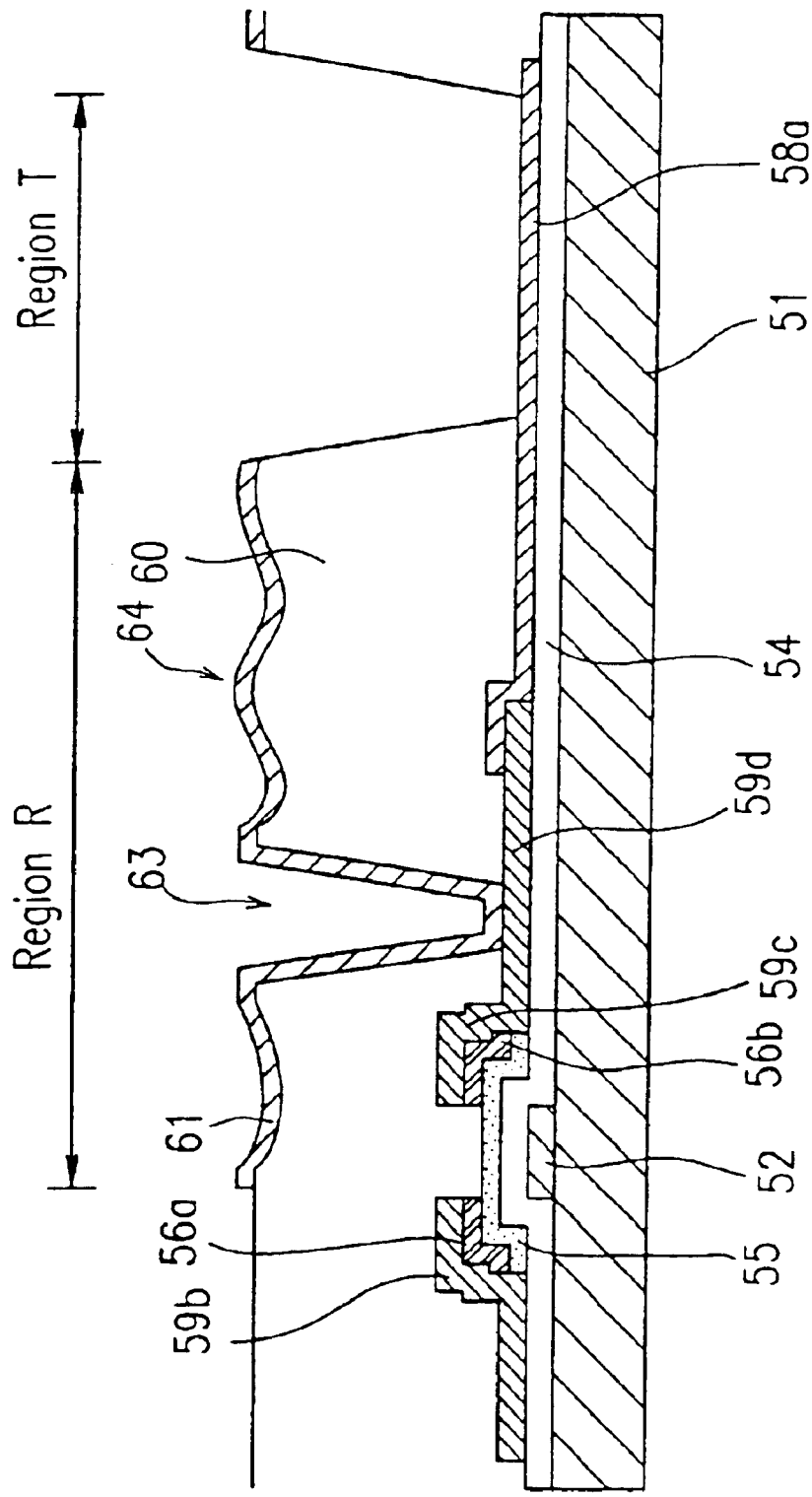

FIG.30
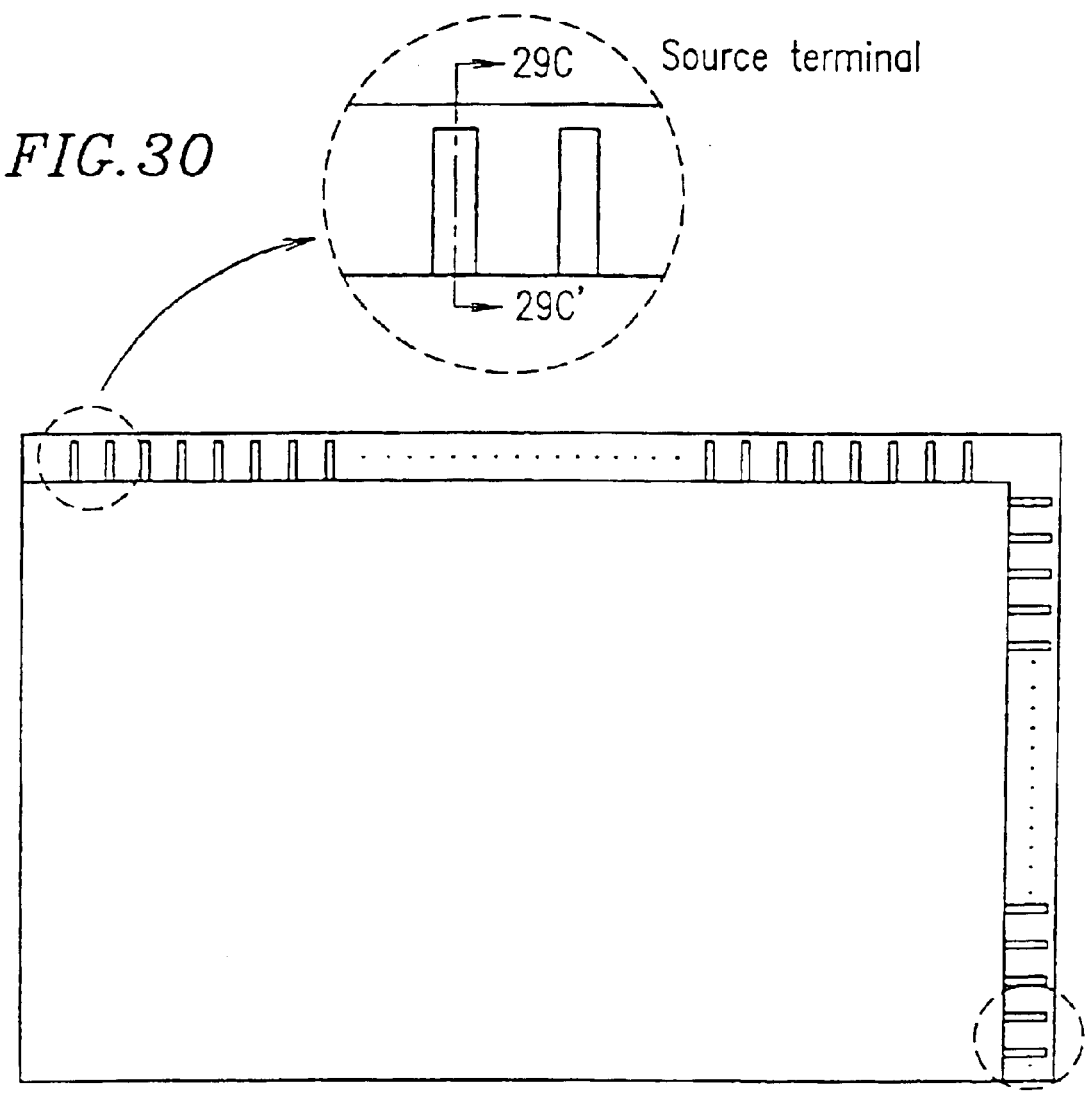
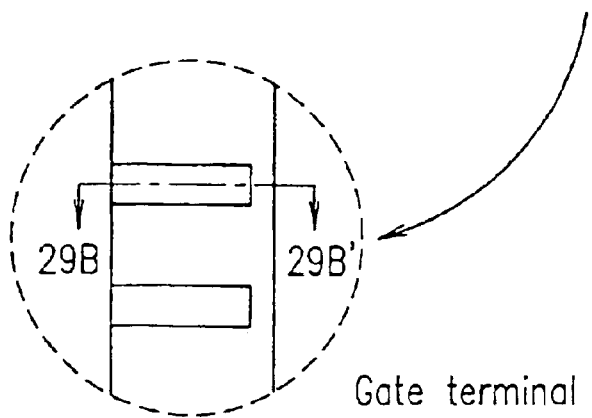

TRANSFLECTIVE LCD DEVICE HAVING LESS DISTANCE BETWEEN TRANSMISSION REGION AND FIRST BUS LINE THAN TRANSMISSION REGION AND SECOND BUS LINE

This application is a Continuation of Ser. No. 09/927,547, filed Aug. 13, 2001 now U.S. Pat. No. 6,819,379, which is a divisional of Ser. No. 09/220,792 filed Dec. 28, 1998, now U.S. Pat. No. 6,295,109, which is a continuation-in-part application of Ser. No. 09/122,756 filed on Jul. 27, 1998, now U.S. Pat. No. 6,195,140, the entire contents of which are hereby incorporated by reference in this application.

BACKGROUND OF THE INVENTION

1. Field of the Invention

The present invention relates to a reflective liquid crystal display device and a liquid crystal display device operable both in a reflection mode and a transmission mode, and which are used for office automation equipment such as wordprocessors and personal computers, mobile information devices such as hand-held computers, and VTRs integrated with a camera and having a liquid crystal monitor. The present invention also relates to a method for producing such liquid crystal display devices. In this specification, a liquid crystal display device will be referred to as an "LCD device". A liquid crystal display device operable both in a reflection mode and a transmission mode will be referred to as a "transmission- and reflection-type LCD device".

2. Description of the Related Art

LCD devices do not emit light themselves unlike CRTs (cathode ray tubes) and EL (electroluminescence) devices. Accordingly, transmissive LCD devices equipped with a backlight on a rear surface thereof are used.

The backlight usually consumes 50% or more of the total power consumption of the LCD device. Some mobile information devices which are often used outdoors or constantly carried by the user include a reflective LCD device which includes a reflective plate and performs display using only the ambient light.

Reflective LCD devices include TN (twisted nematic) mode devices and STN (super twisted nematic) mode devices which use a polarizer and are in a wide use as transmissive LCD devices today, as well as phase change (PC) guest-host mode devices which have been actively developed recently. The PC guest-host mode devices do not use a polarizer and thus realize brighter display. Such a device is disclosed in, for example, Japanese Laid-Open Publication No. 4-75022 corresponding to U.S. Pat. No. 5,220,444 and Japanese Laid-Open Publication No. 9-133930.

However, the PC guest-host mode LCD devices perform display using optical absorption by dyes in a liquid crystal layer including liquid crystal molecules and the dyes dispersed therein. Accordingly, the phase transition guest-host mode LCD devices provide significantly lower quality than the TN devices and the STN devices using a polarizer.

In LCD devices including the liquid crystal molecules aligned in parallel or in a twisted manner, the liquid crystal molecules at the center and in the vicinity of the liquid crystal layer tilt vertically to surfaces of substrates. However, the liquid crystal molecules in the vicinity of alignment layers do not tilt vertically to the surfaces of the substrates. Accordingly, the birefringence of the liquid crystal layer cannot be 0. Therefore, in the case where the LCD device operates in a display mode for performing black display when a voltage is applied, satisfactory black display is not performed due to the remaining birefringence. Thus, sufficient contrast ratio is not obtained.

The TN mode and STN mode devices do not provide sufficiently high quality display in terms of brightness and contrast. Accordingly, further improvement in the brightness and the contrast is demanded.

Reflective LCD devices are disadvantageous in that the intensity of the reflected light used for display is lowered when the ambient light is dark. By contrast, transmissive LCD devices are disadvantageous in that the visibility is lowered when the ambient light is very bright, for example, outdoors on a fine day.

SUMMARY OF THE INVENTION

According to one aspect of the invention, a liquid crystal display device includes a first substrate; a second substrate; a liquid crystal layer interposed between the first substrate and the second substrate; a first polarizer provided on a surface of the first substrate which is on the opposite side to the liquid crystal layer; a second polarizer provided on a surface of the second substrate which is on the opposite side to the liquid crystal layer; a first phase compensation element provided between the first polarizer and the liquid crystal layer; and a second phase compensation element provided between the second polarizer and the liquid crystal layer. A plurality of pixel areas are provided for display. The first substrate includes at least one transmissive electrode, and the second substrate includes a reflective electrode region and a transmissive electrode region in correspondence with each of the plurality of pixel areas.

In one embodiment of the invention, each of the plurality of pixel areas has a reflective region for performing display using reflected light and a transmissive region for performing display using transmitted light, and the reflective electrode region defines the reflective region and the transmissive electrode region defines the transmissive region.

In one embodiment of the invention, the liquid crystal layer has a retardation of zero when a molecular axis of liquid crystal molecules in the liquid crystal layer is substantially vertical with respect to the surface of the first and second substrates, and the first phase compensation element and the second phase compensation element each have a retardation which fulfills $\lambda/4$ condition.

In one embodiment of the invention, the liquid crystal layer has a retardation of $\alpha$ when a molecular axis of liquid crystal molecules in the liquid crystal layer is almost vertical with respect to the surface of the first and second substrates, and the first phase compensation element has a retardation which fulfills $\lambda/4-\alpha$ condition.

In one embodiment of the invention, the liquid crystal layer has a retardation of $\alpha$ when a molecular axis of liquid crystal molecules in the liquid crystal layer is almost vertical with respect to the surface of the first and second substrates, the first phase compensation element has a retardation which fulfills $\lambda/4-\alpha$ condition, and the second phase compensation element has a retardation which fulfills $\lambda/4-(\beta-\alpha)$ condition.

In one embodiment of the invention, the first phase compensation element and the second phase compensation element are each formed of a $\lambda/4$ wave plate, a transmission axis of the first polarizer and the first phase compensation element make an angle of about 45 degrees, and a transmission axis of the second polarizer and the second phase compensation element make an angle of about 45 degrees.

In one embodiment of the invention, the second phase compensation element is formed of a λ/4 wave plate, and a slower optic axis of the second phase compensation element matches one of a longer axis or a shorter axis of elliptically polarized light transmitted through the liquid crystal layer and incident on the second phase compensation element so as to convert the elliptically polarized light into linearly polarized light, and a transmission axis of the second polarizer is perpendicular to a polarizing axis of the linearly polarized light.

According to another aspect of the invention, a liquid crystal display device includes a first substrate including a transmissive electrode; a second substrate including a reflective electrode; a liquid crystal layer interposed between the first substrate and the second substrate and including liquid crystal molecules which exhibit negative dielectric anisotropy and are aligned substantially vertically to surfaces of the first substrate and the second substrate when no voltage is applied; a polarizer provided on a surface of the first substrate which is opposite to the liquid crystal layer; and a λ/4 wave plate provided between the polarizer and the liquid crystal layer. A slower axis of the λ/4 wave plate and a transmission axis of the polarizer make an angle of about 45 degrees.

In one embodiment of the invention, the liquid crystal display device further includes a phase compensation element between the reflection electrode and the polarizer.

According to still another aspect of the invention, a liquid crystal display device includes a first substrate; a second substrate; a liquid crystal layer interposed between the first substrate and the second substrate and including liquid crystal molecules which exhibit negative dielectric anisotropy and are aligned substantially vertically to surfaces of the first substrate and the second substrate when no voltage is applied; a first polarizer provided on a surface of the first substrate which is on the opposite side to the liquid crystal layer; a second polarizer provided on a surface of the second substrate which is on the opposite side to the liquid crystal layer; a first λ/4 wave plate provided between the first polarizer and the liquid crystal layer; and a second λ/4 wave plate provided between the second polarizer and the liquid crystal layer. A plurality of pixel areas are provided for display. The first substrate includes at least one transmissive electrode, and the second substrate includes a reflective electrode region and a transmissive electrode region in correspondence with each of the plurality of pixel areas. Slower axes of the first λ/4 wave plate and the second λ/4 wave plate are in an identical direction and make an angle of about 45 degrees with each of transmission axes of the first polarizer and the second polarizer.

In one embodiment of the invention, each of the plurality of pixel areas has a reflective region for performing display using reflected light and a transmissive region for performing display using transmitted light, and the reflective electrode region defines the reflective region and the transmissive electrode region defines the transmissive region.

In one embodiment of the invention, the liquid crystal display device further includes at least one phase compensation element between the first polarizer and the second polarizer.

In one embodiment of the invention, the liquid crystal layer further includes a chiral dopant.

In one embodiment of the invention, the liquid crystal layer has an approximately 90 degree twisted orientation.

In one embodiment of the invention, the first polarizer and the second polarizer have transmission axes perpendicular to each other, and the first phase compensation element and the second phase compensation element have slower axes perpendicular to each other.

In one embodiment of the invention, the first phase compensation element converts linearly polarized light from the first polarizer into circularly polarized light, and the second phase compensation element converts linearly polarized light from the second polarizer into circularly polarized light, the liquid crystal display device further including a third phase compensation element provided between the first polarizer and the liquid crystal layer for compensating for wavelength dependency of refractive index anisotropy of the first phase compensation element.

In one embodiment of the invention, the third phase compensation element is a λ/2 wave plate, and when a transmission axis of the first polarizer and a slower axis of the third phase compensation element make an angle of γ1, the transmission axis of the first polarizer and a slower axis of the first phase compensation element make an angle of 2γ1+45 degrees.

In one embodiment of the invention, the liquid crystal display device further includes a fourth phase compensation element provided between the second polarizer and the liquid crystal layer for compensating for wavelength dependency of refractive index anisotropy of the second phase compensation element.

In one embodiment of the invention, the fourth phase compensation element is a λ/2 wave plate, and when a transmission axis of the second polarizer and a slower axis of the fourth phase compensation element make an angle of γ2, the transmission axis of the second polarizer and a slower axis of the second phase compensation element make an angle of 2γ2+45 degrees.

In one embodiment of the invention, the transmission axis of the first polarizer is perpendicular to the transmission axis of the second polarizer, a slower axis of the first phase compensation element is perpendicular to the slower axis of the second phase compensation element, and a slower axis of the third phase compensation element is perpendicular to the slower axis of the fourth phase compensation element.

According to still another aspect of the invention, a liquid crystal display device includes a first substrate; a second substrate; and a liquid crystal layer interposed between the first substrate and the second substrate. A plurality of pixel areas are provided for display, each of the plurality of pixel areas having a reflective region for performing display using reflected light and a transmissive region for performing display using transmitted light. The first substrate includes a counter electrode in the vicinity of the liquid crystal layer. The second substrate includes, in the vicinity of the liquid crystal layer, a plurality of gate lines, a plurality of source lines perpendicular to the plurality of gate lines, a plurality of switching elements provided in the vicinity of intersections of the plurality of gate lines and the plurality of source lines, a first conductive layer having a high light transmission efficiency, and a second conductive layer having a high light reflection efficiency, the first conductive layer and the second conductive layer being connected to each of the switching elements, connected to each other, and being provided in each of the pixel areas.

In one embodiment of the invention, the liquid crystal display device further includes an insulating layer between the first conductive layer and the second conductive layer.

In one embodiment of the invention, the second substrate further includes a third conductive layer, and the first conductive layer and the second conductive layer are connected to each other through the third conductive layer.

In one embodiment of the invention, one of the first conductive layer, the second conductive layer and the third Conductive layer is formed of a material identical with one of materials forming the plurality of gate electrodes or the plurality of source electrodes.

In one embodiment of the invention, the insulating layer has a wave-like surface below the second conductive layer.

According to still another aspect of the invention, a method for producing a liquid crystal display device is provided. The liquid crystal display device includes a first substrate; a second substrate; and a liquid crystal layer interposed between the first substrate and the second substrate. A plurality of pixel areas are provided for display, each of the plurality of pixel areas having a reflective region for performing display using reflected light and a transmissive region for performing display using transmitted light. The first substrate includes a counter electrode in the vicinity of the liquid crystal layer. The second substrate includes, in the vicinity of the liquid crystal layer, a plurality of gate lines, a plurality of source lines perpendicular to the plurality of gate lines, a plurality of switching elements provided in the vicinity of intersections of the plurality of gate lines and the plurality of source lines, a first conductive layer having a high light transmission efficiency, a second conductive layer having a high light reflection efficiency, the first conductive layer and the second conductive layer being connected to each of the switching elements, connected to each other, and being provided in each of the pixel areas, and an insulating layer provided between the first conductive layer and the second conductive layer. The method includes the steps of forming the first conductive layer on a plate; forming the insulating layer at least on the first conductive layer; forming the second conductive layer on the insulating layer; and partially removing the second conductive layer formed on the first conductive layer.

In one embodiment of the invention, the method further includes the steps of forming a third conductive layer on a connection area, on at least the first conductive layer, for connecting the first conductive layer and the second conductive layer so as to connect the first conductive layer and the second conductive layer to each other through the third conductive layer; forming the insulating layer; and partially removing the insulating layer at least on the connection area for connecting the first conductive layer and the second conductive layer.

In one embodiment of the invention, the step of partially removing the insulating layer includes the step of removing the insulating layer on an area of the first conductive layer.

Thus, the invention described herein makes possible the advantages of providing a reflection-type LCD device and a transmission- and reflection-type LCD device providing satisfactory display with a sufficiently high contrast, and a method for producing the same.

These and other advantages of the present invention will become apparent to those skilled in the art upon reading and understanding the following detailed description with reference to the accompanying figures.

BRIEF DESCRIPTION OF THE DRAWINGS

FIG. 3 is a schematic view of a transmission- and reflection-type LCD device in an example according to the present invention;

FIG. 6 is a graph illustrating the relationship between the cell gap and the contrast ratio of a reflection-type LCD device according to the present invention obtained when the light is incident and received vertically at a wavelength of 550 nm;

FIG. 17 is a schematic view of a reflection-type LCD device in a fifth example according to the present invention;

FIG. 18A is a schematic view illustrating light transmission and reflection in black display in the reflection mode in the LCD device in the fifth example according to the present invention;

FIG. 18B is a schematic view illustrating light transmission and reflection in white display in the reflection mode in the LCD device in the fifth example according to the present invention;

FIG. 25 is a cross-sectional view of the LCD device taken along line 25–25' in FIG. 24;

FIG. 30 is a plan view of the active matrix substrate of the LCD device in the eleventh example;

DESCRIPTION OF THE PREFERRED EMBODIMENTS

Figure 1:
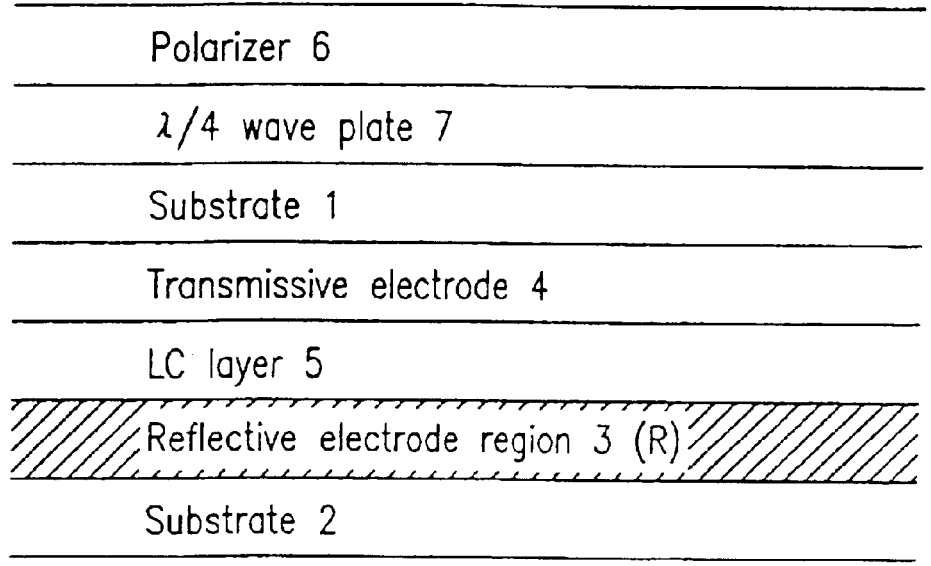
FIG. 1 is a schematic view of a reflection-type LCD device in an example according to the present invention.

The terms "reflective electrode region", "transmissive electrode region", "reflective region" and "transmissive region" will be described.

A reflection-type LCD device for performing display using ambient light has a reflective electrode region on one of two substrates for reflecting the ambient light transmitted through a liquid crystal layer. The reflective electrode region can be formed of a reflective electrode or a combination of a transmissive electrode and a reflective layer (e.g., reflective plate). In other words, an electrode for applying a voltage to the liquid crystal layer can be a transmissive electrode, and in this case, the reflective electrode region for reflecting input light need not act as an electrode.

A transmission- and reflection-type LCD device has a reflective electrode region, like the reflection-type LCD device. The reflective electrode region can be formed a reflective electrode or a combination of a transmissive electrode and a reflective layer (e.g., reflective plate). The transmissive electrode region is typically formed of a transmissive electrode. In the case of an LCD device having relatively small transmissive electrode regions in the reflective electrode (referred to as a "semi-transmission- and semi-reflection-type LCD device), the liquid crystal molecules are driven by a voltage applied to the liquid crystal layer by the reflective electrode in the transmissive electrode region. Therefore, the transmissive electrode regions need not act as electrodes. In this type of LCD device, each of the transmissive electrode regions has one dimension smaller than the thickness of the liquid crystal layer (e.g., diameter in the case where the transmittance electrode region is a circle). In the case where the reflective electrode region is formed of a combination of a transmissive electrode and a reflective layer is used in the semi-transmission- and semi-reflection-type LCD device), a transmissive electrode formed in the entirety of each pixel area and a reflective layer having a plurality of openings can be used.

In the transmission- and reflection-type LCD device (excluding the semi-transmission- and semi-reflection-type LCD device) according to the present invention, the region for performing display in a transmission mode is referred to as a "transmissive region", and the region for performing display in a reflection mode is referred to as a "reflective region". The transmissive region and the reflective region each includes a transmissive electrode region, a reflective electrode region and a liquid crystal layer defined by the transmissive electrode region and the reflective electrode region." The semi-transmission- and semi-reflection-type LCD device also includes a reflective electrode region and a transmissive electrode region, but light reflected by the reflective electrode region and light transmitted through the transmissive electrode region are mixed and overlapped. Accordingly, the transmissive region and the reflective region are not independently defined. In other words, among the LCD devices having a transmissive electrode region and a reflective electrode region for each pixel area, an LCD device in which the transmissive region and the reflective region cannot be independently defined (i.e., the regions are substantially overlapped) is referred to as the semi-transmission- and semi-reflection-type LCD device.

The term "pixel area" is defined as follows. An LCD device according to the present invention has a plurality of pixel areas for performing display. The term "pixel area" is defined as a part (an element) of an LCD device forming a pixel which is a minimum unit of display. Typically, in an active matrix LCD device including a counter electrode and a plurality of pixel electrodes arranged in a matrix and switched by each of active elements (e.g., TFTs), a pixel area includes one of the pixel electrodes, an area of the counter electrode positionally corresponding to the pixel electrode, and an area of the liquid crystal layer interposed therebetween. In a simple matrix LCD device including striped electrodes (scanning electrodes and signal electrodes) respectively formed in two substrates and arranged to cross each other with the liquid crystal layer being interposed therebetween, a pixel area includes a crossing area at which the striped electrodes cross each other and an area of the liquid crystal layer positionally corresponding to the crossing area. A transmission- and reflection-type LCD device according to the present invention has a reflective electrode region and a transmissive electrode region for each pixel area.

The "phase compensation element" includes a phase plate or a phase film, and the "polarizer" includes a polarizing plate or a polarizing film.

The "retardation" refers to a retardation with respect to the light incident vertically on the liquid crystal layer or a phase compensation element unless otherwise specified.

Embodiment 1

In a first embodiment of the present invention, a reflection-type LCD device having a higher display quality than the conventional LCD device is provided as specifically described in a first example. A reflection-type LCD device in the first embodiment, as shown in FIG. 1, includes a first substrate 1 including a transmissive electrode 4, a second substrate 2 including a reflective electrode region 3, a liquid crystal layer 5 interposed between the first substrate 1 and the second substrate 2, a polarizer 6 provided on a surface of the first substrate 1 opposite to the liquid crystal layer 5, and a λ/4 wave plate 7 provided between the polarizer 6 and the liquid crystal layer 5. FIG. 1 schematically shows one pixel area of the reflection-type LCD device according to the present invention.

The liquid crystal layer 5 includes liquid crystal molecules (not shown) exhibiting negative dielectric anisotropy. The liquid crystal molecules in the liquid crystal layer 5 are substantially treated so as to align vertically to surfaces of the first and second substrates 1 and 2 when no voltage is applied. (A liquid crystal layer treated so that the liquid crystal molecules therein are aligned vertically to the surfaces of the substrate when no voltage is applied will be referred to as a "vertically aligned liquid crystal layer". A liquid crystal layer treated so that the liquid crystal molecules therein are aligned horizontal to the surfaces of the substrate when no voltage is applied will be referred to as a "horizontally aligned liquid crystal layer".) A slower optic axis of the λ/4 wave plate 7 and a transmission axis of the polarizer 6 are set to make an angle of about 45 degrees. The linearly polarized light incident through the polarizer 6 is converted into circularly polarized light, and the circularly polarized light reflected by the reflective electrode region 3 and transmitted through the liquid crystal layer 5 is converted into the linearly polarized light. Accordingly, the retardation by the liquid crystal layer 5 is substantially zero when no voltage is applied, and thus satisfactory black display is obtained.

Figure 2:
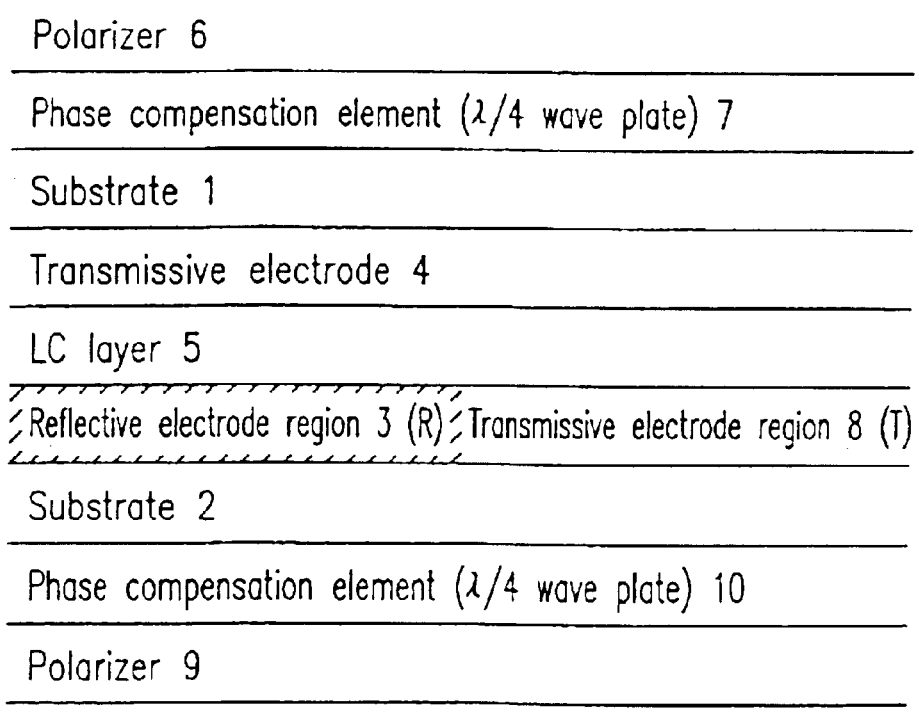
FIG. 2 is a schematic view of a transmission- and reflection-type LCD device in an example according to the present invention.

A transmission- and reflection- type LCD device in the first embodiment, as shown in FIG. 2, includes a first substrate 1, a second substrate 2, a liquid crystal layer 5 interposed between the first and second substrates 1 and 2, a first polarizer 6 provided on a surface of the first substrate 1 opposite to the liquid crystal layer 5, and a second polarizer 9 provided on a surface of the second substrate 2 opposite to the liquid crystal layer 5. The transmission- and reflection- type LCD device further includes a first phase compensation element 7 (typically, a λ/4 wave plate) provided between the first polarizer 6 and the liquid crystal layer 5 and a second phase compensation element 10 (typically, a λ/4 wave plate) provided between the second polarizer 9 and the liquid crystal layer 5. The second substrate 2 includes a reflective electrode region (R) 3 and a transmissive electrode region 8 (T) for each of a plurality of pixel areas. FIG. 2 schematically shows one pixel area of the transmission- and reflection- type LCD device. In FIG. 2, the reflective electrode region 3 (R) and the transmissive electrode region 8 (T) are each shown as one region for simplicity. The transmission- and reflection- type LCD device according to the present invention is not limited to this and can have a plurality of transmissive electrode region 8 in the reflective electrode region 3 like a semi-transmission- and semi-reflection-type LCD device.

The transmission- and reflection- type LCD device shown in FIG. 2 operates in the following manner.

In the reflection mode, when the retardation (birefringence) of the liquid crystal layer in the viewing direction (thickness direction of the liquid crystal layer) is substantially zero (that is, initial alignment state in the vertical alignment mode and the state of being supplied with a prescribed saturation voltage in the horizontal alignment state), black (dark) display is performed by the following reason. The linearly polarized light transmitted through the first polarizer is transmitted through the first phase compensation element and the liquid crystal layer, then reflected, and again transmitted through the liquid crystal layer and the first phase compensation element to be incident on the first polarizer. At this point, the light has sufficient polarizing components perpendicular to the transmission axis of the first polarizer to perform black display.

When there is a retardation in the viewing direction, the white (bright) display is performed for the following reason. The linearly polarized light transmitted through the first polarizer is transmitted through the first phase compensation element and the liquid crystal layer, then reflected, and again transmitted through the liquid crystal layer and the first phase compensation element to be incident on the first polarizer. At this point, the light has sufficient polarizing components parallel to the transmission axis of the first polarizer to perform white display. Gray scale display corresponding to various retardations by the liquid crystal layer is realized by an application of voltage across the liquid crystal layer.

In the transmission mode, when the retardation in the viewing direction is substantially zero, black display is performed by the following reason. The linearly polarized light transmitted through the second polarizer is transmitted through the second phase compensation element, the liquid crystal layer and the first phase compensation element to be incident on the first polarizer. At this point, the light has sufficient polarizing components perpendicular to the transmission axis of the first polarizer to perform black display.

When there is a retardation in the viewing direction, the white display is performed for the following reason. The linearly polarized light transmitted through the second polarizer is transmitted through the second phase compensation element, the liquid crystal layer, and the first phase compensation element to be incident on the first polarizer. At this point, the light has sufficient polarizing components parallel to the transmission axis of the first polarizer to perform white display. Gray scale display corresponding to various retardations is realized.

Accordingly, when the reflection mode and the transmission mode are used together, black display is performed in both modes, realizing high contrast display. The gray scale display is performed by changing the retardation by controlling the voltage.

In the case where the reflective region for performing display in the reflection mode and the transmissive region for performing display in the transmission mode are formed for each pixel area, the utilization factor of the reflected light is improved. Furthermore, in such a structure, the thicknesses of the liquid crystal layer (retardation) in the reflective region and the transmissive region are independently adjusted. Thus, each of the display modes is optimized.

The retardation by the liquid crystal layer is substantially zero when the molecular axis of the liquid crystal molecules is substantially vertical to the surfaces of the first and second substrates. When the retardation by each of the first phase compensation element and the second phase compensation element fulfills the $\lambda/4$ condition, there is almost no birefringence by the liquid crystal layer in the viewing direction in the reflection mode using the light reflected by the area region having a reflection function such as a reflective layer or reflective plate. Accordingly, the circularly polarized light is incident on and reflected by the reflective electrode region to be circularly polarized light having an opposite rotation direction. The light is transmitted through the first phase compensation element to be linearly polarized light perpendicular to the transmission axis of the first polarizer. Since the reflective region acts as a light isolator, black display with very little optical leakage is provided.

When there is a retardation (birefringence) by the liquid crystal layer in the viewing direction in the reflection mode, the retardation can be changed by controlling the voltage, so that the light which has been incident on the first polarizer, reflected and again incident on the first polarizer has components parallel to the transmission axis of the first polarizer. Accordingly, bright display having gray scale is provided.

When there is almost no retardation by the liquid crystal layer in the viewing direction in the transmission mode, the circularly polarized light incident on the liquid crystal layer is maintained as being circularly polarized when being transmitted through the liquid crystal layer. The light is transmitted through the first phase compensation element to be linearly polarized light perpendicular to the transmission axis of the first polarizer. Thus, black display with very little optical leakage is provided.

When there is a retardation by the liquid crystal layer in the viewing direction in the transmission mode, the retardation can be changed by controlling the voltage. Thus, the light incident on the second polarizer is incident on the first polarizer as being parallel to the transmission axis of the first polarizer. Thus, the white display having gray scale is provided.

As described above, when both the reflection mode and the transmission mode are used, the state of the liquid crystal molecules for black display is the same in both display modes, and the black display with substantially no optical leakage is provided. Regardless of the ambient light intensity, the transmission- and reflection-type LCD device provides high contrast display.

In such an LCD device, even when the retardation ($\alpha$) caused by the liquid crystal molecules remaining in the state of being almost vertical to the first and second substrates is not negligible, for example, when a horizontally aligned liquid crystal layer is used or when the pretilt angle is excessively large in a vertically aligned liquid crystal layer, high contrast display is provided in the reflection mode by setting the remaining retardation by the liquid crystal layer and the retardation by the phase compensation elements in combination to fulfill the $\lambda/4$ condition in a wide wavelength range.

In the reflection mode, the light going out of the liquid crystal layer after being transmitted through the liquid crystal layer twice is elliptically polarized light which is offset from the circularly polarized light by the remaining retardation $\alpha$. The elliptically polarized light is phase-offset by 90 degrees from the light which was incident. Accordingly, when transmitted through the first phase compensation element having a retardation of $\lambda/4-\alpha$, the light becomes linearly polarized light perpendicular to the transmission axis of the first polarizer. Since the reflective region acts as a light isolator, black display with very little optical leakage is provided.

As can be appreciated, even when the remaining retardation is not negligible, high contrast display is obtained in the reflection mode. In the case where mainly reflection-mode display is performed, such as, for example, when the reflective pixel electrodes are larger than the transmissive pixel electrodes, the second phase compensation element 10 shown in FIG. 3 can be a $\lambda/4$ wave plate.

Even in the case where the remaining retardation is not negligible, for example, when a horizontally aligned liquid crystal layer is used or when the pretilt angle is excessively large in a vertically aligned liquid crystal layer, high contrast display is provided for a reflection-type LCD device, a transmission-type LCD device and a transmission- and reflection-type LCD device by the following structure. Where $\alpha$ is the retardation by the liquid crystal layer in the reflective region when the liquid crystal molecules are aligned almost vertically to the substrates and $\beta$ is the retardation by the liquid crystal layer in the transmissive region, the retardation of the first phase compensation element fulfills $\lambda/4-\alpha$ and the retardation of the second phase compensation element fulfills $\lambda/4-(\beta-\alpha)$.

As described above, in the reflection mode, the light going out of the liquid crystal layer after being transmitted through the liquid crystal layer twice is elliptically polarized light which is offset from the circularly polarized light by the remaining retardation α. The light becomes linearly polarized light perpendicular to the transmission axis of the first polarizer when transmitted through the first phase compensation element having a retardation of λ/4−α.

In the transmission mode, when the retardation (β) caused by the liquid crystal molecules in the viewing angle is not negligible, the light going out of the liquid crystal layer is elliptically polarized light as in the reflection mode because the second phase compensation element is set to have a retardation of λ/4−(β−α). The elliptically polarized light becomes linearly polarized light perpendicular to the transmission axis of the first polarizer when transmitted through the phase compensation element. Thus, black display with very little optical leakage is obtained.

Even in the case where the remaining retardation is not negligible, high contrast display is provided for a reflection-type LCD device, a transmission-type LCD device and a transmission- and reflection-type LCD device by the following structure.

When the remaining retardation is negligible, circularly polarized light is incident on the liquid crystal layer to obtain high contrast display with a simplest structure due to the following setting. The first and second compensation elements are each formed of a λ/4 wave plate. The transmission axis of the first polarizer and the slower optic axis of the first phase compensation element are set to make an angle of about 45 degrees. The transmission axis of the second polarizer and the slower optic axis of the second phase compensation element are set to make an angle of about 45 degrees.

In a transmission- and reflection-type LCD device, a liquid crystal layer in which the liquid crystal molecules are aligned substantially vertically to the surfaces of the substrates when no voltage is applied can be used. In such a case, the LCD device can act, when the ambient light is dark, as a transmission-type LCD device for performing display using the light which is from the backlight and transmitted through the transmissive electrode region formed of a material having a relatively high light transmittance. When the ambient light is bright, the LCD device can be used as a reflection-type LCD device for performing display using the ambient light reflected by the reflective electrode region formed of a material having a relatively high light reflectance. When the transmission mode and the reflection mode are used together, substantially complete black display is performed in both modes. Thus, high contrast display is realized. This will be described below.

A transmission- and reflection-type LCD device is generally operable in both the normally black (hereinafter, referred to as "NB") mode and the normally white (hereinafter, referred to as "NW") mode using birefringence.

In the NW mode, the voltage to be applied to achieve black display changes as the cell gap changes. In the NB mode, the voltage to be applied to achieve white display changes as the cell gap changes. Accordingly, in the NW mode, the contrast ratio significantly changes in accordance with the cell gap, which requires precise cell gap control. In the NB mode, the contrast does not substantially change in accordance with the cell gap, which provides a larger margin for cell gap control. Moreover in the NB mode, when the switching element (e.g., TFT) malfunctions to prevent voltage application on the pixel electrode, this results in an inconspicuous black point.

A transmission- and reflection-type LCD device operable in the NB mode has a high production efficiency, and high contrast display is realized easily regardless of the ambient light intensity according to the present invention.

A phase compensation element can be provided for compensating for the influence by the refractive index anisotropy of the liquid crystal molecules caused in the light incident direction on the liquid crystal layer and the viewing direction. In such a structure, the reduction in contrast in accordance with the light incident direction and the viewing direction is prevented.

When a chiral dopant is added to the vertically aligned liquid crystal layer formed of a liquid crystal material exhibiting negative dielectric anisotropy of the LCD device, the liquid crystal molecules are rotated when a voltage is applied. Thus, the rotation of the liquid crystal molecules at the time of voltage application is stabilized by the chiral dopant.

When the alignment layers in the vicinity of the two substrates are rubbed in different directions, the traces of the alignment treatment are not in the same directions and thus are less conspicuous. When the liquid crystal layer has a 90 degree twist orientation, black display with very little optical leakage is obtained for the following reason. The tilt directions of the liquid crystal molecules in the vicinity of the two substrates make an angle of 90 degrees, and thus the retardations generated in the tilt directions are counteracted by each other.

The refractive indices of birefringent materials forming the phase compensation elements with respect to the ordinary ray and extraordinary ray strongly depend on the wavelength. Therefore, the phase delay accumulated in the phase compensation elements at a specific thickness also depends on the wavelength. In other words, the phase delay (e.g., λ/4) can be completely provided to the linearly polarized light of incidence only when the incident light has a certain single wavelength. Accordingly, in the area where the phase delay of λ/4 is not achieved due to the wavelength dependency of the refractive index anisotropy of the birefringent material forming the λ/4 wave plates, a part of the light is transmitted through the polarizer on the outgoing side without being absorbed by polarizer. As a result, the darkness of the black display changes. According to the present invention, the slower optic axes of the first and second phase compensation elements wave plates are set to be perpendicular to each other. Due to such a structure, the wavelength dependency of the refractive index anisotropy of the first phase compensation element is counteracted by the wavelength dependency of the refractive index anisotropy of the second phase compensation element. Thus, a certain phase difference is fulfilled in the entirety of the certain wavelength range. Thus, the darkness of the black display is improved.

As shown in FIG. 17, a third phase compensation element 11 can be provided between the first polarizer 6 and the liquid crystal layer 5. Due to such a structure, the wavelength dependency of the refractive index anisotropy caused when the linearly polarized light is converted into circularly polarized light by the first phase compensation element is counteracted to some extent. Accordingly, in the reflection mode, conversion into circularly polarized light is performed in the state where the dispersion in the polarization state is reduced over a wide wavelength range. Thus, the darkness of the black display is improved.

In the case where the third compensation element is formed of a λ/2 wave plate and the transmission axis of the first polarizer and the slower optic axis of the first phase compensation element are set to make an angle of 2γ1+45 degrees (where γ1 is the angle made by the transmission axis of the first polarizer and the slower optic axis of the third compensation element), the polarization direction of the linearly polarized light from the first compensation element is changed in orientation by the third phase compensation element and then converted into circularly polarized light by the first phase compensation element. Accordingly, the wavelength dependency of the refractive index anisotropy of the first phase compensation element is compensated for optimally. Therefore, the dispersion in the polarization state is reduced in a wide wavelength range in the reflection mode, and thus circularly polarized light is obtained in a satisfactory manner. Thus, the darkness of the black display in the reflection mode is improved. Substantially the same effects are obtained when the first and third phase compensation elements are located oppositely.

Especially when a vertically aligned liquid crystal layer is used or when the remaining retardation by the liquid crystal layer is negligible in the dark state, the first phase compensation element can be formed of a λ/4 wave plate.

When a retardation of α is remaining in the liquid crystal layer in the reflection mode in the dark state, the retardation of the first phase compensation element is made λ/4−α so that light which is offset from the circularly polarized light is incident on the liquid crystal layer. When the light is transmitted through the liquid crystal layer and reaches the reflective electrode, the light becomes circularly polarized light as a result of the dispersion in the polarization state being eliminated over a wide wavelength range. Thus, satisfactory black display is realized in the reflection mode.

A fourth phase compensation element 12 can be provided between the second polarizer 9 and the liquid crystal layer 5. Due to such a structure, the wavelength dependency of the refractive index anisotropy caused when the linearly polarized light is converted into circularly polarized light is counteracted to some extent. Accordingly, in the transmission mode, conversion into circularly polarized light is performed in the state where the dispersion in the polarization state is reduced in a wide wavelength range. Thus, the darkness of the black display is improved. Even when the reflection mode and the transmission mode are used together, satisfactory black display is realized.

In the case where the fourth compensation element is formed of a λ/2 wave plate and the transmission axis of the second polarizer and the slower optic axis of the second phase compensation element are set to make an angle of 2γ2+45 degrees (where γ2 is the angle made by the transmission axis of the second polarizer and the slower optic axis of the fourth compensation element), the linearly polarized light from the second compensation element is changed in orientation by the fourth phase compensation element and then converted into circularly polarized light by the second phase compensation element. Accordingly, the wavelength dependency of the refractive index anisotropy of the first phase compensation element is compensated for optimally. Therefore, the dispersion in the polarization state is reduced in a wide wavelength range in the transmission mode, and thus circularly polarized light is obtained in a satisfactory manner.

Especially when a vertically aligned liquid crystal layer is used or when the remaining retardation by the liquid crystal layer is negligible in the dark state, the second phase compensation element can be formed of a λ/4 wave plate.

When a retardation of α is remaining in the reflection mode and a retardation of β is remaining in transmission mode in the liquid crystal layer in the dark state, the retardations of the elements used later are made λ/4−(β−α) so that light which is offset from the circularly polarized light is incident on the liquid crystal layer. When the light is transmitted through the liquid crystal layer, the light is in the same polarization state as that in the reflection mode. Therefore, when being transmitted through the third phase compensation element, the light becomes linearly polarized light perpendicular to the transmission axis of the first polarizer. Thus, the darkness of the black display is improved. Even when the transmission mode and the reflection mode are used together, satisfactory black display is realized.

In the case where the slower optic axes of the first and second phase compensation elements to perpendicular to each other and the slower optic axes of the third and fourth phase compensation elements to perpendicular to each other, the wavelength dependency of the refractive index anisotropy of the first and third phase compensation elements is counteracted by the wavelength dependency of the refractive index anisotropy of the second and fourth phase compensation elements, respectively. In this manner, the darkness of the black display is improved.

EXAMPLE 1

An LCD device in a first example according to the present invention will be described with reference to FIG. 1.

A substrate 2 includes a reflective electrode 3 (shown as reflective electrode region in FIG. 1) formed of a material having a high reflectance such as, for example, Al or Ta. A substrate 1 includes a counter electrode 4 (shown as transmissive electrode in FIG. 1). A liquid crystal layer 5 formed of a liquid crystal material exhibiting negative dielectric anisotropy is interposed between the reflective electrode 3 and the counter electrode 4.

Alignment layers (not shown) are provided on surfaces of the reflective electrode 3 and the counter electrode 4 which are in contact with the liquid crystal layer 5. The alignment layers are used to align liquid crystal molecules (not shown) in the liquid crystal layer 5 to be vertical to the surfaces of the substrates 1 and 2. After the alignment layers are provided, at least one of the alignment layers is processed with alignment treatment such as, for example, rubbing.

Due to the alignment treatment, the liquid crystal molecules in the liquid crystal layer 5 has a tilt angle of about 0.1 to 5 degrees with respect to the vertical direction to the surfaces of the substrates 1 and 2.

Since the liquid crystal layer 5 is formed of a material exhibiting negative dielectric anisotropy, when a voltage is applied between the reflective electrode 3 and the counter electrode 4, the liquid crystal molecules tilt to be horizontal with respect to the surfaces of the substrates 1 and 2.

The reflective electrode 3 is used for applying a voltage to the liquid crystal layer 5, but the reflective electrode 3 can be used only as a reflective plate but not as an electrode for applying a voltage. In such a case, for example, the transmissive electrode 8 can be extended onto the reflective electrode 3 to act as an electrode for applying a voltage to the liquid crystal layer 5 in the reflective region.

The liquid crystal material used herein has a refractive index anisotropy of Ne (refractive index with respect to extraordinary ray)=1.5546, No (refractive index with respect to ordinary ray)=1,4773, and ΔN(Ne—No)=0.0773.

A λ/4 wave plate 7 is provided on the surface of the substrate 1 opposite to the counter electrode 4. A slower optic axis of the λ/4 wave plate 7 is set to be tilted at 45 degrees with respect to a longitudinal axis (i.e., molecular axis) of the liquid crystal molecules when a voltage is applied to the liquid crystal layer 5.

The λ/4 wave plate 7 is used for converting linearly polarized light into circularly polarized light and converting circularly polarized light into linearly polarized light.

The λ/4 wave plate 7 is provided on the surface of the substrate 1 opposite to the counter electrode 4 in this example, but can be provided between the reflective electrode 3 and the liquid crystal layer 5.

The λ/4 wave plate 7 can be applied to the surface of the substrate 1 or integrated with a polarizer 6 in order to reduce the production cost.

A polarizer 6 is provided on a surface of the λ/4 wave plate 7 opposite to the substrate 1. A transmission axis of the polarizer 6 is set to be tilted at 45 degrees with respect to the slower optic axis of the λ/4 wave plate 7.

Figure 7A:
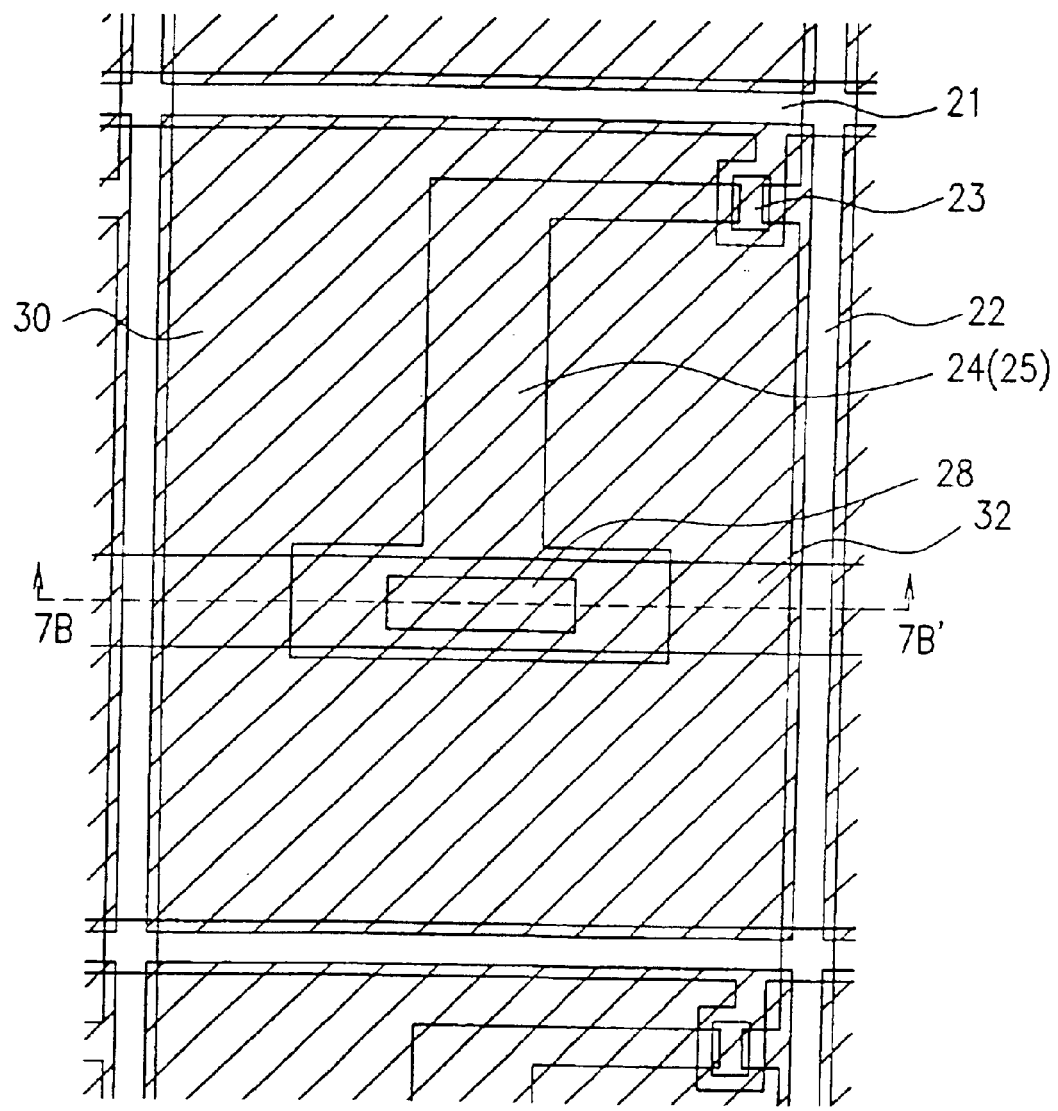
FIG. 7A is a plan view of an active matrix substrate in a first example according to the present invention.
Figure 7B:
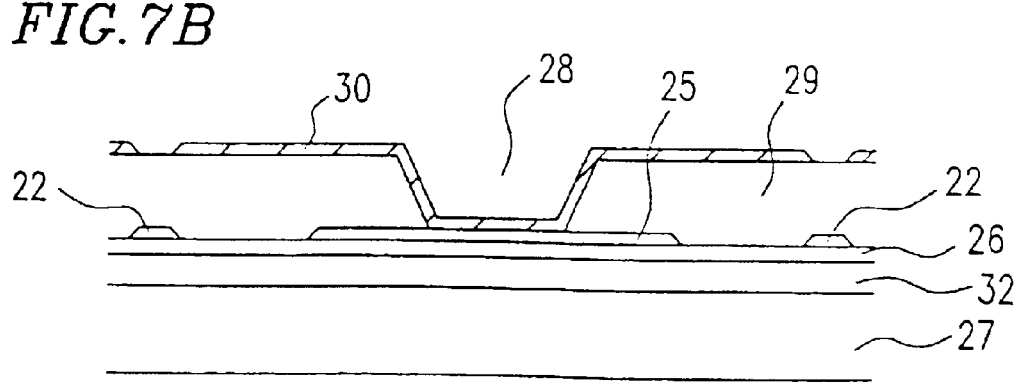
FIG. 7B is a cross-sectional view of the active matrix substrate taken along line 7B–7B' of FIG. 7A.

FIG. 7A is a plan view of an active matrix substrate (substrate 2) in the first example, and FIG. 7B is a cross-sectional view of the active matrix substrate taken along line 7B–7B' of FIG. 7A.

As shown in FIGS. 7A and 7B, the active matrix substrate includes a gate line 21, a data line 22, a driving element 23, a drain electrode 24, a storage capacitance electrode 25, a gate insulating layer 26, an insulating substrate 27, a contact hole 28, an interlayer insulating layer 29 and a reflective electrode 30 (corresponding to the reflective electrode 3 in FIG. 1).

The storage capacitance electrode 25 is electrically connected to the drain electrode 24, and overlaps a storage capacitance line 32 with the gate insulating layer 26 being interposed therebetween. Thus, the storage capacitance electrode 25, the insulating layer 26 and the storage capacitance line 32 form a storage capacitance.

The contact hole 28 is formed in the interlayer insulating layer 29 for connecting the reflective electrode 30 and the storage capacitance electrode 25.

Figure 13A:
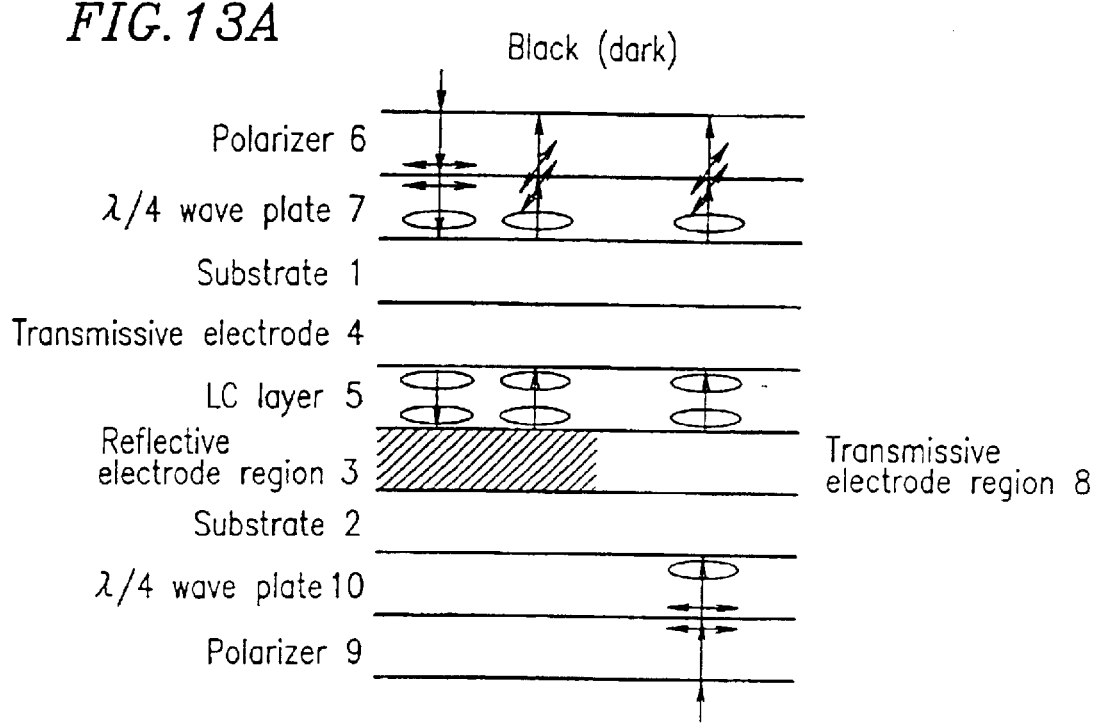
FIG. 13A is a schematic view illustrating light transmission and reflection in black display in the LCD device according to the present invention.
Figure 13B:
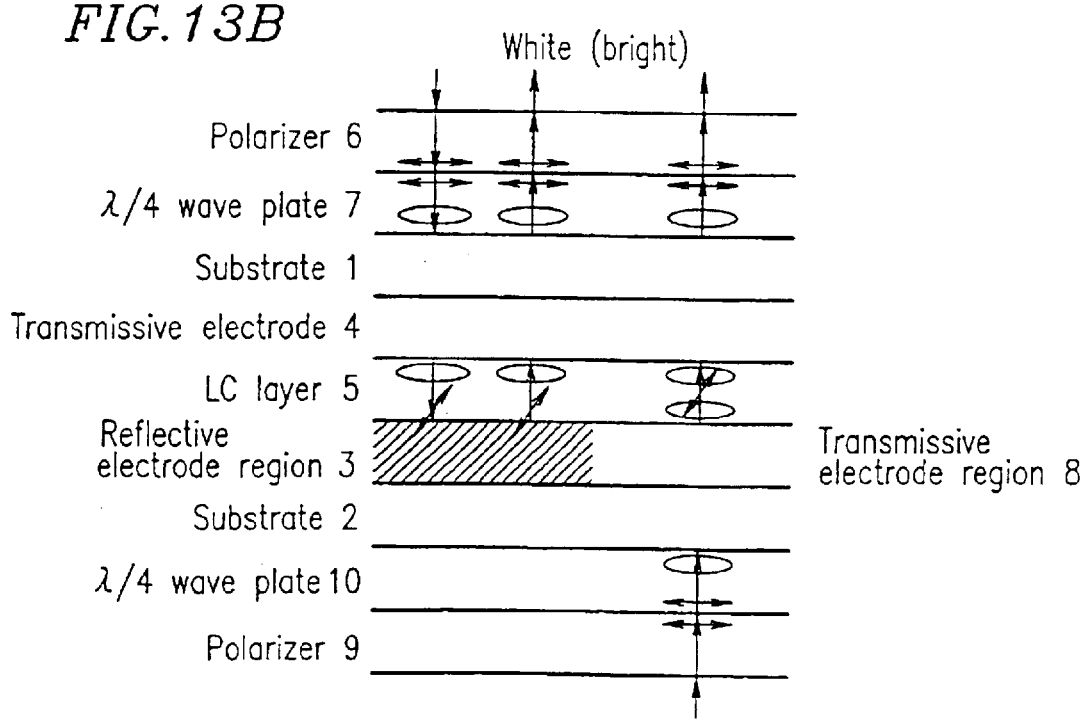
FIG. 13B is a schematic view illustrating light transmission and reflection in white display in the LCD device in the second example according to the present invention.

With reference to FIGS. 13A and 13B, light transmission and reflection in the LCD device in the reflection mode in the first example will be described.

FIG. 13A shows black display performed when no voltage is applied to the liquid crystal layer 5, and FIG. 13B shows white display performed when a voltage is applied to the liquid crystal layer 5. In these figures, the reflective electrode 3 (reflective electrode region 3) is formed on the left side.

With reference to FIG. 13A, black display will be described.

The light incident on the upper surface of the polarizer 6 is transmitted through the polarizer 6 to be linearly polarized light parallel to the transmission axis of the polarizer 6 and then is incident on the λ/4 wave plate 7.

The λ/4 wave plate 7 is arranged so that the transmission axis of the polarizer 6 and the slower optic axis of the λ/4 wave plate 7 make an angle of 45 degrees. Thus, the light transmitted through the λ/4 wave plate 7 becomes circularly polarized light.

When no voltage is applied to the liquid crystal layer 5, the liquid crystal molecules exhibiting negative dielectric anisotropy used in the liquid crystal layer 5 are substantially vertical to the surfaces of the substrates 1 and 2. Accordingly, the refractive index anisotropy of the liquid crystal layer 5 to the incident light is very small. In other words, the phase difference caused by the transmission of the light through the liquid crystal layer 5 is substantially zero.

Accordingly, the circularly polarized light from the λ/4 wave plate 7 is transmitted through the liquid crystal layer 5 while maintaining circular polarization and reflected by the reflective electrode 3 in the substrate 2.

The circularly polarized light reflected by the reflective electrode 3 is transmitted through the liquid crystal layer 5 toward the substrate 1 and is incident on the λ/4 wave plate 7 as while maintaining circular polarization.

Then, the circularly polarized light is transmitted through the λ/4 wave plate 7 to be linearly polarized light perpendicular to the transmission axis of the polarizer 6 and then is incident on the polarizer 6.

Since the polarization direction of the light is now perpendicular to the transmission axis of the polarizer 6, the light is absorbed by the polarizer 6 without being transmitted.

In this manner, black display is performed.

With reference to FIG. 13B, white display will be described.

The process until the light is transmitted through λ/4 wave plate 7 to be circularly polarized light is the same as above and will not be described.

When a voltage is applied to the liquid crystal layer 5, the liquid crystal molecules are tilted horizontal with respect to the surfaces of the substrates 1 and 2. Accordingly, the circularly polarized light incident on the liquid crystal layer 5 becomes elliptically polarized light by the birefringence of the liquid crystal molecules. The light is then reflected by the reflective electrode 3, and the polarization is changed after the light is transmitted through the liquid crystal layer 5. After being transmitted through the λ/4 wave plate 7, the light does not become linearly polarized light perpendicular to the transmission axis of the polarizer 6. Thus, the light is transmitted through the polarizer 6.

By controlling the voltage applied to the liquid crystal layer 5, the amount of light transmitted through the polarizer 6 after being reflected by the reflective electrode 3 can be adjusted. Thus, gray scale display is provided.

When a voltage is applied to the liquid crystal layer 5 by the reflective electrode 3 and the counter electrode 4 to change the orientation of the liquid crystal molecules so that the phase difference by the liquid crystal layer 5 fulfills the ¼ wavelength (λ/4) condition, the circularly polarized light from the λ/4 wave plate 7 becomes linearly polarized light perpendicular to the transmission axis of the polarizer 6 when reaching the reflective electrode 3 after being transmitted through the liquid crystal layer 5. The light is again transmitted through the liquid crystal layer 5 and the λ/4 wave plate 7 to be linearly polarized light parallel to the transmission axis of the polarizer 6. In this case, the amount of light transmitted through the polarizer 6 is maximum.

As described above, when no voltage is applied across the liquid crystal layer 5, black display is obtained since the liquid crystal layer 5 has substantially no birefringence; and when a voltage is applied across the liquid crystal layer 5, gray scale display is obtained by changing the light transmittance in accordance with the voltage.

Figure 4:
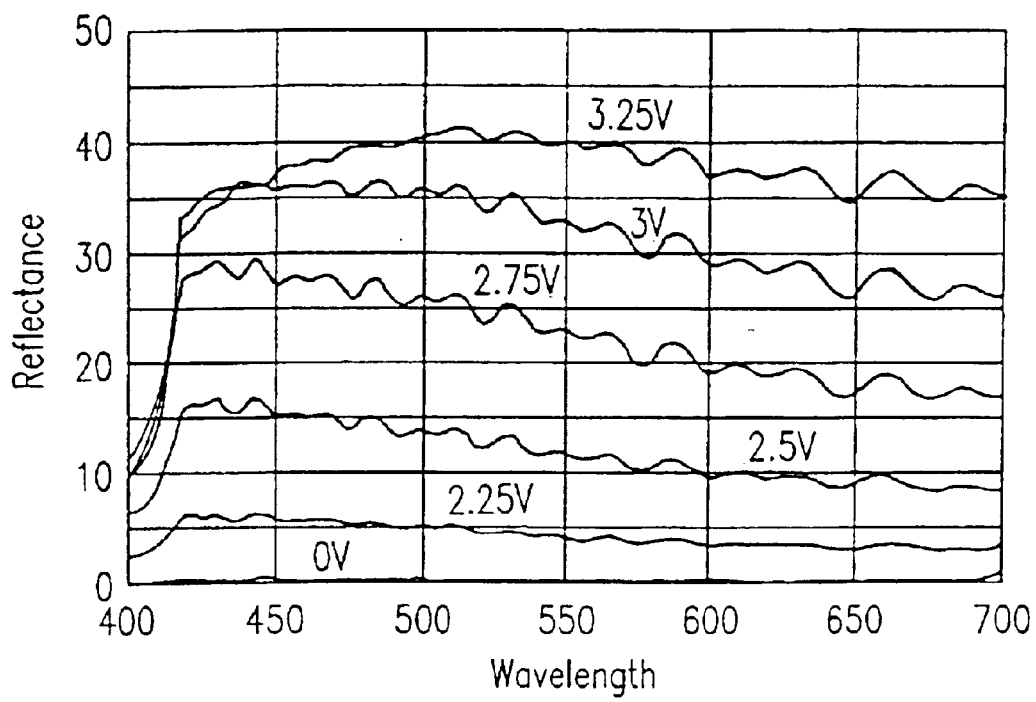
FIG. 4 is a graph illustrating a spectral reflectance characteristics of a reflection-type LCD device according to the present invention having a gap of d=3.56 $\mu$m obtained when the light is incident and received vertically.

FIG. 4 shows the spectral reflectance characteristics of the reflection-type LCD device in the first example, which is obtained when the cell gap of the liquid crystal layer is d=3.56 μm and the retardation (phase difference) by the liquid crystal layer is dΔN=0.2752, in the case where the light is incident and received vertically.

In FIG. 4, the spectral reflectance to the single reflective plate in the case where the light is incident and received vertically is 100.

As shown in FIG. 4, a sufficient contrast ratio of 50 or more is obtained over the entire wavelength range of 400 nm to 700 nm between the black display when no voltage is applied and the white display when a voltage of 3.25 V is applied.

When a voltage of 3.25 V is applied, a reflectance of about 40% is obtained which is substantially equal to the transmittance of the polarizer 6. Such a high light utilization factor is suitable for a reflection-type LCD device.

Figure 5:
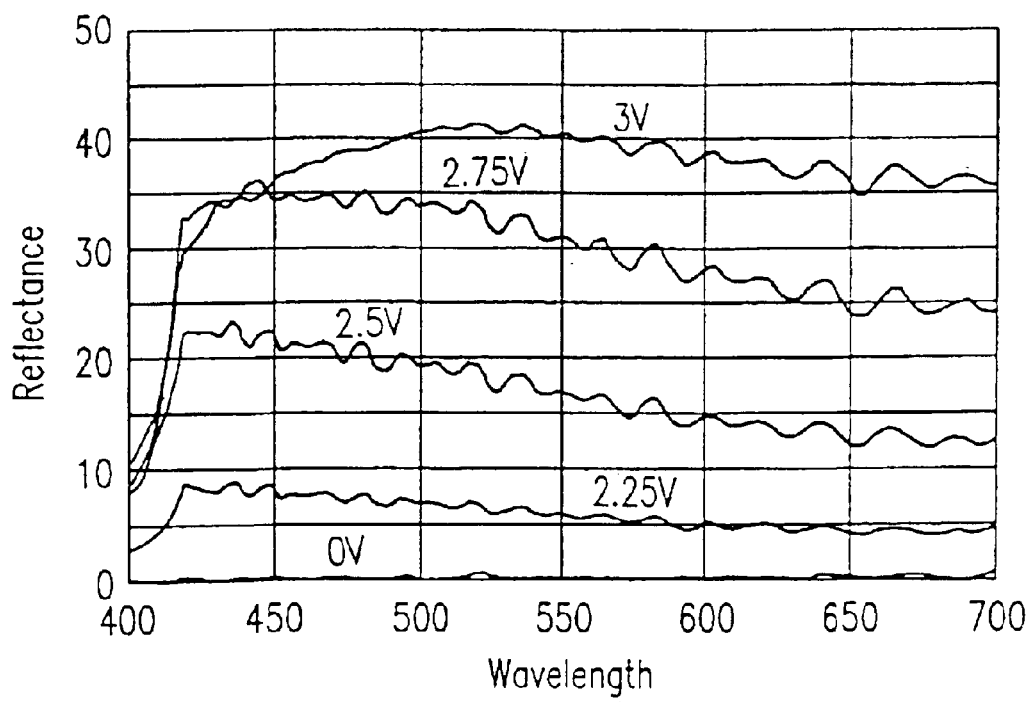
FIG. 5 is a graph illustrating a spectral reflectance characteristics of a reflection-type LCD device according to the present invention having a gap of d=4.5 $\mu$m obtained when the light is incident and received vertically.

FIG. 5 shows the spectral reflectance characteristics of the reflection-type LCD device in the first example, which is obtained when the cell gap of the liquid crystal layer is d=4.5 μm and the retardation (phase difference) by the liquid crystal layer is dΔN=0.3479, in the case where the light is incident and received vertically.

As shown in FIG. 5, a sufficient contrast ratio of 50 or more is obtained in the entire wavelength range of 400 nm to 700 nm between the black display when no voltage is applied and the white display when a voltage of 3 V is applied.

When a voltage of 3 V is applied, a reflectance of about 40% is obtained as in the case where the cell gap d=3.56 μm.

FIG. 6 shows the relationship between the cell gap and the contrast ratio of the reflection-type LCD device in the first example when the light is incident and received vertically at a wavelength of 550 nm.

The contrast ratio is measured by applying a voltage by which the retardation (phase difference) dΔN by the liquid crystal layer fulfills the ¼ wavelength condition.

As shown in FIG. 6, the reflection-type LCD device in the first example maintains the contrast ratio of 500 or more regardless of the cell gap of the liquid crystal layer.

Accordingly, when a voltage is applied across the liquid crystal layer, display is provided without any reduction of contrast ratio as long as the phase difference dΔN fulfills the ¼ wavelength condition. The cell gap d can be arbitrarily set.

Figure 12:
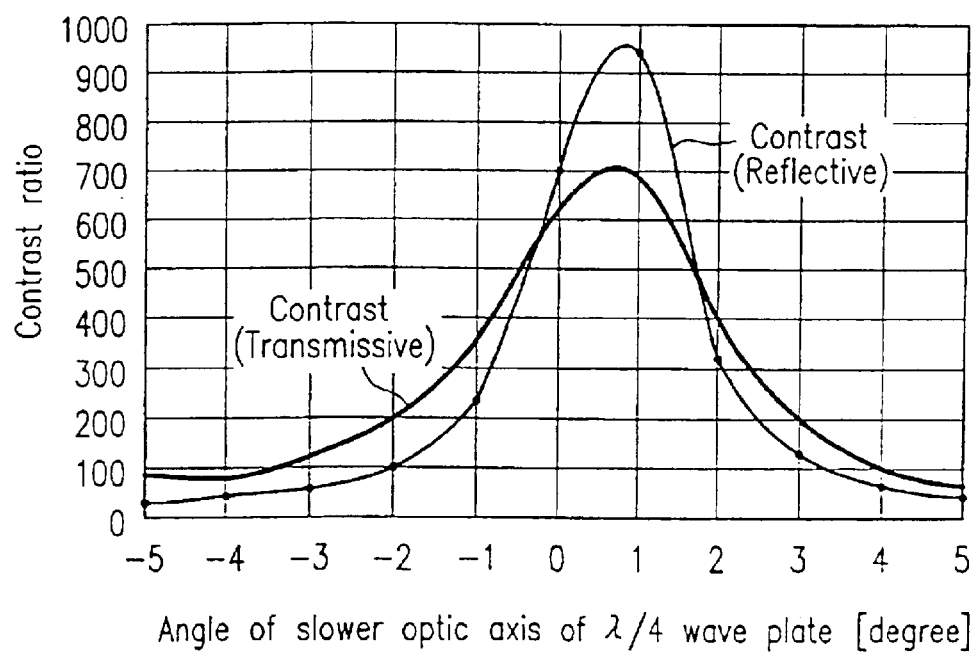
FIG. 12 is a graph illustrating the relationship between the angle of the slower optic axis of the $\lambda$/4 wave plate and the contrast ratio in the first example.

FIG. 12 shows the relationship between the angle of the slower optic axis of the λ/4 wave plate and the contrast ratio. The angle of the slower optic axis of the λ/4 wave plate is set to 0 degrees when the slower optic axis is tilted at 45 degrees with respect to the transmission axis of the polarizer.

When the angular difference of the slower optic axis is within 3 degrees, a contrast ratio of 500 or more is obtained, and thus a reflection-type LCD device having satisfactory display characteristics is provided.

In other words, high contrast is obtained even when the λ/4 wave plate and the polarizer are combined together with an angle of the slower optic axis of the λ/4 wave plate and the transmission axis of the polarizer being slightly offset from the set value.

FIG. 6 shows the values after the influence of the reflection by the surface of the panel is eliminated. In actual use, the reflection by the surface of the panel is not negligible. The contrast ratio with the reflection by the panel being considered is about 20, which is still satisfactory for a reflection-type LCD device.

The LCD device in the first example using a vertically aligned liquid crystal layer makes the retardation by the liquid crystal layer substantially zero when no voltage is applied. In the case of normally black display, the darkness of the black state is improved, thus enhancing the contrast.

EXAMPLE 2

An LCD device in a second example according to the present invention will be described with reference to FIG. 2. Identical elements as those in the first example bear identical reference numerals.

A substrate 2 includes a reflective electrode 3 (shown as reflective electrode region in FIG. 2) formed of a material having a high reflectance such as, for example, Al or Ta and a transmissive electrode 8 (shown as transmissive electrode region in FIG. 2) formed of a material having a high transmittance such as, for example, ITO. A substrate 1 includes a counter electrode 4 (shown as transmissive electrode in FIG. 2). A liquid crystal layer 5 formed of a liquid crystal material exhibiting negative dielectric anisotropy is interposed between the reflective electrode 3/transmissive electrode 8 and the counter electrode 4.

Alignment layers (not shown) are provided on surfaces of the reflective electrode 3/transmissive electrode 8 and the counter electrode 4 which are in contact with the liquid crystal layer 5. The alignment layers are used to align liquid crystal molecules (not shown) in the liquid crystal layer 5 vertically to surfaces of the substrates 1 and 2. After the alignment layers are provided, at least one of the alignment layers is processed with alignment treatment such as, for example, rubbing.

Due to the alignment treatment, the liquid crystal molecules in the liquid crystal layer 5 has a tilt angle of about 0.1 to 5 degrees with respect to the vertical direction to the surfaces of the substrates 1 and 2.

The reflective electrode 3 is used for applying a voltage to the liquid crystal layer 5, but the reflective electrode 3 can be used only as a reflective plate but not as an electrode for applying a voltage. In such a case, for example, the transmissive electrode 8 can be extended onto the reflective electrode 3 to act as an electrode for applying a voltage to the liquid crystal layer 5 in the reflective region.

The liquid crystal material used herein has a refractive index anisotropy of Ne (refractive index with respect to extraordinary ray)=1.5546 and No (refractive index with respect to ordinary ray)=1.4773.

A λ/4 wave plate 7 is provided on the surface of the substrate 1 opposite to the counter electrode 4. A slower optic axis of the λ/4 wave plate 7 is set to be tilted at 45 degrees with respect to a longitudinal axis of the liquid crystal molecules when a voltage is applied across the liquid crystal layer 5.

A λ/4 wave plate 10 is provided on the surface of the substrate 2 opposite to the reflective electrode 3 and the transmissive electrode 8. A slower optic axis of the λ/4 wave plate 10 is parallel to the slower optic axis of the λ/4 wave plate 7.

A polarizer 6 is provided on a surface of the λ/4 wave plate 7 opposite to the substrate 1. A polarizer 9 is provided on a surface of the λ/4 wave plate 10 opposite to the substrate 2. A transmission axis of the polarizers 6 is set to be tilted at 45 degrees with respect to the slower optic axis of the λ/4 wave plate 7. A transmission axis of the polarizer 9 is set to be tilted at 45 degrees with respect to the slower optic axis of the λ/4 wave plate 10.

Figure 8A:
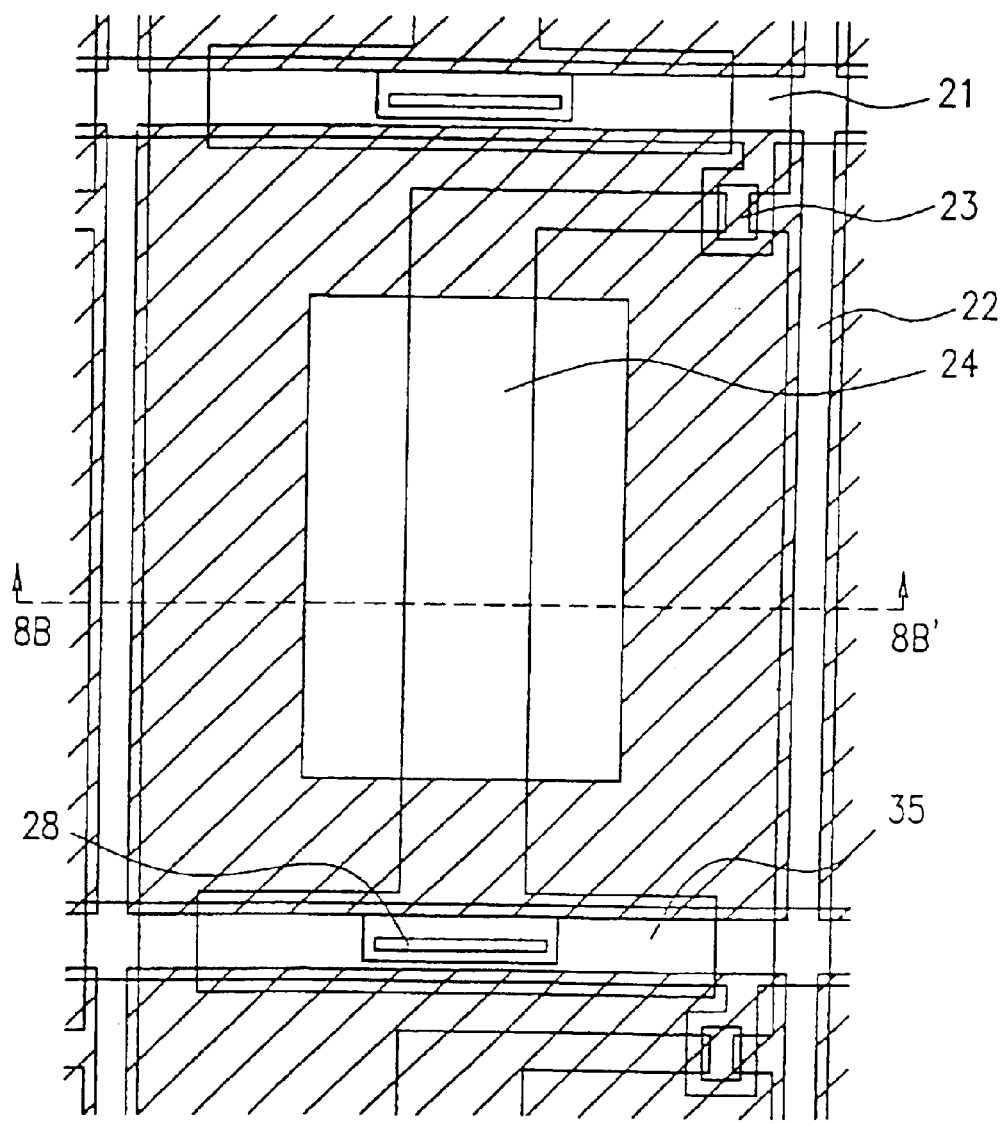
FIG. 8A is a plan view of an active matrix substrate in a second example according to the present invention.
Figure 8B:
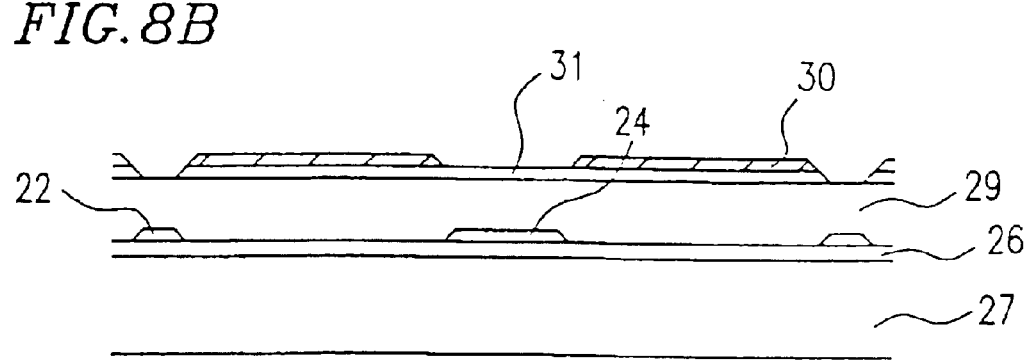
FIG. 8B is a cross-sectional view of the active matrix substrate taken along line 8B–8B' of FIG. 8A.

FIG. 8A is a plan view of an active matrix substrate (substrate 2) in the second example, and FIG. 8B is a cross-sectional view of the active matrix substrate taken along line 8B–8B' of FIG. 8A.

As shown in FIGS. 8A and 8B, the active matrix substrate includes a gate line 21, a data line 22, a driving element 23, a drain electrode 24, a storage capacitance electrode 35, a gate insulating layer 26, an insulating substrate 27, a contact hole 28, an interlayer insulating layer 29, a reflective pixel electrode (reflective electrode region) 30 (corresponding to the reflective electrode 3 in FIG. 2), and a transmissive pixel electrode (transmissive electrode region) 31 (corresponding to the transmissive electrode 8 in FIG. 2).

The storage capacitance electrode 35 is electrically connected to the drain electrode 24, and overlaps the gate line 21 with the gate insulating layer 26 being interposed therebetween. Thus, the storage capacitance electrode 35, the insulating layer 26 and the gate line 21 form a storage capacitance.

The contact hole 28 is formed in the interlayer insulating layer 29 for connecting the transmissive pixel electrode 31 and the storage capacitance electrode 35.

The reflective pixel electrode 30 and the transmissive pixel electrode 31 independently define a reflective region and a transmissive region in each of a plurality of pixel areas in the LCD device. The reflective region substantially performs reflection-mode display by reflecting external light, and the transmissive region substantially performs transmission-mode display by allowing the light from the backlight to be transmitted therethrough. Since there are, needless to say, light components incident on the LCD device obliquely in actual display, the boundary between the two region is not very clear.

As shown in FIG. 8A, it is typically preferable to provide the reflective electrode region 30 in a peripheral area of the pixel area, and to provide the transmissive electrode region 31 in a central area of the pixel area. By partially overlapping the reflective electrode region 30 with the gate lines 21 and the data line 22, a storage capacitance is formed and the display area is enlarged.

Figure 8C:
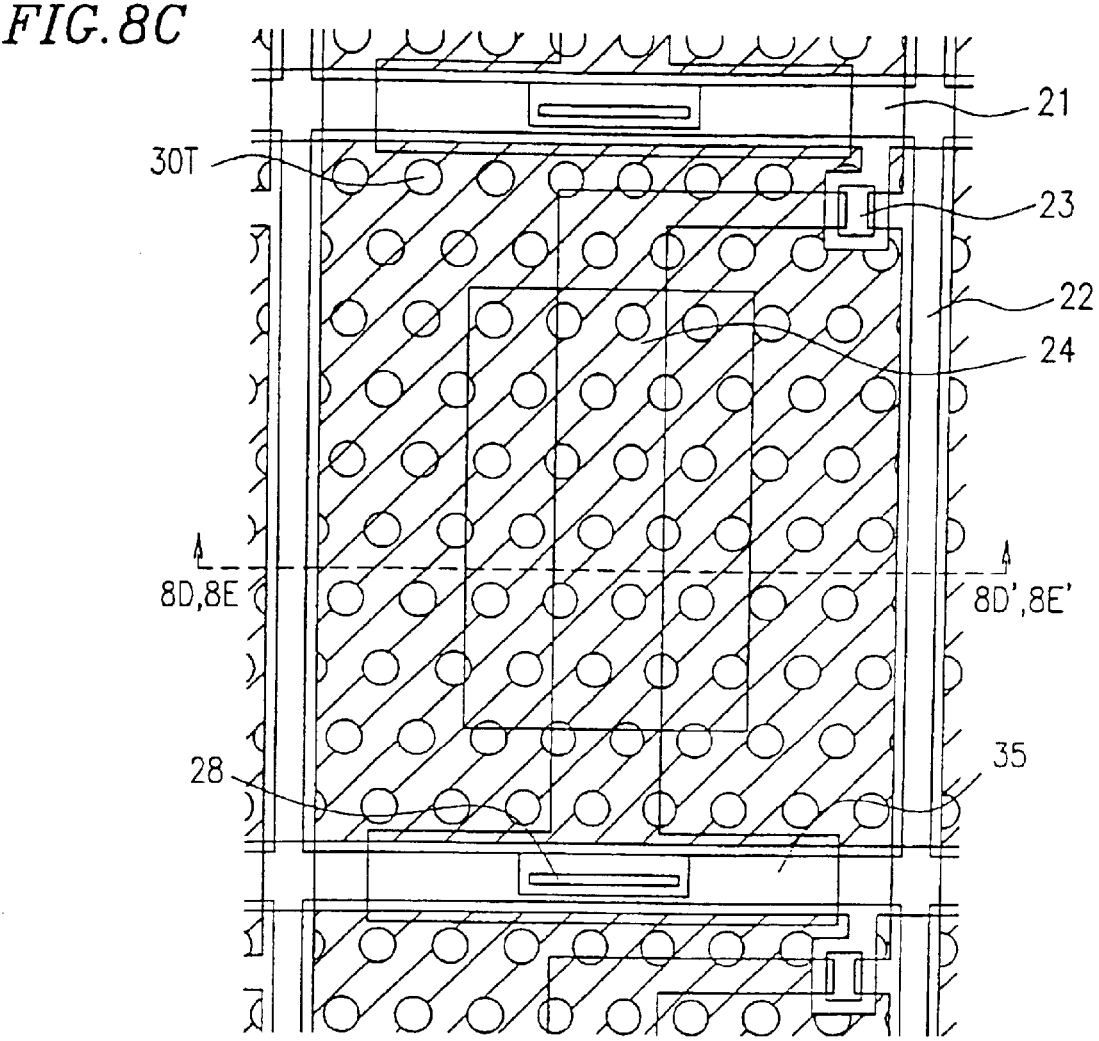
FIG. 8C is a plan view of an active matrix substrate used in a semi-transmission- and semi-reflection-type LCD device according to the present invention.
Figure 8D:
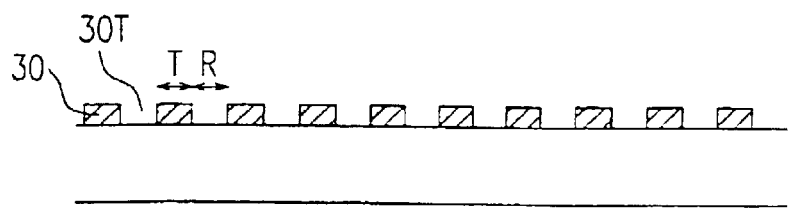
FIG. 8D is a cross-sectional view of the active matrix substrate taken along line 8D–8D' of FIG. 8C.

In the second example, a semi-transmission- and semi-reflection-type LCD device is provided. FIG. 8C is a plan view of an active matrix substrate used in the semi-transmission- and semi-reflection-type LCD device. FIG. 8D is a cross-sectional view of the active matrix substrate taken along line 8D–8D' of FIG. 8C, and FIG. 8E is a cross-sectional view of the active matrix substrate taken along line 8E–8E' of FIG. 8C.

The active matrix substrate shown in FIG. 8C includes a small transmissive electrode region 30T in the reflective electrode region 30. The reflective electrode region 30 and the transmissive electrode region 30T do not independently define the reflective region and the transmissive region, but the display in the reflection mode and the display in the transmission mode are mixed and overlapped in the entire pixel area.

The active matrix substrate shown in FIG. 8C is produced by, for example, as shown in FIG. 8D, forming a reflective electrode 30 having a plurality of openings 30T. Since a voltage is applied across the liquid crystal molecules located on the openings 30T in the reflective electrode 30 by the reflective electrode 30 (oblique electric field formed between the reflective electrode 30 and the counter electrode), formation of the transmissive electrode 31 can be omitted. In other words, the reflective electrode 30 can be formed of a semi-transmissive and semi-reflective layer. Alternatively, when the reflective electrode 30 is patterned by photolithography, openings having a prescribed shape can be formed at a prescribed density. One dimension of the openings should not be larger than the thickness of the liquid crystal layer so that a sufficient voltage can be applied across the liquid crystal layer by an oblique electric field. The electrode formed of a semi-transmissive and semi-reflective layer can be as described in Japanese Laid-Open Publication No. 7-333598. A semi-transmissive and semi-reflective layer is formed by depositing metal particles to a very small thickness within a pixel area or formed by forming microscopic holes or recesses in a scattered manner within a pixel area.

Figure 8E:
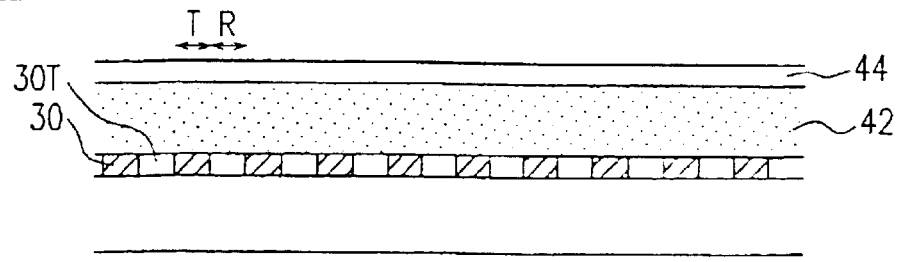
FIG. 8E is a cross-sectional view of the active matrix substrate taken along line 8E–8E' of FIG. 8C.

Alternatively, the active matrix substrate shown in FIG. 8C is produced by, for example, as shown in FIG. 8E, forming a transmissive electrode 44 on the reflective electrode region 30 having the openings in the entirety of the pixel area. In such a structure, the liquid crystal molecules on the transmissive electrode region 30T are supplied with the same level of voltage as the voltage applied across the liquid crystal molecules on the reflective electrode region 30. During the etching process for forming the transmissive electrode 44 (for example, when the reflective electrode region 30 is formed of Al and the transmissive electrode 44 is formed of ITO), electrocorrosion may occur between the reflective electrode region 30 and the transmissive electrode 44. Electrocorrosion is avoided by, as shown in FIG. 8E, forming an interlayer insulating layer 42 (for example, formed of silicon oxide or polymeric resin) on the reflective electrode region 30 and forming the transmissive electrode 44 on the interlayer insulating layer 42.

With reference to FIGS. 13A and 13B, light transmission and reflection in the LCD device in the transmission mode in the second example will be described.

FIG. 13A shows black display performed when no voltage is applied across the liquid crystal layer 5, and FIG. 13B shows white display performed when a voltage is applied across the liquid crystal layer 5. In these figures, the transmissive electrode 8 (transmissive electrode region) is formed on the right side. In FIGS. 13A and 13B, the reflective electrode region 3 has the same structure as that in the first example and thus will not be described. When the LCD device is used as the reflection-type LCD device, the LCD device operates in the same manner as in the first example. In the following description, the LCD device in the transmission mode will be described and the LCD device in the reflection mode will not be repeated.

With reference to FIG. 13A, black display will be described.

The light emitted by a light source (not shown) is incident on the polarizer 9 to be linearly polarized light parallel to the transmission axis of the polarizer 9.

The λ/4 wave plate 10 is arranged so that the slower optic axis thereof is tilted at 45 degrees with respect to the transmission axis of the polarizer 9. Thus, the light transmitted through the λ/4 wave plate 10 becomes circularly polarized light.

When no voltage is applied across the liquid crystal layer 5, the liquid crystal molecules exhibiting negative dielectric anisotropy used in the liquid crystal layer 5 are substantially vertical to the surfaces of the substrates 1 and 2. Accordingly, the refractive index anisotropy of the liquid crystal layer 5 to the incident light is very small. In other words, the phase difference caused by the transmission of the light through the liquid crystal layer 5 is substantially zero.

Accordingly, the circularly polarized light from the λ/4 wave plate 10 is transmitted through the liquid crystal layer 5 while maintaining circular polarization and is incident on the λ/4 wave plate 7.

The slower optic axis of the λ/4 wave plate 10 and the slower optic axis of the λ/4 wave plate 7 are parallel to each other. Thus, the circularly polarized light incident on the λ/4 wave plate 7 becomes linearly polarized light perpendicular to the transmission axis of the polarizer 9 and is incident on the polarizer 6.

The linearly polarized light from the λ/4 wave plate 7 is perpendicular to the transmission axis of the polarizer 6 and is absorbed by the polarizer 6 without being transmitted.

In this manner, black display is performed.

With reference to FIG. 13B, white display will be described.

The process until the light is transmitted through λ/4 wave plate 10 is the same as above and will not be described.

When a voltage is applied across the liquid crystal layer 5, the liquid crystal molecules are tilted horizontal with respect to the surfaces of the substrates 1 and 2. Accordingly, the circularly polarized light incident on the liquid crystal layer 5 becomes elliptically polarized light by the birefringence of the liquid crystal molecules. The light does not become linearly polarized light perpendicular to the transmission axis of the polarizer 6 even after being transmitted through the λ/4 wave plate 7 and thus is transmitted through the polarizer 6.

By controlling the voltage applied across the liquid crystal layer 5, the amount of light incident on the polarizer 6 can be adjusted. Thus, gray scale display is provided.

When a voltage is applied across the liquid crystal layer 5 so that the phase difference by the liquid crystal layer 5 fulfills the ½ wavelength condition, the circularly polarized light from the λ/4 wave plate 10 becomes linearly polarized light perpendicular to the transmission axis of the polarizer 6 at the half of the thickness of the liquid crystal layer 5, and then becomes circularly polarized light when being completely transmitted through the liquid crystal layer 5.

Since the circularly polarized light from the liquid crystal layer 5 becomes linearly polarized light parallel to the transmission axis of the polarizer 6 when being transmitted through the λ/4 wave plate 7, most of the light incident on the polarizer 6 is transmitted therethrough. In this case, the amount of light transmitted through the polarizer 6 is maximum.

As described above, when no voltage is applied across the liquid crystal layer 5, black display is obtained both in the reflective electrode region 3 and the transmissive electrode region 8 since there is no birefringence of the liquid crystal layer 5. When a voltage is applied across the liquid crystal layer 5 while controlling the level of the voltage, the amount of light transmitted through the LCD device is adjusted and thus gray scale display is obtained.

Figure 9:
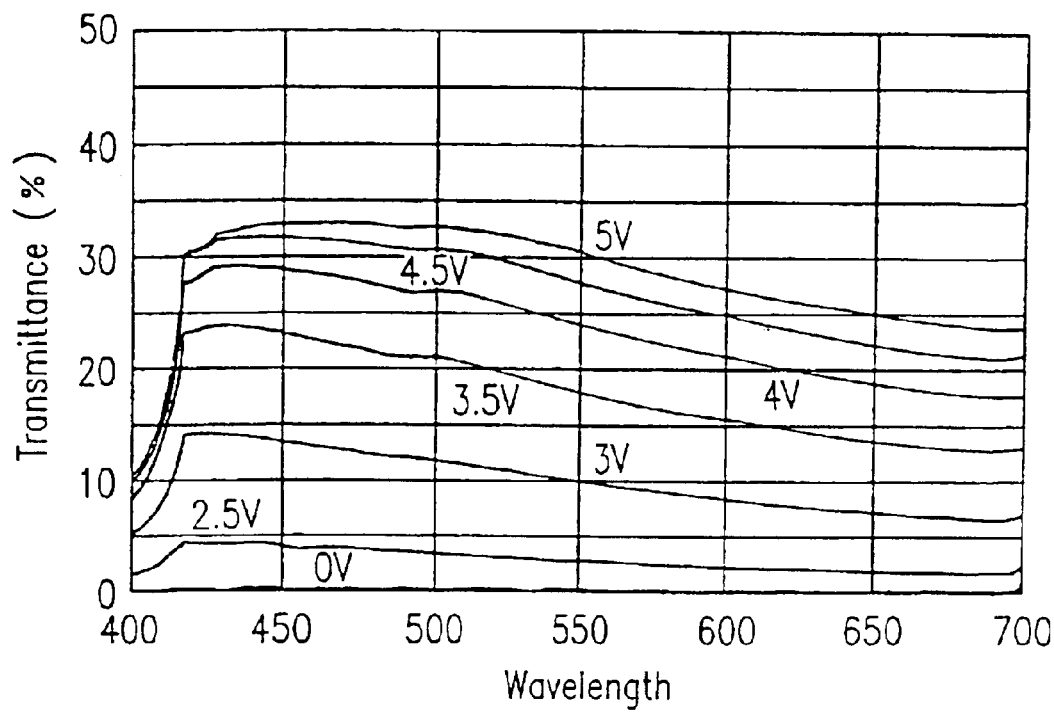
FIG. 9 is a graph illustrating a spectral reflectance characteristics of a transmission- and reflection-type LCD device according to the present invention having a gap of d=3.56 $\mu$m obtained when the light is incident and received vertically.

FIG. 9 shows the spectral reflectance characteristics of the transmission- and reflection-type LCD device in the second example, which is obtained when the cell gap of the liquid crystal layer is d=3.56 μm and the phase difference by the liquid crystal layer is dΔN=0.2752, in the case where the light is incident and received vertically.

In FIG. 9, the spectral reflectance in the reflective electrode region is the same as in FIG. 4.

In FIG. 9, the spectral reflectance to the air in the case where the light is incident and received vertically is 100.

As shown in FIG. 9, sufficient contrast is obtained in the entire wavelength range of 400 nm to 700 nm between the black display when no voltage is applied and the white display when a voltage of 5 V is applied.

When a voltage of 5 V is applied, a reflectance of about 30% is obtained which is about 80% of the transmittance of the polarizer 6. Such a high light utilization factor is suitable for a transmission- and reflection-type LCD device.

Figure 10:
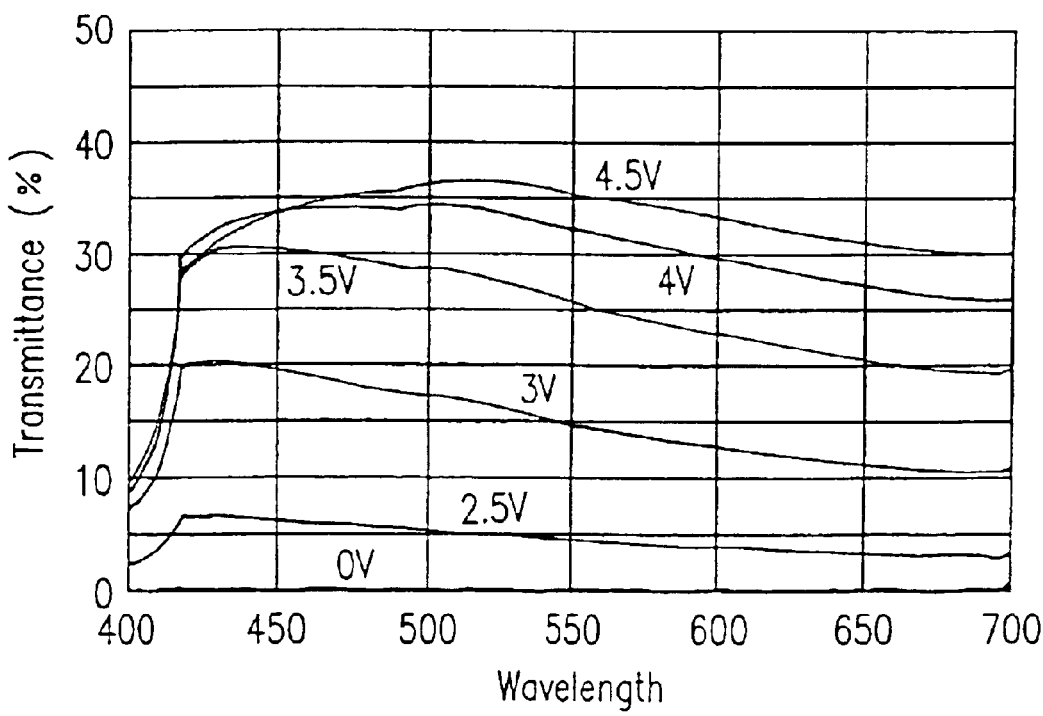
FIG. 10 is a graph illustrating a spectral reflectance characteristics of a transmission- and reflection-type LCD device according to the present invention having a gap of d=4.5 $\mu$m obtained when the light is incident and received vertically.

FIG. 10 shows the spectral reflectance characteristics of the transmission- and reflection-type LCD device in the second example, which is obtained when the cell gap of the liquid crystal layer is d=4.5 μm and the phase difference by the liquid crystal layer is dΔN=0.3749, in the case where the light is incident and received vertically.

As shown in FIG. 10, a sufficient contrast ratio is obtained in the entire wavelength range of 400 nm to 700 nm between the black display when no voltage is applied and the white display when a voltage of 5 V is applied.

When a voltage of 5 V is applied, a reflectance of about 40% is obtained.

Figure 11:
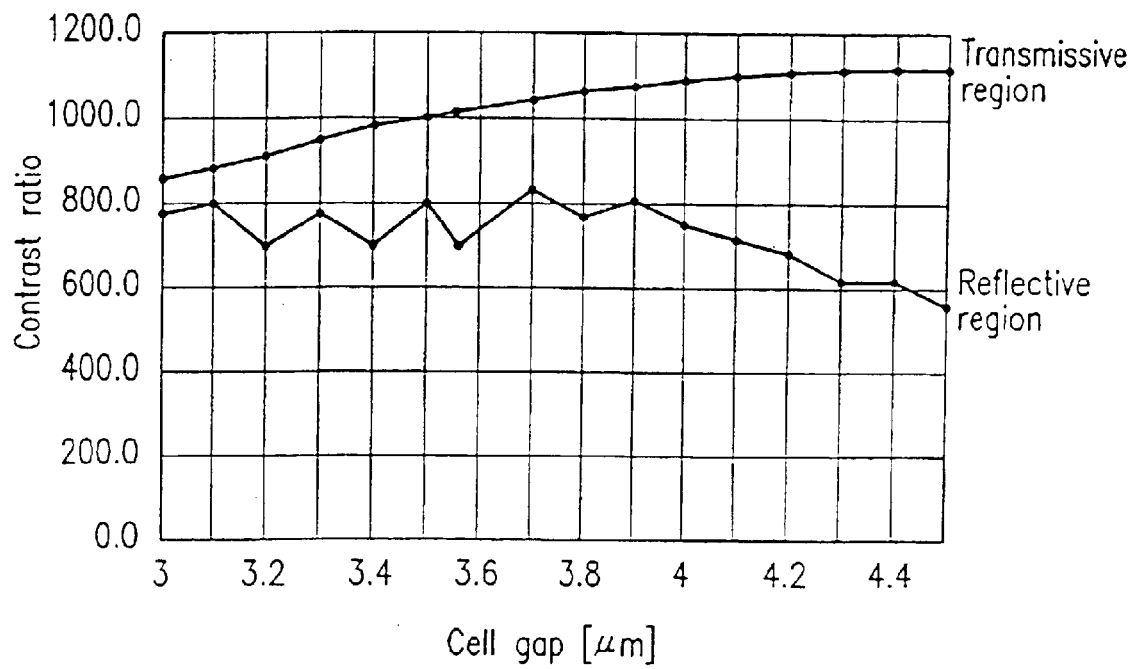
FIG. 11 is a graph illustrating the relationship between the cell gap and the contrast ratio of a transmission- and reflection-type LCD device according to the present invention obtained when the light is incident and received vertically at a wavelength of 550 nm.

FIG. 11 shows the relationship between the cell gap and the contrast ratio of the transmission- and reflection-type LCD device in the second example when the light is incident and received vertically at a wavelength of 550 nm.

The contrast ratio is measured by applying a voltage by which the phase difference dΔN by the liquid crystal layer fulfills the ½ wavelength condition.

As shown in FIG. 11, the transmission- and reflection-type LCD device in the second example maintains the contrast ratio of 800 or more in the transmissive electrode region (used as a transmission-type LCD device) and maintains the contrast ratio of 500 or more in the reflective electrode region (used as a reflection-type LCD device) regardless of the cell gap of the liquid crystal layer.

Accordingly, when a voltage is applied across the liquid crystal layer, display is provided without any reduction of contrast ratio as long as the phase difference dΔN fulfills the ½ wavelength condition. The cell gap d can be arbitrarily set.

FIG. 12 shows the relationship between the angle of the slower optic axis of the λ/4 wave plate and the contrast ratio. The angle of the slower optic axis of the λ/4 wave plate is set to 0 degrees when the slower optic axis is tilted at 45 degrees with respect to the transmission axis of the polarizer.

When the angular difference of the slower optic axis is within 3 degrees, a contrast ratio of 50 or more is obtained both in the transmissive electrode region (when the LCD device is used as a transmission-type LCD device) and in the reflective electrode region (when the LCD device is used as a reflection-type LCD device), and thus a transmission- and reflection-type LCD device having satisfactory display characteristics is provided.

Accordingly, one LCD device can be used both as a transmission-type LCD device for performing display using the light from the backlight transmitted through the transmissive electrode 8 when the ambient light is dark, and as a reflection-type LCD device for performing display using the ambient light reflected by the reflective electrode 3 formed of a material having a relatively high light reflectance when the ambient light is bright. Moreover, the LCD device can use both the backlight and the ambient light.

When the ambient light is bright, the backlight need not be used. Thus, the power consumption is reduced compared to the conventional transmission-type LCD device. When the ambient light is dark, the backlight can be used. Thus, the problem of the conventional reflection-type LCD device that the sufficient display is not obtained is overcome.

The LCD device in the second example using a vertically aligned liquid crystal layer makes the retardation by the liquid crystal layer substantially zero when no voltage is applied. In the case of normally black display, the darkness of the black state both in the transmission mode and the reflection mode is improved, thus enhancing the contrast.

EXAMPLE 3

An LCD device in a third example according to the present invention will be described with reference to FIG. 3.

Identical elements as those in the first and second examples bear identical reference numerals and detailed descriptions thereof will be omitted.

The LCD device in the third example includes a λ/4 wave plate 10 and a phase compensation element 12 between the substrate 2 and the polarizer 9 and also includes λ/4 wave plate 7 and a phase compensation element 11 between the substrate 1 and the polarizer 6.

The positions of the λ/4 wave plate 10 and the phase compensation element 12, and the positions of the λ/4 wave plate 7 and the phase compensation element 11 are exchangeable, respectively.

When no voltage is applied across the liquid crystal layer 5, the liquid crystal molecules of the liquid crystal material exhibiting negative dielectric anisotropy in the liquid crystal layer 5 are aligned substantially vertically to the surfaces of the substrates 1 and 2. Thus, the refractive index anisotropy of the liquid crystal layer 5 to the light incident on the LCD device vertically is substantially nil.

When the LCD device is used as a reflection-type LCD device, however, light incident in other directions as well as light incident vertically is used for display. When the light incident on the liquid crystal layer 5 obliquely including ambient light is used for display, the display is influenced by the refractive index anisotropy.

The viewing angle is not necessarily vertical to the surface of the substrates. As the viewing angle is offset from the vertical direction to the surface of the substrates, the display is more influenced by the refractive index anisotropy of the liquid crystal molecules in the liquid crystal layer 5. Thus, the contrast ratio is reduced.

In this example, the phase compensation elements 11 and 12 for compensating for the influence by such refractive index anisotropy of the liquid crystal molecules are provided to prevent the contrast from being reduced in accordance with the incident angle of light and the viewing direction.

In the case where the pretilt angle of the liquid crystal molecules is slightly tilted with respect to the vertical direction to the surface of the substrates so that the liquid crystal molecules are tilted in one direction when a voltage is applied across the vertically aligned liquid crystal layer 5, slight refractive index anisotropy is caused in the vertical direction to the substrates even when no voltage is applied. The phase compensation elements are also used to compensate for the refractive index anisotropy and thus to further improve the contrast in the vertical direction to the substrates.

In this example, the λ/4 wave plate and the phase compensation element are described as being separate, but the same effects are obtained when the λ/4 wave plate and the phase compensation element are in the same layer.

In this example, two phase compensation elements 11 and 12 are provided, but only one phase compensation element 11 can be satisfactory.

In the third example, the transmission- and reflection-type LCD device is described. In the case of the reflection-type LCD device in the first example also (FIG. 1), a phase compensation element can be provided between the polarizer 6 and the reflective electrode 3 to compensate for the refractive index anisotropy of the liquid crystal layer 5. Thus, reduction in the contrast is prevented.

In the first through third example, black display and white display are described. Color display is also realized by providing a color filter on appropriate areas of the reflective electrode region and the transmissive electrode region.

When a chiral dopant is added to the vertically aligned liquid crystal layer formed of a liquid crystal material exhibiting negative dielectric anisotropy of the LCD devices in the first through third examples, the liquid crystal molecules are rotated when a voltage is applied. Thus, the rotation of the liquid crystal molecules at the time of voltage application is stabilized.

When the liquid crystal layer is aligned to have a 90 degree twist, black display with very little optical leakage is obtained for the following reason. When the liquid crystal molecules are aligned to tilt at several degrees with respect to the normal direction to the surfaces of the substrates in order to prevent disclination when a voltage is applied, retardation is caused in the tilting direction of the liquid crystal molecules. However, since the liquid crystal molecules in areas in the vicinity of the top and bottom substrates make an angle of 90 degrees, the retardation is counteracted. Thus, the resultant black display has very little optical leakage.

The LCD devices in the first through third examples use a vertically aligned liquid crystal layer formed of a material having negative dielectric anisotropy. The same effects are obtained when the liquid crystal layer is treated so that the liquid crystal molecules are aligned horizontal to the surface of the substrates.

In such a case, the liquid crystal molecules are aligned horizontal to the surfaces when no voltage is applied, and the liquid crystal molecules tilt toward the normal direction to the substrates when a voltage is applied. Accordingly, white display is performed when no voltage is applied, and black display is performed when a voltage is applied.

In the case of the black display by the horizontally aligned liquid crystal layer, the remaining retardation is larger than in the case of the vertically aligned liquid crystal layer due to the liquid crystal molecules in the vicinity of the substrates. In order to perform more complete black display, a phase compensation element can be used.

In the case where the liquid crystal molecules are aligned almost vertically to the substrates and the retardation of α is remaining in the reflection mode, a phase compensation element can be used having a retardation of λ/4−α in lieu of the λ/4 wave plate 7 (FIGS. 1, 2 and 3).

In the reflection mode, elliptically polarized light which is offset from the circularly polarized light by the remaining retardation of the liquid crystal layer is incident on the liquid crystal layer. The elliptically polarized light becomes circularly polarized light when reaching the reflective electrode region after being transmitted through the liquid crystal layer. As a result of the reflection, the light becomes circularly polarized light having an opposite rotation direction. The light becomes elliptically polarized light offset from the circularly polarized light when being transmitted through and going out of the liquid crystal layer. The elliptically polarized light at this point is phase-offset at 90 degrees from the light which was incident. When being transmitted through the phase compensation element, the elliptically polarized light becomes linearly polarized light perpendicular to the transmission axis of the polarizer 6.

As can be appreciated, even when the retardation remaining in the vertically aligned liquid crystal layer is not negligible, high contrast display is obtained in the reflection mode by providing a phase compensation element in consideration of the retardation.

An LCD device shown in FIG. 2 including a horizontally aligned liquid crystal layer 5 will be described.

The liquid crystal layer 5 is formed of a material available from Merck & Co., Inc. and has Ne=1.5328, No=1.4722 and ΔN=0.0606. The thickness of the liquid crystal layer 5 in the transmissive region is about 5.2 μm.

The alignment layers provided on the substrates 1 and 2 are treated by rubbing in the direction perpendicular to the gate line (or source line). The substrates 1 and 2 are combined so that the alignment layers on the substrates 1 and 2 are opposite to each other (anti-parallel). When no voltage is applied across the liquid crystal layer 5, the molecular axis of the liquid crystal molecules in the liquid crystal layer 5 is aligned parallel to the surfaces of the substrates 1 and 2 and perpendicular to the gate line. When a voltage is applied, the molecular axis of the liquid crystal molecules tilts in the normal direction to the surfaces of the substrates 1 and 2 while being substantially perpendicular to the gate line. In this example, the axes of the polarizers 6 and 9 and the phase compensation elements 7 and 10 are set with the conditions that the voltage to be applied across the liquid crystal layer 5 for white display is about 1.8 V and the voltage to be applied across the liquid crystal layer 5 for black display is about 5.3 V.

The transmission axis of the polarizer 6 is set to be about 45 degrees clockwise with respect to the molecular axis of the liquid crystal molecules, and the slower optic axis of the phase compensation element 7 is set to be about 45 degrees clockwise with respect to the transmission axis of the polarizer 6. In other words, the slower optic axis of the phase compensation element 7 is set to be about 90 degrees clockwise with respect to the molecular axis of the liquid crystal molecules.

In consideration of the retardation by the liquid crystal layer 5 in the reflective region in the black display, two types of phase compensation elements having a retardation of about 105 nm and a retardation of about 95 nm are used. Such retardations are offset from the λ/4 condition (about 137.5 nm). By using a phase compensation element having a retardation of λ/4−α, satisfactory contrast is realized in the reflective region.

The slower optic axis of the phase compensation element 10 and the transmission axis of the polarizer 9 are set in consideration of the retardation by the liquid crystal layer 5 in the transmission region in the black display. For a transmission- and reflection-type LCD device, first, the orientation of the polarizer 6 and the retardation and slower optic axis of the phase compensation element 7 are determined with respect to the reflection region. Then, the retardation and slower orientation of the polarizer 6 and the retardation and slower optic axis of the phase compensation element 10 and the orientation of the polarizer 9 are determined with respect to the transmission region. A change in the polarization state of the light transmitted through each layer in the transmissive region is equivalent when the light is incident on the display surface and when the light is incident from the backlight. The following description will be given regarding the light incident on the display surface for better understanding.

The linearly polarized light incident on the liquid crystal layer 5 in the black state through the polarizer 6 goes out of the liquid crystal layer 6 as elliptically polarized light having a longer axis or shorter axis at 45 degrees clockwise with respect to the molecular axis of the liquid crystal molecules. The elliptically polarized light can be converted into linearly polarized light by providing the phase compensation element 10 formed of a λ/4 wave plate having a retardation of about 140 nm and locating the slower optic axis thereof in the same direction as the longer axis of the elliptically polarized light going out of the liquid crystal layer 5, i.e., at 45 degrees clockwise with respect to the molecular axis of the liquid crystal molecules. Then, the polarizer 9 is located so that the transmission axis thereof is perpendicular to the polarizing axis of the linearly polarized light going out of the phase compensation element 10.

The angle of the polarizing axis of the linearly polarized light going out of the phase compensation element 10 depends on the polarization state of the elliptically polarized light incident on the phase compensation element 10. In this example, when the retardation of the phase compensation element 7 is about 105 nm, the polarizing axis of the linearly polarized light going out of the phase compensation element 10 is at about 10 degrees clockwise with respect to the molecular axis of the liquid crystal molecules. Accordingly, by setting the transmission axis of the polarizer 9 at about 10 degrees clockwise with respect to the molecular axis of the liquid crystal molecules, satisfactory black display is obtained in the transmission region. When the retardation of the phase compensation element 7 is about 95 nm, the polarizing axis of the linearly polarized light going out of the phase compensation element 10 is at about 97 degrees clockwise with respect to the molecular axis of the liquid crystal molecules. Accordingly, by setting the transmission axis of the polarizer 9 at about 7 degrees clockwise with respect to the molecular axis of the liquid crystal molecules, satisfactory black display is obtained in the transmission region.

An LCD device shown in FIG. 3 including a horizontally aligned liquid crystal layer 5 will be described.

The liquid crystal layer 5 is formed of a material available from Merck & Co., Inc. and has Ne=1.5328, No=1.4722 and ΔN=0.0606. The thickness of the liquid crystal layer 5 is about 5.2 μm. The alignment layers are positioned to be anti-parallel. The axes of the polarizers 6 and 9 and the phase compensation elements 7, 10, 11 and 12 are set with the conditions that the voltage to be applied across the liquid crystal layer 5 for white display is about 1.8 V and the voltage to be applied across the liquid crystal layer 5 for black display is about 5.3 V.

The transmission axis of the polarizer 6 is set to be about 15 degrees clockwise with respect to the molecular axis of the liquid crystal molecules. The phase compensation element 11 is formed of a λ/2 wave plate having a retardation of about 270 nm. The phase compensation element 11 is positioned so that the slower optic axis thereof is at about 30 degrees clockwise with respect to the molecular axis of the liquid crystal molecules. Furthermore, the phase compensation element 7 is positioned so that the slower optic axis thereof is at about 90 degrees clockwise with respect to the molecular axis of the liquid crystal molecules. The positioning is performed from the order of the polarizer 6, the phase compensation element 11 and the phase compensation element 7. In consideration of the retardation by the liquid crystal layer 5 in the reflective region in the black display, two types of phase compensation elements having a retardation of about 105 nm and a retardation of about 95 nm are used. Such retardations are offset from the λ/4 condition (about 137.5 nm). By using a phase compensation element having a retardation of λ/4−α, satisfactory contrast is realized in the reflective region.

The slower optic axis of the phase compensation elements 10 and 12 and the transmission axis of the polarizer 9 are set in consideration of the retardation by the liquid crystal layer 5 in the transmission region in the black display. The positioning is performed from the order of the phase compensation element 10, the phase compensation element 12, and the polarizer 9.

The linearly polarized light incident on the liquid crystal layer 5 in the black state through the polarizer 6 goes out of the liquid crystal layer 6 as elliptically polarized light having a longer axis or shorter axis at 45 degrees clockwise with respect to the molecular axis of the liquid crystal molecules. The elliptically polarized light can be converted into linearly polarized light by providing the phase compensation element 10 formed of a λ/4 wave plate having a retardation of about 140 nm and locating the slower optic axis thereof in the same direction as the longer axis of the elliptically polarized light going out of the liquid crystal layer 5, i.e., at 45 degrees clockwise with respect to the molecular axis of the liquid crystal molecules. Then, the phase compensation element 12 formed of a λ/2 wave plate having a retardation of about 270 nm is located so that the slower optic axis thereof is at 114 degrees clockwise with respect to the molecular axis of the liquid crystal molecules. Then, the polarizer 9 is located so that the transmission axis thereof is perpendicular to the polarizing axis of the linearly polarized light going out of the phase compensation element 12.

The angle of the polarizing axis of the linearly polarized light going out of the phase compensation element 12 depends on the polarization state of the elliptically polarized light incident on the phase compensation element 10. In this example, when the retardation of the phase compensation element 7 is about 105 nm, the polarizing axis of the linearly polarized light going out of the phase compensation element 10 is at about 10 degrees clockwise with respect to the molecular axis of the liquid crystal molecules. The polarizing axis of the linearly polarized light going out of the phase compensation element 12 is at about 128 degrees clockwise with respect to the molecular axis of the liquid crystal molecules. Accordingly, by setting the transmission axis of the polarizer 9 at about 38 degrees clockwise with respect to the molecular axis of the liquid crystal molecules, satisfactory black display is obtained in the transmission region. When the retardation of the phase compensation element 7 is about 95 nm, the polarizing axis of the linearly polarized light going out of the phase compensation element 10 is at about 97 degrees clockwise with respect to the molecular axis of the liquid crystal molecules. The polarizing axis of the linearly polarized light going out of the phase compensation element 12 is at about 125 degrees clockwise with respect to the molecular axis of the liquid crystal molecules. Accordingly, by setting the transmission axis of the polarizer 9 at about 35 degrees clockwise with respect to the molecular axis of the liquid crystal molecules, satisfactory black display is obtained in the transmission region.

In the case where the liquid crystal layer has a remaining retardation of α in the reflection mode and a remaining retardation of β in the transmission mode, a phase compensation element having a retardation of λ/4−α can be provided in lieu of the λ/4 wave plate 7 and a phase compensation element having a retardation of λ/4(β−α) can be provided in lieu of the λ/4 wave plate 10.

In the transmission mode using the light transmitted through a region having a transmission function such as the transmissive electrode region, when the liquid crystal molecules are aligned vertically to the substrates, a phase compensation element having a retardation of λ/4−(β−α) is set so that the light going out of the liquid crystal layer is elliptically polarized light in the same state as in the reflection mode. The elliptically polarized light having such a phase difference is incident on the phase compensation element having a retardation of λ/4−α. Thus, when being transmitted through the phase compensation element having a retardation of λ/4−α, the light becomes linearly polarized light perpendicular to the transmission axis of the polarizer 6. Accordingly, black display with very little optical leakage is obtained.

As can be appreciated, even when the retardation remaining in the vertically aligned liquid crystal layer is not negligible, high contrast display is obtained in the reflection mode by providing a phase compensation element in consideration of the retardation.

EXAMPLE 4

An LCD device in a fourth example according to the present invention will be described with reference to FIG. 2. Identical elements as those in the first example bear identical reference numerals.

A substrate 2 includes a reflective electrode 3 (shown as reflective electrode region in FIG. 2) formed of a material having a high reflectance such as, for example, Al or Ta and a transmissive electrode 8 (shown as transmissive electrode region in FIG. 2) formed of a material having a high transmittance such as, for example, ITO. A substrate 1 includes a counter electrode 4 (shown as transmissive electrode in FIG. 2). A liquid crystal layer 5 formed of a liquid crystal material exhibiting negative dielectric anisotropy is interposed between the reflective electrode 3/transmissive electrode 8 and the counter electrode 4.

Alignment layers (not shown) are provided on surfaces of the reflective electrode 3/transmissive electrode 8 and the counter electrode 4 which are in contact with the liquid crystal layer 5. The alignment layers are used to align liquid crystal molecules (not shown) in the liquid crystal layer 5 vertically to surfaces of the substrates 1 and 2. After the alignment layers are provided, at least one of the alignment layers is processed with alignment treatment such as, for example, rubbing. The alignment direction can be defined by optical alignment or electrode shape in lieu of rubbing.

Due to the alignment treatment, the liquid crystal molecules in the liquid crystal layer 5 have a tilt angle of about 0.1 to 5 degrees with respect to the vertical direction to the surfaces of the substrates 1 and 2.

The reflective electrode 3 is used for applying a voltage to the liquid crystal layer 5, but the reflective electrode 3 can be used only as a reflective plate but not as an electrode for applying a voltage. In such a case, for example, the transmissive electrode 8 can be extended onto the reflective electrode 3 to act as an electrode for applying a voltage to the liquid crystal layer 5 in the reflective region.

The liquid crystal material used herein has a refractive index anisotropy of Ne (refractive index with respect to extraordinary ray)=1.5546 and No (refractive index with respect to ordinary ray)=1.4773.

A λ/4 wave plate 7 is provided on the surface of the substrate 1 opposite to the counter electrode 4. A λ/4 wave plate 10 is provided on the surface of the substrate 2 opposite to the reflective electrode 3 and the transmissive electrode 8. A slower optic axis of the λ/4 wave plate 10 is set to be perpendicular to the slower optic axis of the λ/4 wave plate 7.

A polarizer 6 is provided on a surface of the λ/4 wave plate 7 opposite to the substrate 1. A polarizer 9 is provided on a surface of the λ/4 wave plate 10 opposite to the substrate 2. A transmission axis of the polarizers 6 is set to be tilted at 45 degrees with respect to the slower optic axis of the λ/4 wave plate 7. A transmission axis of the polarizer 9 is set to be tilted at 45 degrees with respect to the slower optic axis of the λ/4 wave plate 10. The slower optic axes of the λ/4 wave plates 7 and 10 are perpendicular to each other and the transmission axes of the polarizers 6 and 9 are perpendicular to each other. Therefore, when the angle of the slower optic axis of the phase compensation element 7 with respect to the transmission axis of the polarizer 6 is +45 degrees, the angle of the slower optic axis of the phase compensation element 10 with respect to the transmission axis of the polarizer 9 is also +45 degrees. When the angle of the slower optic axis of the phase compensation element 7 with respect to the transmission axis of the polarizer 6 is −45 degrees, the angle of the slower optic axis of the phase compensation element 10 with respect to the transmission axis of the polarizer 9 is also −45 degrees.

FIG. 8A is a plan view of an active matrix substrate (substrate 2) in the fourth example, and FIG. 8B is a cross-sectional view of the active matrix substrate taken along line 8B–8B' of FIG. 8A.

As shown in FIGS. 8A and 8B, the active matrix substrate includes a gate line 21, a data line 22, a driving element 23, a drain electrode 24, a storage capacitance electrode 25, a gate insulating layer 26, an insulating substrate 27, a contact hole 28, an interlayer insulating layer 29, a reflective pixel electrode (reflective electrode region) 30 (corresponding to the reflective electrode 3 in FIG. 2), and a transmissive pixel electrode (transmissive electrode region) 31 (corresponding to the transmissive electrode 8 in FIG. 2).

The storage capacitance electrode 25 is electrically connected to the drain electrode 24, and overlaps the gate line 21 with the gate insulating layer 26 being interposed therebetween. Thus, the storage capacitance electrode 25, the insulating layer 26 and the gate line 21 form a storage capacitance.

The contact hole 28 is formed in the interlayer insulating layer 29 for connecting the transmissive pixel electrode 31 and the storage capacitance electrode 25.

The active matrix substrate includes a reflective pixel electrode 30 for reflecting the external light and a transmissive pixel electrode 31 for allowing the light from the backlight to be transmitted therethrough in one pixel area.

In FIG. 8B, the reflective electrode 30 has a flat surface, but can have a wave-like surface in order to improve the reflectance. One pixel electrode includes the reflective pixel electrode 30 and the transmissive pixel electrode 31 in this example. Alternatively, a semi-transmissive and semi-reflective electrode is usable.

With reference to FIGS. 14A, 14B, 15A and 15B, light transmittance and reflectance in the transmission mode and the reflectance mode of the LCD device in the fourth example will be described.

Figure 14A:
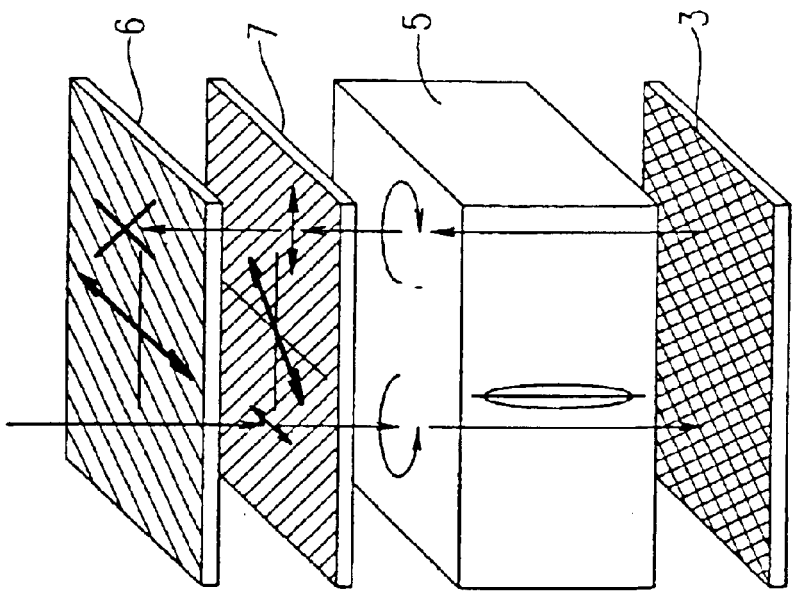
FIG. 14A is a schematic view illustrating light transmission and reflection in black display in the reflection mode in an LCD device in a fourth example according to the present invention.
Figure 14B:
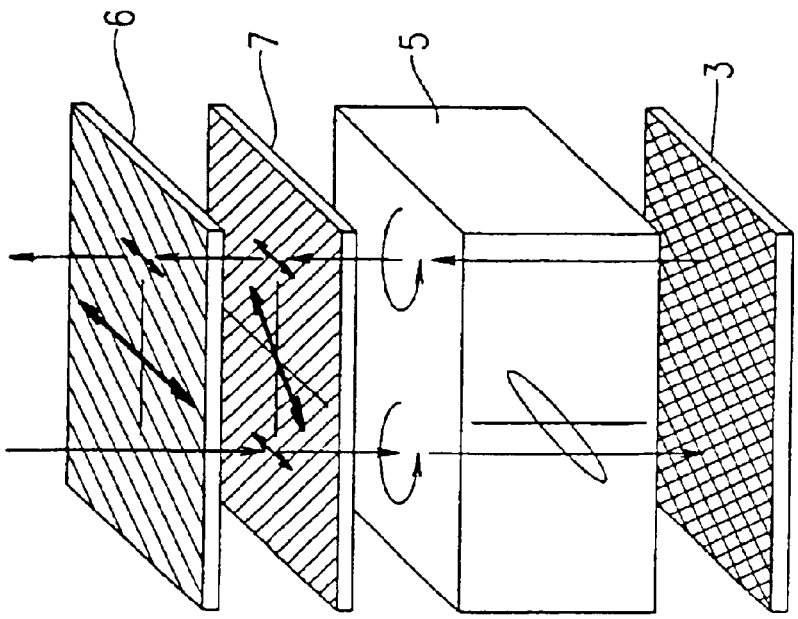
FIG. 14B is a schematic view illustrating light transmission and reflection in white display in the reflection mode in the LCD device in the fourth example according to the present invention.
Figure 15A:
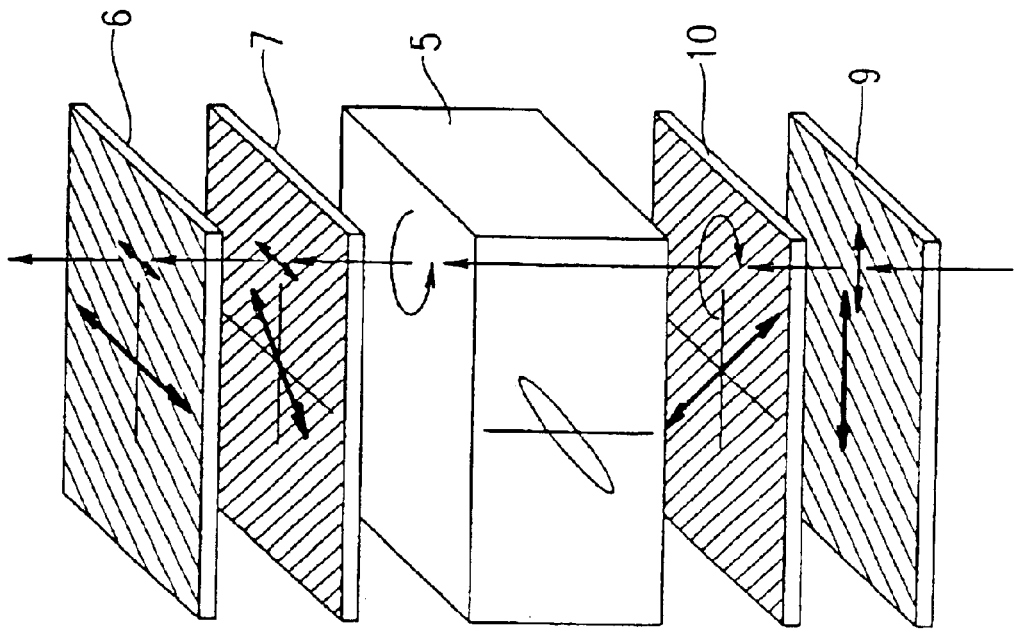
FIG. 15A is a schematic view illustrating light transmission and reflection in black display in the transmission mode in the LCD device in the fourth example according to the present invention.
Figure 15B:
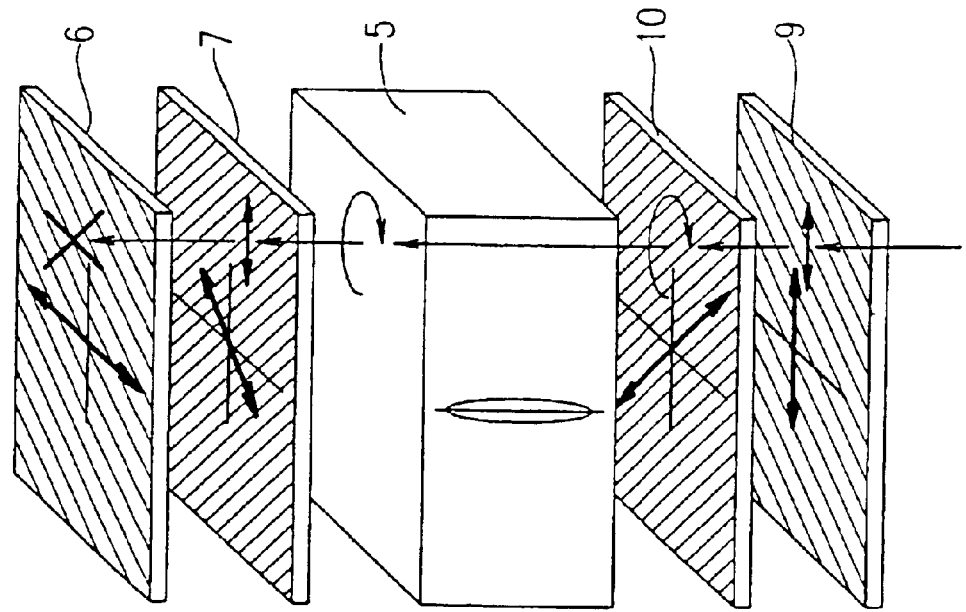
FIG. 15B is a schematic view illustrating light transmission and reflection in white display in transmission mode in the LCD device in the fourth example according to the present invention.

FIGS. 14A and 14B show the reflection mode using the reflective electrode. FIG. 14A shows the black display when no voltage is applied across the vertically aligned liquid crystal layer, and FIG. 14B shows the white display when a voltage is applied across the vertically aligned liquid crystal layer. FIGS. 15A and 15B show the transmission mode using the transmissive electrode. FIG. 15A shows the black display when no voltage is applied across the vertically aligned liquid crystal layer, and FIG. 15B shows the white display when a voltage is applied across the vertically aligned liquid crystal layer.

With reference to FIG. 14A, black display in, the reflection mode will be described.

The light incident on the polarizer 6 is transmitted through the polarizer 6 to be linearly polarized light parallel to the transmission axis of the polarizer 6 and then is incident on the λ/4 wave plate 7.

The λ/4 wave plate 7 is arranged so that the transmission axis of the polarizer 6 and the slower optic axis of the λ/4 wave plate 7 make an angle of 45 degrees. Thus, the light transmitted through the λ/4 wave plate 7 becomes circularly polarized light.

When no voltage is applied across the liquid crystal layer 5, the liquid crystal molecules exhibiting negative dielectric anisotropy used in the liquid crystal layer 5 are substantially vertical to the surfaces of the substrates 1 and 2. Accordingly, the refractive index anisotropy of the liquid crystal layer 5 to the incident light is very small. In other words, the phase difference caused by the transmission of the light through the liquid crystal layer 5 is substantially zero.

Accordingly, the circularly polarized light from the λ/4 wave plate 7 is transmitted through the liquid crystal layer 5 as almost being circularly polarized and reflected by the reflective electrode 3 in the substrate 2.

The circularly polarized light reflected by the reflective electrode 3 becomes circularly polarized light having an opposite rotation direction, and is transmitted through the λ/4 wave plate 7 to be linearly polarized light perpendicular to the light which was incident on the λ/4 wave plate 7 from the polarizer 6.

The linearly polarized light from the λ/4 wave plate 7 is perpendicular to the transmission axis of the polarizer 6. Such light is absorbed by the polarizer 6 without being transmitted.

In this manner, black display is performed.

With reference to FIG. 14B, white display in the reflection mode will be described.

The process until the light is transmitted through λ/4 wave plate 7 to be circularly polarized light is the same as above and will not be described.

When a voltage is applied across the liquid crystal layer 5, the liquid crystal molecules are slightly tilted toward the horizontal direction with respect to the surfaces of the substrates 1 and 2. Accordingly, the circularly polarized light incident on the liquid crystal layer 5 from the λ/4 wave plate 7 becomes elliptically polarized light by the birefringence of the liquid crystal molecules. The light is then reflected by the reflective electrode 3, and further influenced by the birefringence of the liquid crystal molecules in the liquid crystal layer 5. After being transmitted through the λ/4 wave plate 7, the light does not become linearly polarized light perpendicular to the transmission axis of the polarizer 6. Thus, the light is transmitted through the polarizer 6.

By controlling the voltage applied across the liquid crystal layer 5, the amount of light transmitted through the polarizer 6 after being reflected by the reflective electrode 3 can be adjusted. Thus, gray scale display is provided.

When a voltage is applied across the liquid crystal layer 5 by the reflective electrode 3 and the counter electrode 4 to change the alignment of the liquid crystal molecules so that the phase difference by the liquid crystal layer 5 fulfills the ¼ wavelength condition, the circularly polarized light from the λ/4 wave plate 7 becomes linearly polarized light perpendicular to the transmission axis of the polarizer 6 when reaching the reflective electrode 3 after being transmitted through the liquid crystal layer 5. The light is again transmitted through the liquid crystal layer 5 to be circularly polarized light and then transmitted through the λ/4 wave plate 7 to be linearly polarized light parallel to the transmission axis of the polarizer 6. In this case, the amount of light transmitted through the polarizer 6 is maximum.

FIG. 14B shows the case having the liquid crystal layer retardation conditions by which a maximum amount of light reflected by the reflective electrode 3 is transmitted through the polarizer 6. In other words, the light on the reflective electrode 3 is linearly polarized light perpendicular to the transmission axis of the polarizer 6.

As described above, when no voltage is applied across the liquid crystal layer 5, black display is obtained since the liquid crystal layer 5 has substantially no birefringence; and when a voltage is applied across the liquid crystal layer 5, gray scale display is obtained by changing the light transmittance in accordance with the voltage.

With reference to FIG. 15A, black display in the transmission mode will be described.

The light emitted by a light source (not shown) is incident on the polarizer 9 to be linearly polarized light parallel to the transmission axis of the polarizer 9.

The $\lambda/4$ wave plate 10 is arranged so that the slower optic axis thereof is tilted at 45 degrees with respect to the transmission axis of the polarizer 9. Thus, the light transmitted through the $\lambda/4$ wave plate 10 is circularly polarized light.

When no voltage is applied across the liquid crystal layer 5, the liquid crystal molecules exhibiting negative dielectric anisotropy used in the liquid crystal layer 5 are substantially vertical to the surfaces of the substrates 1 and 2. Accordingly, the refractive index anisotropy of the liquid crystal layer 5 to the incident light is very small. In other words, the phase difference caused by the transmission of the light through the liquid crystal layer 5 is substantially zero.

Accordingly, the circularly polarized light from the $\lambda/4$ wave plate 10 is transmitted through the liquid crystal layer 5 while maintaining circular polarization and is incident on the $\lambda/4$ wave plate 7.

The slower optic axis of the $\lambda/4$ wave plate 10 and the slower optic axis of the $\lambda/4$ wave plate 7 are set to be perpendicular to each other. Thus, the circularly polarized light incident on the $\lambda/4$ wave plate 7 becomes linearly polarized light perpendicular to the transmission axis of the polarizer 9 and is incident on the polarizer 6.

The linearly polarized light from the $\lambda/4$ wave plate 7 is perpendicular to the transmission axis of the polarizer 6 and is absorbed by the polarizer 6 without being transmitted.

In this manner, black display is performed.

With reference to FIG. 15B, white display in the transmission mode will be described.

The process until the light is transmitted through $\lambda/4$ wave plate 10 is the same as in FIG. 15A and will not be described.

When a voltage is applied across the liquid crystal layer 5, the liquid crystal molecules are slightly tilted toward the horizontal direction with respect to the surfaces of the substrates 1 and 2. Accordingly, the circularly polarized light incident on the liquid crystal layer 5 from the $\lambda/4$ wave plate 10 becomes elliptically polarized light by the birefringence of the liquid crystal molecules. The light does not become linearly polarized light perpendicular to the transmission axis of the polarizer 6 even after being transmitted through the $\lambda/4$ wave plate 7 and thus is transmitted through the polarizer 6.

By controlling the voltage applied across the liquid crystal layer 5, the amount of light transmitted through the polarizer 6 can be adjusted. Thus, gray scale display is provided.

When a voltage is applied across the liquid crystal layer 5 so that the phase difference by the liquid crystal layer 5 fulfills the ½ wavelength condition, the circularly polarized light from the $\lambda/4$ wave plate 10 becomes linearly polarized light perpendicular to the transmission axis of the polarizer 6 at the half of the thickness of the liquid crystal layer 5, and then becomes circularly polarized light when being completely transmitted through the liquid crystal layer 5.

Since the circularly polarized light from the liquid crystal layer 5 becomes linearly polarized light parallel to the transmission axis of the polarizer 6 when being transmitted through the $\lambda/4$ wave plate 7, most of the light incident on the polarizer 6 is transmitted therethrough. In this case, the amount of light transmitted through the polarizer 6 is maximum.

FIG. 15B shows the case having the liquid crystal layer retardation conditions by which a maximum amount of light transmitted through the polarizer 9 is transmitted through the polarizer 6.

As described above, when no voltage is applied across the liquid crystal layer 5, black display is obtained; and when a voltage is applied across the liquid crystal layer 5, gray scale display is obtained by changing the light transmittance in accordance with the voltage.

Figure 16:
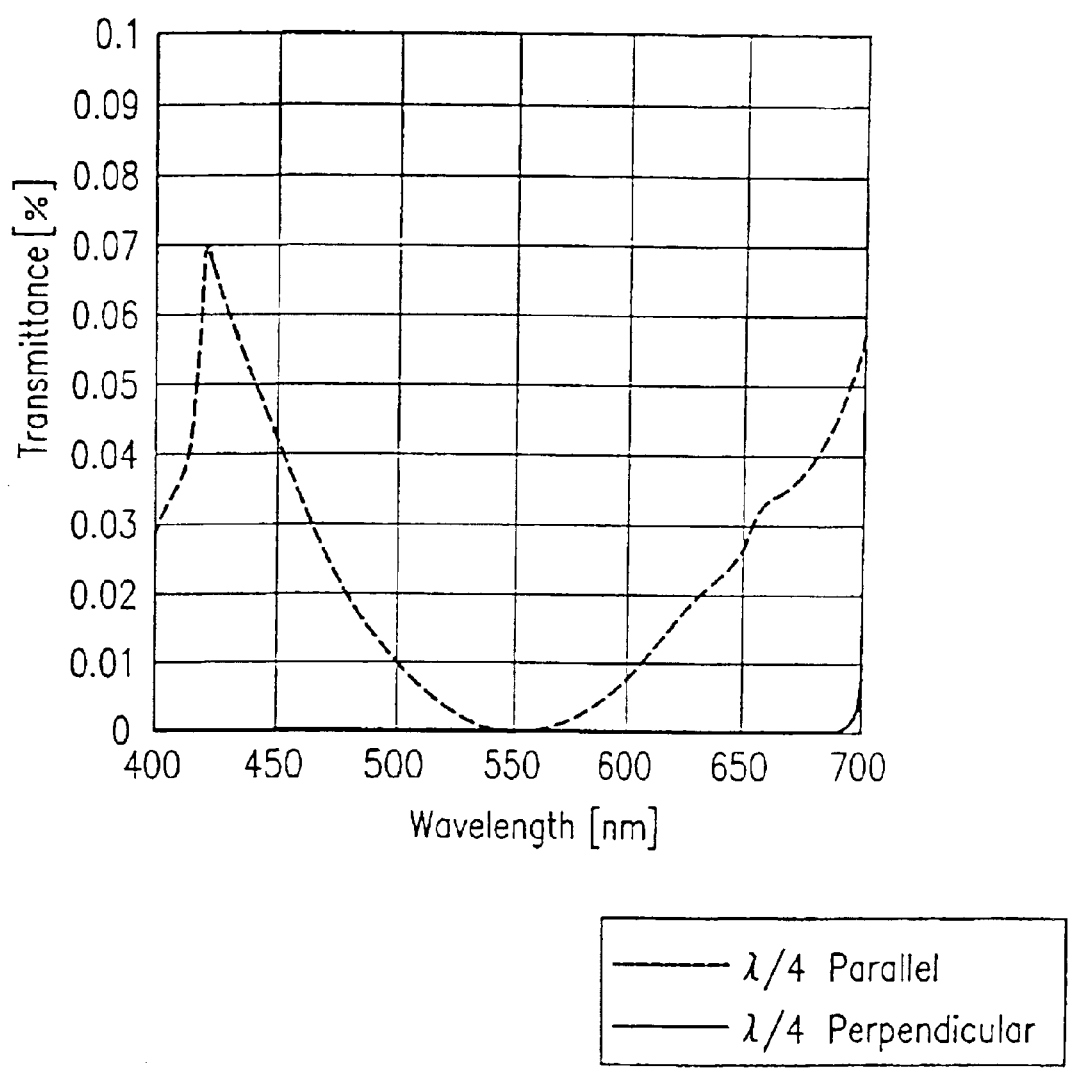
FIG. 16 is a graph illustrating the relationship between the wavelength and the transmittance in black display in the fourth example.

FIG. 16 shows the relationship between the wavelength and the transmittance of the light when the slower optic axes of the $\lambda/4$ wave plates 7 and 10 are perpendicular to each other as in the fourth example and when the slower optic axes of the $\lambda/4$ wave plates 7 and 10 are parallel to each other for comparison.

In the fourth example, since the slower optic axes of the $\lambda/4$ wave plates 7 and 10 are perpendicular to each other, the wavelength dependency of the refractive index anisotropy of one phase compensation element is counteracted by the wavelength dependency of the refractive index anisotropy of the other phase compensation element. Thus, a prescribed phase difference is fulfilled in the entire region of the wavelengths from 400 nm to 700 nm (visible light). Thus, the darkness of the black display is improved.

The phase difference by the liquid crystal layer 5 at which the reflectance is maximum in the bright display in the reflection mode is $\lambda/4$, and the phase difference by the liquid crystal layer 5 at which the reflectance is maximum in the bright display in the transmission mode is $\lambda/2$. As is appreciated from this, when the thickness of the liquid crystal layer in the reflective region and the thickness of the liquid crystal in the transmissive region are equal to each other, the phase differences of $\lambda/4$ for the reflection mode and $\lambda/4$ for the transmission mode cannot be fulfilled at the same time.

In the case where display is performed by changing the phase difference of the liquid crystal layer in the reflective region from 0 to $\lambda/4$, a satisfactory light utilization factor cannot be obtained in the transmission mode since the phase difference of the liquid crystal layer in the transmissive region also changes only from 0 to $\lambda/4$.

Satisfactory light utilization factors both in the reflection mode and the transmission mode are achieved by changing the thickness of the liquid crystal layer in the reflective region from the thickness in the transmissive region, or by applying different voltages to the liquid crystal layer in the reflection region and to the liquid crystal layer in the transmissive region. In the case where the thickness of the liquid crystal layer in the transmission region is made twice the thickness of the liquid crystal layer in the reflective region, the phase differences of the liquid crystal layer of $\lambda/4$ for the reflection mode and of $\lambda/2$ for the transmission mode are fulfilled at the same time. It is not necessary to make the thickness for the transmission mode twice the thickness for the reflection mode. The light utilization factor is raised by making the thickness for the transmission mode larger than the thickness for the reflection mode.

The refractive indices of birefringent materials forming the λ/4 wave plates 7 and 10 with respect to the ordinary ray and extraordinary ray strongly depend on the wavelength. Therefore, the phase delay accumulated in the wavelength at a specific thickness also depends on the wavelength. The phase delay of λ/4 can be completely provided to the linearly polarized light face of the incident light only when the incident light has a single specified wavelength. Accordingly, in the area where the phase delay of λ/4 is not achieved due to the wavelength dependency of the refractive index anisotropy of the birefringent material forming the λ/4 wave plates 7 and 10, a part of the light is transmitted through the polarizer 6 without being absorbed by polarizer 6. As a result, the darkness of the black display changes. In the fourth example, the slower optic axes of the λ/4 wave plates 7 and 10 are set to be perpendicular to each other, and the transmission axes of the polarizers 6 and 9 are set to be perpendicular to each other. Due to such a structure, in the transmission mode, the wavelength dependency of the refractive index anisotropy of the λ/4 wave plate 10 is counteracted by the wavelength dependency of the refractive index anisotropy of the λ/4 wave plate 7. Thus, the λ/4 condition is fulfilled in the entire range from 400 nm to 700 nm. Thus, the darkness of the black display is improved.

When another phase compensation element is provided at least one of between the polarizer 6 and the liquid crystal layer 5 and between the polarizer 9 and the liquid crystal layer 5 to improve the viewing angle, satisfactory display is realized in a wide viewing angle.

In the fourth example, the liquid crystal layer 5 is vertically aligned. In the case where the liquid crystal molecules in the vicinity of the substrates have a certain tilt angle with respect to the vertical direction to the substrates, the retardation is not completely zero even when no voltage is applied. By providing a phose compensation element in lieu of the λ/4 wave plate 7 for compensating for the retardation, better black display is obtained.

In the case where the liquid crystal layer has a remaining retardation of α in the reflection mode, a phase compensation element having a retardation of λ/4–α can be provided in lieu of the λ/4 wave plate 7.

In the reflection mode, elliptically polarized light which is offset from the circularly polarized light by the remaining retardation of the liquid crystal layer is incident on the liquid crystal layer. The elliptically polarized light becomes circularly polarized light when reaching the reflective electrode after being transmitted through the liquid crystal layer. As a result of the reflection, the light becomes circularly polarized light having an opposite rotation direction. The light becomes elliptically polarized light offset from the circularly polarized light when being transmitted through and going out of the liquid crystal layer. The elliptically polarized light at this point has the phase at the time of incidence offset at 90 degrees. When being transmitted through the phase compensation element, the elliptically polarized light becomes linearly polarized light perpendicular to the transmission axis of the polarizer 6.

In the case where mainly reflection-mode display is performed, such as, for example, when the reflective pixel electrodes are larger than the transmissive pixel electrodes, the λ/4 wave plate 10 used for display in the transmission mode can stay as it is.

As can be appreciated, even when the retardation remaining in the vertically aligned liquid crystal layer is not negligible, high contrast display is obtained in the reflection mode by providing a phase compensation element in consideration of the retardation.

In the case where the liquid crystal layer has a remaining retardation of α in the reflection mode and a remaining retardation of β in the transmission mode, a phase compensation element having a retardation of λ/4–α can be provided in lieu of the λ/4 wave plate 7 and a phase compensation element having a retardation of λ/4(β–α) can be provided in lieu of the λ/4 wave plate 10.

In the transmission mode using the light transmitted through a region having a transmission function such as the transmissive electrode region, when the liquid crystal molecules are aligned vertically to the substrates, a phase compensation element having a retardation of λ/4–(β–α) is set so that the light going out of the liquid crystal layer is elliptically polarized light in the same state as in the reflection mode. The elliptically polarized light having such a phase difference is incident on the phase compensation element having a retardation of λ/4–α. Thus, when being transmitted through the phase compensation element having a retardation of λ/4–α, the light becomes linearly polarized light perpendicular to the transmission axis of the polarizer 6. Accordingly, black display with very little optical leakage is obtained.

As can be appreciated, even when the retardation remaining in the vertically aligned liquid crystal layer is not negligible, high contrast display is obtained in the reflection mode by providing a phase compensation element in consideration of the retardation.

The LCD device in the fourth example uses a vertically aligned liquid crystal layer, but display is realized by the same principle using a horizontally aligned liquid crystal layer. In such a case, as a higher voltage is applied, the retardation by the liquid crystal layer is reduced. However, in the state where most of the liquid crystal molecules except for those in the vicinity of the substrates are vertical to the substrates when a voltage is applied, the liquid crystal molecules in the vicinity of the substrates hardly move due to the electric field. Accordingly, remaining retardation occurs due to these liquid crystal molecules in the vicinity of the substrates. As can be appreciated, when the horizontally aligned liquid crystal layer is used, optical leakage occurs during the black display and the contrast is reduced by the influence of the remaining retardation compared to when the vertically aligned liquid crystal layer is used. In order to realize the same quality of black display with the horizontally aligned liquid crystal layer as provided by the vertically aligned liquid crystal layer, the liquid crystal molecules in the vicinity of the substrates need be aligned so as to interact the remaining retardations by the liquid crystal molecules, or a phase compensation element need be additionally provided.

EXAMPLE 5

An LCD device in a fifth example according to the present invention will be described with reference to FIG. 17.

A substrate 2 includes a reflective electrode 3 (shown as reflective electrode region in FIG. 17) formed of a material having a high reflectance such as, for example, Al or Ta and a transmissive electrode 8 (shown as transmissive electrode region in FIG. 17) formed of a material having a high transmittance such as, for example, ITO. A substrate 1 includes a counter electrode 4 (shown as transmissive electrode in FIG. 17). A liquid crystal layer 5 formed of a liquid crystal material exhibiting negative dielectric anisotropy is interposed between the reflective electrode 3/transmissive electrode 8 and the counter electrode 4.

Alignment layers (not shown) are provided on surfaces of the reflective electrode 3/transmissive electrode 8 and the counter electrode 4 which are in contact with the liquid crystal layer 5. The alignment layers are used to align liquid crystal molecules (not shown) in the liquid crystal layer 5 vertically to surfaces of the substrates 1 and 2. After the alignment layers are provided, at least one of the alignment layers is processed with alignment treatment such as, for example, rubbing. The alignment direction can be defined by optical alignment or electrode shape in lieu of rubbing.

Due to the alignment treatment, the liquid crystal molecules in the liquid crystal layer 5 has a tilt angle of about 0.1 to 5 degrees with respect to the vertical direction to the surfaces of the substrates 1 and 2.

The reflective electrode 3 is used for applying a voltage to the liquid crystal layer 5, but the reflective electrode 3 can be used only as a reflective plate but not as an electrode for applying a voltage. In such a case, for example, the transmissive electrode 8 can be extended onto the reflective electrode 3 to act as an electrode for applying a voltage to the liquid crystal layer 5 in the reflective region.

The liquid crystal material used herein has a refractive index anisotropy of Ne (refractive index with respect to extraordinary ray)=1.5546 and No (refractive index with respect to ordinary ray)=1.4773.

A $\lambda/4$ wave plate 7 is provided on the surface of the substrate 1 opposite to the counter electrode 4. A $\lambda/4$ wave plate 10 is provided on the surface of the substrate 2 opposite to the reflective electrode 3 and the transmissive electrode 8. A slower optic axis of the $\lambda/4$ wave plate 10 is set to be perpendicular to the slower optic axis of the $\lambda/4$ wave plate 7.

A $\lambda/2$ wave plate 11 is provided on the surface of $\lambda/4$ wave plate 7 opposite to the substrate 1. A $\lambda/2$ wave plate 12 is provided on the surface of the $\lambda/4$ wave plate 10 opposite to the substrate 2. A slower optic axis of the $\lambda/2$ wave plate 11 is set to be tilted at 60 degrees with respect to the $\lambda/4$ wave plate 7. A slower optic axis of the $\lambda/2$ wave plate 12 is set to be perpendicular to the slower optic axis of the $\lambda/2$ wave plate 11.

A polarizer 6 is provided on a surface of the $\lambda/2$ wave plate 11 opposite to the substrate 1. A polarizer 9 is provided on a surface of the $\lambda/2$ wave plate 12 opposite to the substrate 2. A transmission axis of the polarizers 6 is set to be tilted at 75 degrees with respect to the slower optic axis of the $\lambda/4$ wave plate 7 in such a direction as to interpose the slower optic axis of the $\lambda/2$ wave plate 11, and is set to be tilted at 15 degrees with respect to the slower optic axis of the $\lambda/2$ wave plate 11. A transmission axis of the polarizer 9 is set to be tilted at 75 degrees with respect to the slower optic axis of the $\lambda/4$ wave plate 10 in such a direction as to interpose the slower optic axis of the $\lambda/2$ wave plate 12, and is set to be tilted at 15 degrees with respect to the slower optic axis of the $\lambda/2$ wave plate 12. The transmission axis of the polarizer 6 is set to be perpendicular to the transmission axis of the polarizer 9.

FIG. 8A is a plan view of an active matrix substrate (substrate 2) in the second example, and FIG. 8B is a cross-sectional view of the active matrix substrate taken along line 8B–8B' of FIG. 8A.

As shown in FIGS. 8A and 8B, the active matrix substrate includes a gate line 21, a data line 22, a driving element 23, a drain electrode 24, a storage capacitance electrode 25, a gate insulating layer 26, an insulating substrate 27, a contact hole 28, an interlayer insulating layer 29, a reflective pixel electrode (reflective electrode region) 30 (corresponding to the reflective electrode 3 in FIG. 17), and a transmissive pixel electrode (transmissive electrode region) 31 (corresponding to the transmissive electrode 8 in FIG. 17).

The storage capacitance electrode 25 is electrically connected to the drain electrode 24, and overlaps the gate line 21 with the gate insulating layer 26 being interposed therebetween. Thus, the storage capacitance electrode 25, the insulating layer 26 and the gate line 21 form a storage capacitance.

The contact hole 28 is formed in the interlayer insulating layer 29 for connecting the transmissive pixel electrode 31 and the storage capacitance electrode 25.

The active matrix substrate includes a reflective pixel electrode 30 for reflecting the external light and a transmissive pixel electrode 31 for allowing the light from the backlight to be transmitted therethrough in one pixel area.

In FIG. 8B, the reflective electrode 30 has a flat surface, but can have a wave-like surface in order to improve the reflectance. One pixel electrode includes the reflective pixel electrode 30 and the transmissive pixel electrode 31 in this example. Alternatively, a semi-transmissive and semi-reflective electrode is usable.

With reference to FIGS. 18A, 18B, 18C and 18D, light transmittance and reflectance in the transmission mode and the reflectance mode of the LCD device in the fifth example will be described.

Figure 18C:
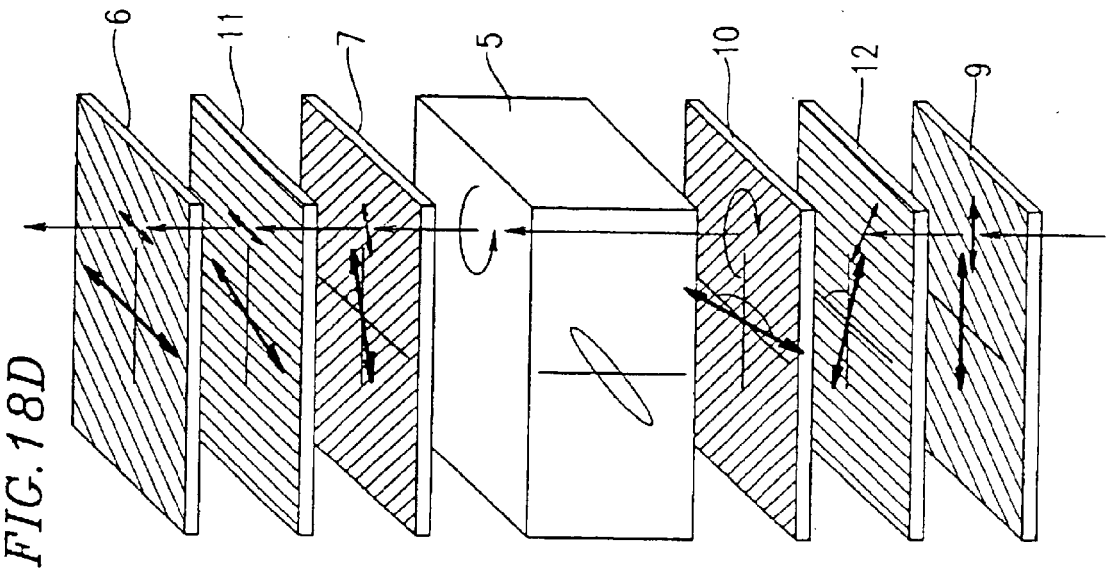
FIG. 18C is a schematic view illustrating light transmission and reflection in black display in the transmission mode in the LCD device in the fifth example according to the present invention.
Figure 18D:
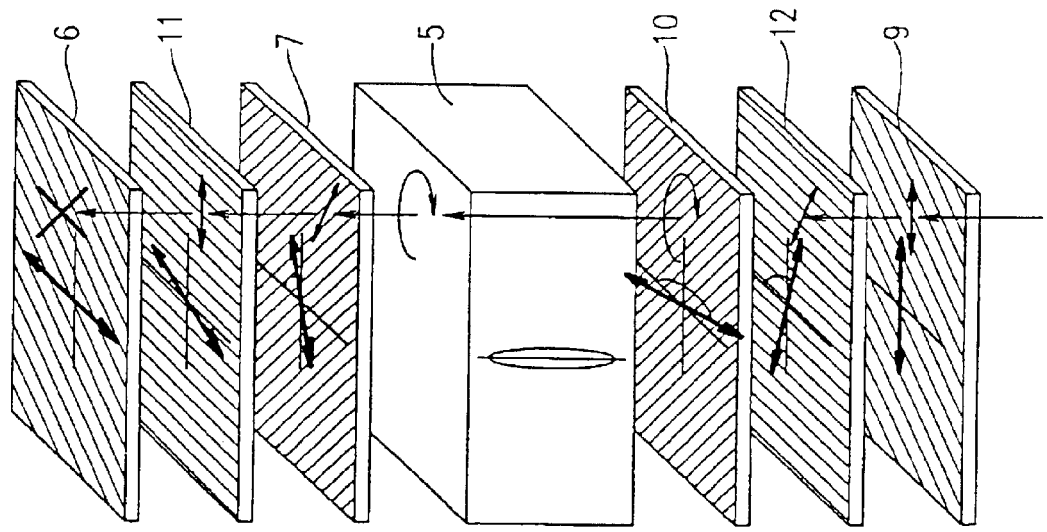
FIG. 18D is a schematic view illustrating light transmission and reflection in white display in transmission mode in the LCD device in the fifth example according to the present invention.

FIGS. 18A and 18B show the reflection mode using the reflective electrode. FIG. 18A shows the black display when no voltage is applied across the vertically aligned liquid crystal layer, and FIG. 18B shows the white display when a voltage is applied across the vertically aligned liquid crystal layer. FIGS. 18C and 18D show the transmission mode using the transmissive electrode. FIG. 18C shows the black display when no voltage is applied across the vertically aligned liquid crystal layer, and FIG. 18D shows the white display when a voltage is applied across the vertically aligned liquid crystal layer.

With reference to FIG. 18A, black display in the reflection mode will be described.

The light incident on the polarizer 6 is transmitted through the polarizer 6 to be linearly polarized light parallel to the transmission axis of the polarizer 6 and then is incident on the $\lambda/2$ wave plate 11.

The $\lambda/2$ wave plate 11 is arranged so that the transmission axis of the polarizer 6 and the slower optic axis of the $\lambda/2$ wave plate 11 make an angle of 15 degrees. Thus, the light transmitted through the $\lambda/2$ wave plate 11 becomes linearly polarized light tilted at 30 degrees with respect to the transmission axis of the polarizer 6 in such a direction as to interpose the slower optic axis of the $\lambda/2$ wave plate 11. Then, the light is incident on the $\lambda/4$ wave plate 7.

The $\lambda/4$ wave plate 7 is arranged so that the slower optic axis thereof is tilted at 75 degrees with respect to the transmission axis of the polarizer 6 in such a direction as to interpose the slower optic axis of the $\lambda/2$ wave plate 11. In other words, the slower optic axis of the $\lambda/4$ wave plate 7 is set to be 45 degrees with respect to the polarization direction of the linearly polarized light from the $\lambda/2$ wave plate 11, and thus the light transmitted through the $\lambda/4$ wave plate 7 is circularly polarized light.

When no voltage is applied across the liquid crystal layer 5, the liquid crystal molecules exhibiting negative dielectric anisotropy used in the liquid crystal layer 5 are substantially vertical to the surfaces of the substrates 1 and 2. Accordingly, the refractive index anisotropy of the liquid crystal layer 5 to the incident light is very small. In other words, the phase difference caused by the transmission of the light through the liquid crystal layer 5 is substantially zero.

Accordingly, the circularly polarized light from the λ/4 wave plate 7 is transmitted through the liquid crystal layer 5 as almost being circularly polarized and reflected by the reflective electrode 3 in the substrate 2.

The circularly polarized light reflected by the reflective electrode 3 becomes circularly polarized light having an opposite rotation direction, and is transmitted through the λ/4 wave plate 7 to be linearly polarized light perpendicular to the light which was incident on the λ/4 wave plate 7 from the polarizer 6. Then, the light is incident on the λ/2 wave plate 11.

The linearly polarized light from the λ/2 wave plate 11 is perpendicular to the transmission axis of the polarizer 6. Such light is absorbed by the polarizer 6 without being transmitted.

In this manner, black display is performed.

With reference to FIG. 18B, white display in the reflection mode will be described.

The process until the light is transmitted through λ/4 wave plate 7 to be circularly polarized light is the same as above and will not be described.

When a voltage is applied across the liquid crystal layer 5, the liquid crystal molecules are slightly tilted toward the horizontal direction with respect to the surfaces of the substrates 1 and 2. Accordingly, the circularly polarized light incident on the liquid crystal layer 5 from the λ/4 wave plate 7 becomes elliptically polarized light by the birefringence of the liquid crystal molecules. The light is then reflected by the reflective electrode 3, and further influenced by the birefringence of the liquid crystal molecules in the liquid crystal layer 5. After being transmitted through the λ/4 wave plate 7 and the λ/2 wave plate 11, the light does not become linearly polarized light perpendicular to the transmission axis of the polarizer 6. Thus, the light is transmitted through the polarizer 6.

By controlling the voltage applied across the liquid crystal layer 5, the amount of light transmitted through the polarizer 6 after being reflected by the reflective electrode 3 can be adjusted. Thus, gray scale display is provided.

When a voltage is applied across the liquid crystal layer 5 by the reflective electrode 3 and the counter electrode 4 to change the alignment of the liquid crystal molecules so that the phase difference by the liquid crystal layer 5 fulfills the ¼ wavelength condition, the circularly polarized light from the λ/4 wave plate 7 becomes linearly polarized light perpendicular to the transmission axis of the polarizer 6 when reaching the reflective electrode 3 after being transmitted through the liquid crystal layer 5. The light is again transmitted through the liquid crystal layer 5 to be circularly polarized light and then transmitted through the λ/4 wave plate 7 and the λ/2 wave plate 11 to be linearly polarized light parallel to the transmission axis of the polarizer 6. In this case, the amount of light transmitted through the polarizer 6 is maximum.

FIG. 18B shows the case having the liquid crystal layer retardation conditions by which a maximum amount of light reflected by the reflective electrode 3 is transmitted through the polarizer 6. In other words, the light on the reflective electrode 3 is linearly polarized light perpendicular to the transmission axis of the polarizer 6.

As described above, when no voltage is applied across the liquid crystal layer 5, black display is obtained since the liquid crystal layer 5 has substantially no birefringence; and when a voltage is applied across the liquid crystal layer 5, gray scale display is obtained by changing the light transmittance in accordance with the voltage.

With reference to FIG. 18C, black display in the transmission mode will be described.

The light emitted by a light source (not shown) is incident on the polarizer 9 to be linearly polarized light parallel to the transmission axis of the polarizer 9. Then, the light is incident on the λ/2 wave plate 12.

The λ/2 wave plate 12 is arranged so that the slower optic axis thereof is tilted at 15 degrees with respect to the transmission axis of the polarizer 9 and further to be perpendicular to the slower optic axis of the λ/2 wave plate 11. Thus, the light transmitted through the λ/2 wave plate 12 is linearly polarized light tilted at 30 degrees with respect to the transmission axis of the polarizer 9 in such a direction as to interpose the slower optic axis of the λ/2 wave plate 12. Then, the light is incident on the λ/4 wave plate 10.

The λ/4 wave plate 10 is arranged so that the slower optic axis thereof is tilted at 75 degrees with respect to the transmission axis of the polarizer 9 in such a direction as to interpose the slower optic axis of the λ/2 wave plate 12. In other words, the slower optic axis of the λ/4 wave plate 10 is set to be 45 degrees with respect to the polarization direction of the linearly polarized light from the λ/2 wave plate 12, and thus the light transmitted through the λ/4 wave plate 10 is circularly polarized light.

When no voltage is applied across the liquid crystal layer 5, the liquid crystal molecules exhibiting negative dielectric anisotropy used in the liquid crystal layer 5 are substantially vertical to the surfaces of the substrates 1 and 2. Accordingly, the refractive index anisotropy of the liquid crystal layer 5 to the incident light is very small. In other words, the phase difference caused by the transmission of the light through the liquid crystal layer 5 is substantially zero.

Accordingly, the circularly polarized light from the λ/4 wave plate 10 is transmitted through the liquid crystal layer 5 as almost being circularly polarized and is incident on the λ/4 wave plate 7.

The slower optic axes of the λ/4 wave plates 10 and 7 are set to be perpendicular to each other. Thus, the circularly polarized light from the λ/4 wave plate 7 becomes linearly polarized light perpendicular to the transmission axis of the polarizer 8 and then is incident on the λ/2 wave plate 11.

The linearly polarized light transmitted through the λ/2 wave plate 11 is perpendicular to the transmission axis of the polarizer 6. Such light is absorbed by the polarizer 6 without being transmitted.

In this manner, black display is performed.

With reference to FIG. 18D, white display in the transmission mode will be described.

The process until the light is transmitted through λ/4 wave plate 10 to be circularly polarized light is the same as above and will not be described.

When a voltage is applied across the liquid crystal layer 5, the liquid crystal molecules are slightly tilted toward the horizontal direction with respect to the surfaces of the substrates 1 and 2. Accordingly, the circularly polarized light incident on the liquid crystal layer 5 from the λ/4 wave plate 10 becomes elliptically polarized light by the birefringence of the liquid crystal molecules. The light does not become linearly polarized light perpendicular to the transmission axis of the polarizer 6 even after being transmitted through the λ/4 wave plate 7 and the λ/2 wave plate 11 and a part of the light is transmitted through the polarizer 6.

By controlling the voltage applied across the liquid crystal layer 5, the amount of light transmitted through the polarizer 6 can be adjusted. Thus, gray scale display is provided.

When a voltage is applied across the liquid crystal layer 5 so that the phase difference by the liquid crystal layer 5 fulfills the ½ wavelength condition, the circularly polarized light from the λ/4 wave plate 10 becomes linearly polarized light perpendicular to the transmission axis of the polarizer 6 at the half of the thickness of the liquid crystal layer 5, and then becomes circularly polarized light when being completely transmitted through the liquid crystal layer 5.

Since the circularly polarized light from the liquid crystal layer 5 becomes linearly polarized light parallel to the transmission axis of the polarizer 6 when being transmitted through the λ/4 wave plate 7 and the λ/2 wave plate 11, most of the light incident on the polarizer 6 is transmitted therethrough. In this case, the amount of light transmitted through the polarizer 6 is maximum.

FIG. 18D shows the case having the liquid crystal layer retardation conditions by which a maximum amount of light transmitted through the polarizer 9 is transmitted through the polarizer 6.

As described above, when no voltage is applied across the liquid crystal layer 5, black display is obtained since the liquid crystal layer 5 has substantially no birefringence; and when a voltage is applied across the liquid crystal layer 5, gray scale display is obtained by changing the light transmittance in accordance with the voltage.

The phase difference by the liquid crystal layer 5 at which the reflectance is maximum in the bright display in the reflection mode is λ/4, and the phase difference by the liquid crystal layer 5 at which the reflectance is maximum in the bright display in the transmission mode is λ/2. As is appreciated from this, when the thickness of the liquid crystal layer in the reflective region and the thickness of the liquid crystal in the transmissive region are equal to each other, the phase differences of λ/4 for the reflection mode and λ/4 for the transmission mode cannot be fulfilled at the same time.

In the case where display is performed by changing the phase difference of the liquid crystal layer in the reflective region from 0 to λ/4, a satisfactory light utilization factor cannot be obtained in the transmission mode since the phase difference of the liquid crystal layer in the transmissive region also changes only from 0 to λ/4.

Satisfactory light utilization factors both in the reflection mode and the transmission mode are achieved by changing the thickness of the liquid crystal layer in the reflective region from the thickness in the transmissive region, or by applying different voltages to the liquid crystal layer in the reflection region and to the liquid crystal layer in the transmissive region. In the case where the thickness of the liquid crystal layer in the transmission region is made twice the thickness of the liquid crystal layer in the reflective region, the phase differences of the liquid crystal layer of λ/4 for the reflection mode and of λ/2 for the transmission mode are fulfilled at the same time. It is not necessary to make the thickness for the transmission mode twice the thickness for the reflection mode. The light utilization factor is raised by making the thickness for the transmission mode larger than but not exceeding twice the thickness for the reflection mode.

In the fifth example, the slower optic axis of the λ/4 wave plate 10 is set to be perpendicular to the slower optic axis of the λ/4 wave plate 7, the slower optic axis of the λ/2 wave plate 12 is set to be perpendicular to the slower optic axis of the λ/2 wave plate 11, and the transmission axis of the polarizer 6 is set to be perpendicular to the transmission axis of the polarizer 9. The present invention is not limited to such setting. Black display is realized when linearly polarized light transmitted through the polarizer 9 with no retardation by the liquid crystal layer 5 is incident on the polarizer 6 as being perpendicular to the transmission axis of the polarizer 6 in the transmission mode.

More specifically, as long as the following conditions are fulfilled, the black display is realized with no birefringence in the liquid crystal layer 5 and the grey scale display is realized by changing the light transmittance in accordance with the voltage, even without the above setting: Where the angle made by the transmission axis of the polarizer 6 and the slower optic axis of the λ/2 wave plate 11 is γ1, the angle made by the transmission axis of the polarizer 6 and the slower optic axis of the λ/4 wave plate 7 is 2γ1+45 degrees; where the angle made by the transmission axis of the polarizer 9 and the slower optic axis of the λ/2 wave plate 12 is γ2, the angle made by the transmission axis of the polarizer 9 and the slower optic axis of the λ/4 wave plate 10 is 2γ2+45 degrees; and the linearly polarized light transmitted through the polarizer 9 with no retardation of the liquid crystal layer 5 is incident on the polarizer 6 as being perpendicular to the transmission axis of the polarizer 6 in the transmission mode.

The refractive indices of birefringent materials forming the λ/4 wave plates 7 and 10 and the λ/2 wave plate 11 and 12 with respect to the ordinary ray and extraordinary ray strongly depend on the wavelength. Therefore, the phase delay accumulated in the wavelength at a specific thickness also depends on the wavelength. The phase delay of λ/4 can be completely provided to the linearly polarized light face of the incident light only when the incident light has a single specified wavelength. Accordingly, in the area where the phase delay of λ/4 is not achieved due to the wavelength dependency of the refractive index anisotropy of the birefringent material forming the λ/4 wave plates 7 and 10 and the λ/2 wave plate 11 and 12, a part of the light is transmitted through the polarizer 6 without being absorbed by polarizer 6. As a result, the darkness of the black display changes. In the fifth example, the λ/4 wave plate 7 is combined with the λ/2 wave plate 11 and the λ/4 wave plate 10 is combined with the λ/2 wave plate 12. Due to such a structure, the wavelength dependency of the refractive index anisotropy of the λ/4 wave plate 10 is counteracted to some extent by the wavelength dependency of the refractive index anisotropy of the λ/4 wave plate 7. Thus, the λ/4 condition is fulfilled in a relatively wide wavelength range. Thus, the darkness of the black display is improved.

Needless to say, the darkness of the black display can be improved without setting the slower optic axis of the λ/4 wave plate 10 to be perpendicular to the slower optic axis of the λ/4 wave plate 12 and setting the slower optic axis of the λ/2 wave plate 12 to be perpendicular to the slower optic axis of the λ/2 wave plate 11.

In this example, γ1=γ2=15 degrees, but the values of γ1 and γ2 can be changed in accordance with a desired darkness. The λ/2 wave plate 12 can be eliminated to improve the cost performance although the darkness in the black display is deteriorated in the transmission mode. In this case, however, the angle of the slower optic axis of the λ/4 wave plate 10 and the transmission axis of the polarizer 9 need be set so that the linearly polarized light transmitted through the polarizer 9 with no retardation in the liquid crystal layer 5 is incident on the polarizer 6 as being perpendicular to the transmission axis of the polarizer 6 in the transmission mode.

In the case where the slower optic axis of the λ/4 wave plate 10 is set to be perpendicular to the slower optic axis of the λ/4 wave plate 7, the slower optic axis of the λ/2 wave plate 12 is set to be perpendicular to the slower optic axis of the λ/2 wave plate 11, and the transmission axis of the polarizer 6 is perpendicular to the transmission axis of the polarizer 9, the following effects are obtained in the transmission mode. The wavelength dependency of the refractive index anisotropy of the λ/4 wave plate 10 is counteracted by the wavelength dependency of the refractive index anisotropy of the λ/4 wave plate 7, and the wavelength dependency of the refractive index anisotropy of the λ/2 wave plate 12 is counteracted by the wavelength dependency of the refractive index anisotropy of the λ/2 wave plate 11. Thus, the darkness of the black display is further improved.

When another phase compensation element is provided at least one of between the polarizer 6 and the liquid crystal layer 5 and between the polarizer 9 and the liquid crystal layer 5 to improve the viewing angle, satisfactory display is realized in a wide viewing angle.

In the fifth example, the liquid crystal layer 5 is vertically aligned. In the case where the liquid crystal molecules in the vicinity of the substrates have a certain tilt angle with respect to the vertical direction to the substrates, the retardation is not completely zero even when no voltage is applied. In the reflection mode, when the retardation of α is remaining, a phase compensation element can be provided at least one of between the polarizer 6 and the liquid crystal layer 5 and between the polarizer 9 and the liquid crystal layer 5 in order to compensate for the retardation and make the retardation closer to zero. Thus, better black display is realized.

In the case where the vertically aligned liquid crystal layer has a remaining retardation of α in the reflection mode, a phase compensation element having a retardation of λ/4−α can be provided in lieu of the λ/4 wave plate 7.

In the reflection mode, elliptically polarized light which is offset from the circularly polarized light by the remaining retardation of the liquid crystal layer is incident on the liquid crystal layer. The elliptically polarized light becomes circularly polarized light when reaching the reflective electrode after being transmitted through the liquid crystal layer. As a result of the reflection, the light becomes circularly polarized light having an opposite rotation direction. The light becomes elliptically polarized light offset from the circularly polarized light when being transmitted through and going out of the liquid crystal layer. The elliptically polarized light at this point has the phase at the time of incidence offset at 90 degrees. When being transmitted through the phase compensation element, the elliptically polarized light becomes linearly polarized light perpendicular to the transmission axis of the polarizer 6.

In the case where mainly reflection-mode display is performed, such as, for example, when the reflective pixel electrodes are larger than the transmissive pixel electrodes, the λ/4 wave plate 10 used for display in the transmission mode can stay as it is.

As can be appreciated, even when the retardation remaining in the vertically aligned liquid crystal layer is not negligible, high contrast display is obtained in the reflection mode by providing a phase compensation element in consideration of the retardation.

In the case where the liquid crystal layer has a remaining retardation of α in the reflection mode and a remaining retardation of β in the transmission mode, a phase compensation element having a retardation of λ/4−α can be provided in lieu of the λ/4 wave plate 7 and a phase compensation element having a retardation of λ/4(β−α) can be provided in lieu of the λ/4 wave plate 10.

In the transmission mode using the light transmitted through a region having a transmission function such as the transmissive electrode region, when the liquid crystal molecules are aligned vertically to the substrates, a phase compensation element having a retardation of λ/4−(β−α) is set so that the light going out of the liquid crystal layer is elliptically polarized light in the same state as in the reflection mode. The elliptically polarized light having such a phase difference is incident on the phase compensation element having a retardation of λ/4−α. Thus, when being transmitted through the phase compensation element having a retardation of λ/4−α, the light becomes linearly polarized light perpendicular to the transmission axis of the polarizer 6. Accordingly, black display with very little optical leakage is obtained.

As can be appreciated, even when the retardation remaining in the vertically aligned liquid crystal layer is not negligible, high contrast display is obtained in the reflection mode by providing a phase compensation element in consideration of the retardation.

The LCD device in the fifth example uses a vertically aligned liquid crystal layer, but display is realized by the same principle using a horizontally aligned liquid crystal layer. In such a case, as a higher voltage is applied, the retardation by the liquid crystal layer is reduced. However, in the state where most of the liquid crystal molecules except for those in the vicinity of the substrates are vertical to the substrates when a voltage is applied, the liquid crystal molecules in the vicinity of the substrates hardly move due to the electric field. Accordingly, remaining retardation occurs due to these liquid crystal molecules in the vicinity of the substrates. As can be appreciated, when the horizontally aligned liquid crystal layer is used, optical leakage occurs during the black display and the contrast is reduced by the influence of the remaining retardation compared to when the vertically aligned liquid crystal layer is used. In order to realize the same quality of black display with the horizontally aligned liquid crystal layer as provided by the vertically aligned liquid crystal layer, the liquid crystal molecules in the vicinity of the substrates need be aligned so as to interact the remaining retardations by the liquid crystal molecules, or a phase compensation element need be additionally provided.

Figure 19:
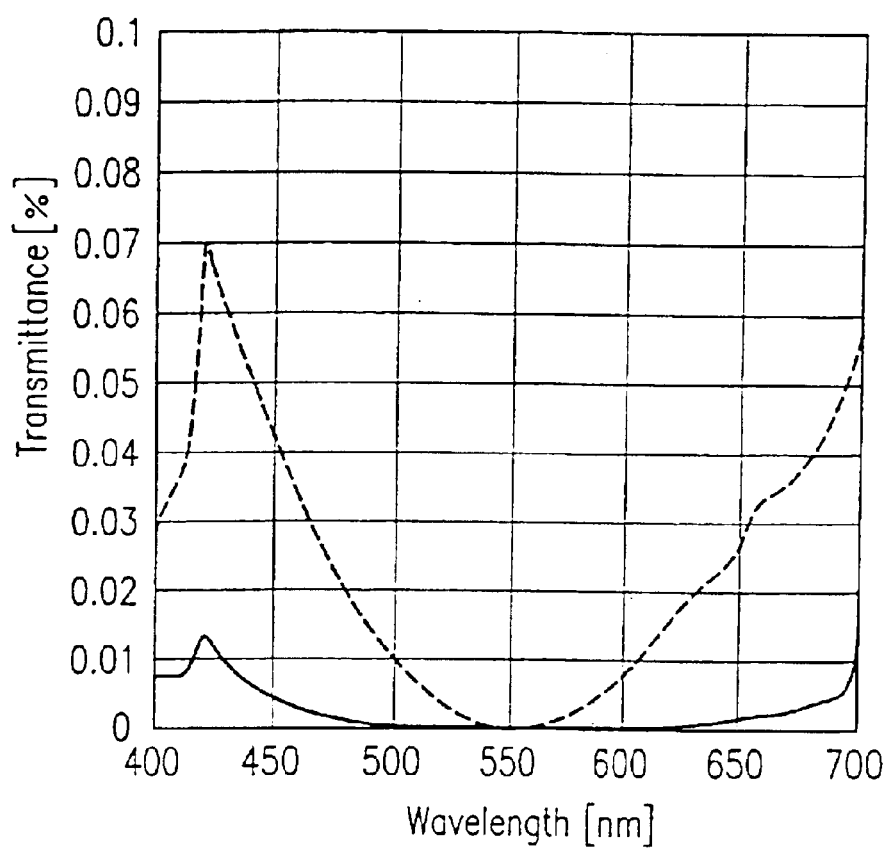
FIG. 19 is a graph illustrating the relationship between the wavelength and the transmittance in black display in the fifth example.

FIG. 19 shows the relationship between the wavelength and the transmittance of the light in the black display in the transmission mode when the slower optic axes of the λ/4 wave plates 7 and 10 are parallel to each other and the slower optic axes of the λ/2 wave plates 11 and 12 are parallel to each other and when the slower optic axes of the λ/4 wave plates 7 and 10 are parallel to each other and no λ/2 wave plate is provided for comparison.

As shown in FIG. 19, black display with substantially no optical leakage is realized by providing the λ/2 wave plates 11 and 12.

Figure 20:
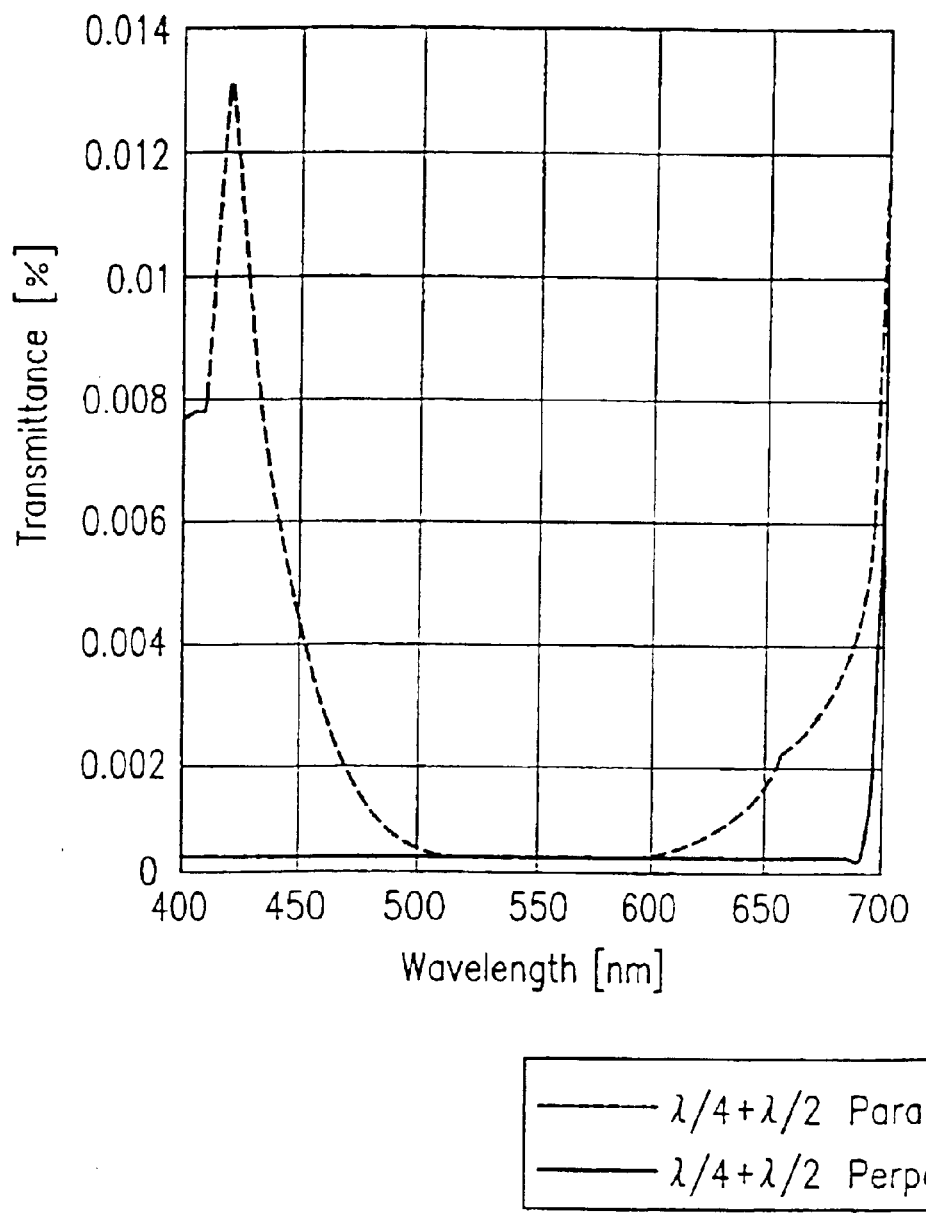
FIG. 20 is a graph illustrating the relationship between the wavelength and the transmittance in black display in the fifth example.

FIG. 20 shows the relationship between the wavelength and the transmittance of the light in the black display in the transmission mode when the slower optic axes of the λ/4 wave plates 7 and 10 are parallel to each other and the slower optic axes of the λ/2 wave plates 11 and 12 are parallel to each other as in the fifth example and when the slower optic axes of the λ/4 wave plates 7 and 10 are perpendicular to each other and the λ/2 wave plates 11 and 12 are perpendicular to each other for comparison.

As shown in FIG. 20, black display with substantially no optical leakage is realized by setting the slower optic axes of the λ/4 wave plates 7 and 10 to be perpendicular to each other and also setting the slower optic axes of the λ/2 wave plates 11 and 12 to be perpendicular to each other.

Embodiment 2

As described above, according to the first embodiment of the present invention, a transmission- and reflection-type LCD device providing satisfactory display quality is realized. Among the LCD devices operable both in the transmission mode and the reflection mode, the LCD device using a semi-transmissive and semi-reflective layer (FIG. 8C) is inferior to the LCD device having a reflective region for performing display in a reflection mode and a transmission region for performing display in a transmission mode (FIG. 8A) in the following point.

When a semi-transmissive and semi-reflective layer formed of metal particles deposited in a very small thickness is used, the metal particles need have a relatively large absorption coefficient. Accordingly, the internal absorption of the incident light is large, and a large percentage of incident light is absorbed or scattered and not used for display. Thus, the light utilization factor is relatively low (for example, in one model, 55% of the incident light is not used for display).

When a semi-transmissive and semi-reflective layer having microscopic holes and recesses (comprehensively referred to as "openings") is used, the structure of the layer is complicated and requires a precise production design. Therefore, it is difficult to control the thickness of the layer to be uniform. In other words, reproducibility of the electric characteristics and optical characteristics is not satisfactory. Thus, it is difficult to control the display quality of the LCD device.

In the second embodiment, LCD devices having a transmissive region for performing display in the transmission mode and a reflective region for performing display in the reflection mode and characterized in the structure of the electrodes will be described. In the case where the electrode structure in the second embodiment and the phase compensation element in the first embodiment are combined, the display quality is further enhanced.

An LCD device having a transmissive region and a reflective region utilizes ambient light or illuminating light with less loss and has a significantly higher light utilization factor compared to an LCD device using a half-mirror. A first conductive layer is formed of a transparent conductive material such as, for example, ITO or $SnO_2$. A second conductive layer is formed of Al, W, Cr or an alloy thereof. Since both the first and second conductive layers can be formed of materials used for general reflective-type LCD devices and transmission-type LCD devices, the LCD device provides very stable display characteristics and reliability and is produced relatively easily.

Furthermore, the LCD devices in the second embodiment solve the problem of the conventional transmission-type LCD device that the visibility is lowered due to the surface reflection when the ambient light is bright and also the problem of the conventional reflection-type LCD device that satisfactory display is not obtained due to the lowered brightness when the ambient light is dark. In the circumstances where a sufficient power is provided, the backlight is utilized as the conventional transmission-type LCD devices. Thus, sufficient display is realized regardless of the ambient light intensity without requiring the dispersion in the utilization factor of the ambient light to be controlled as precisely as in the conventional reflection-type LCD devices. When used, the region including the first conductive layer having a relatively high transmittance and the region including the second conductive layer having a relatively high reflectance which are provided in one pixel area complementarily contribute to display. Therefore, regardless of the ambient light intensity, clear images are displayed.

When adopted in a viewfinder (monitoring screen) of a battery-driven digital camera or video camera, the LCD device in the second embodiment provides appropriately bright images, which are easy to observe, by adjusting the brightness of the backlight regardless of the ambient light intensity.

Especially when used outdoors on a fine day, images provided by the conventional transmission-type LCD devices has a lower contrast even when the brightness of the backlight is raised. The quality of such images can be improved while reducing the power consumption by turning off the backlight and using the LCD device according to the present invention in the reflection mode, or by lowering the brightness of the backlight and using both the transmission mode and the reflection mode of the LCD device according to the present invention. When the LCD device is used indoors receiving bright sunlight, the reflection mode and the transmission mode can be switched in accordance with the direction of the object, or both modes can be used together to provide easy-to-see display. When the monitoring screen receives the sunlight, the LCD device can be used in the same manner as used outdoors on a fine day. When the object is display from a dark corner of the room, the backlight can be turned on to use the LCD device in the transmission mode.

When adopted in a monitoring of an automobile-mounted car navigation device, the LCD device in the second embodiment provides appropriately bright images, which are easy to observe. The conventional automobile-mounted monitoring screen uses a backlight having a higher brightness than the backlight used in personal computers or the like in order to deal with the external light incident on the screen. However, the conventional automobile-mounted monitoring screen still has the problem of lowered contrast. In contrast, the backlight having such a high brightness is not suitable for display at night or in the tunnels. The LCD device in the second embodiment provides satisfactory display when the ambient light is bright by using the reflection mode together with the transmission light without setting the brightness of the backlight high. In the darkness also, easy-to-see. display is provided by a brightness of only about 50 to 100 $cd/m^2$.

In an LCD device in the second embodiment, a pixel electrode includes a first conductive layer having a relatively high light transmittance and a second conductive layer having a relatively high light reflectance, which are electrically connected to each other. Thus, a transmissive region for performing display in the transmission mode and a reflective region for performing display in the reflection mode are both included in one pixel area.

The first conductive layer and the second conductive layer are provided in separate layers with an insulating layer being interposed therebetween. The thickness of the liquid crystal layer can be adjusted by changing the thickness of the insulating layer between the transmissive region (for the first conductive layer) and in the reflective region (for the second conductive layer). In this manner, the optical characteristics in the two regions can be matched to each other. During the production process, the two layers having different level of potentials are provided with the insulating layer being interposed therebetween. Therefore, electrocorrosion is not caused with the developer used for forming the electrode by patterning or with the resist remover acting as the electrolyte. Accordingly, a highly reliable LCD device is obtained.

When the two layers of the pixel electrode (e.g., lower layer of ITO and upper layer of Al) are sequentially formed with no insulating layer being interposed therebetween, the levels of potentials of the ITO layer and the Al layer are significantly different. Furthermore, the thin films has many microscopic openings. Accordingly, the developer used for patterning or as a resist remover tends to act as an electrolyte to cause electrocorrosion. As a result, the ITO layer is eluted, thus causing pixel defects, line disconnections, and contamination of the liquid crystal layer. Since the insulating layer is provided between the two layers according to the present invention, the insulating layer acts as a protective layer to preventing invasion of the liquids, which causes electrocorrosion.

Even when the two layers forming the pixel electrode have the relationship tending to cause electrocorrosion, the two layers can be connected to each other via a third conductive layer for alleviating the properties of the two layers. Thus, insufficient connection due to electrocorrosion and other inconveniences which deteriorate the reliability of the LCD device are prevented.

In the case where one of the first, second and third conductive layers is formed of a part of the materials of the gate line or source line, the production process is simplified.

The surface of the insulating layer on which the second conductive layer is to be formed can be formed wave-like. In such a case, the incident light is reflected and scattered, resulting in a wider viewing angle. Thus, paper white display is realized without using an additional scattering plate.

According to a method for producing an LCD device of the present invention, complicated production conditions which are required in the case of a conventional LCD device using a half-mirror are not necessary. General electrode materials and line materials and general production conditions used for the conventional transmission-type LCD devices and reflection-type devices can be used. In consequence, the production is relatively easy and reproducibility is satisfactory. Even when the two layers forming the pixel electrode have the relationship tending to cause electrocorrosion, the two layers can be connected to each other via an insulating layer or a third conductive layer can be provided therebetween. As a result, the two layers can be formed without direct contact or contact with liquids which tend to act as an electrolyte. Thus, electrocorrosion is prevented, and therefore the LCD device enjoys a high reliability and is produced at high efficiency.

In the case where the step of removing the insulating layer in a contact area with the first and second conductive layers and the step of removing the insulating layer on a part of the first conductive layer are performed in the same step, the number of the steps is reduced while maintaining the reliability of the LCD device.

EXAMPLE 6

An LCD device in a sixth example according to the present invention will be described.

Figure 21:
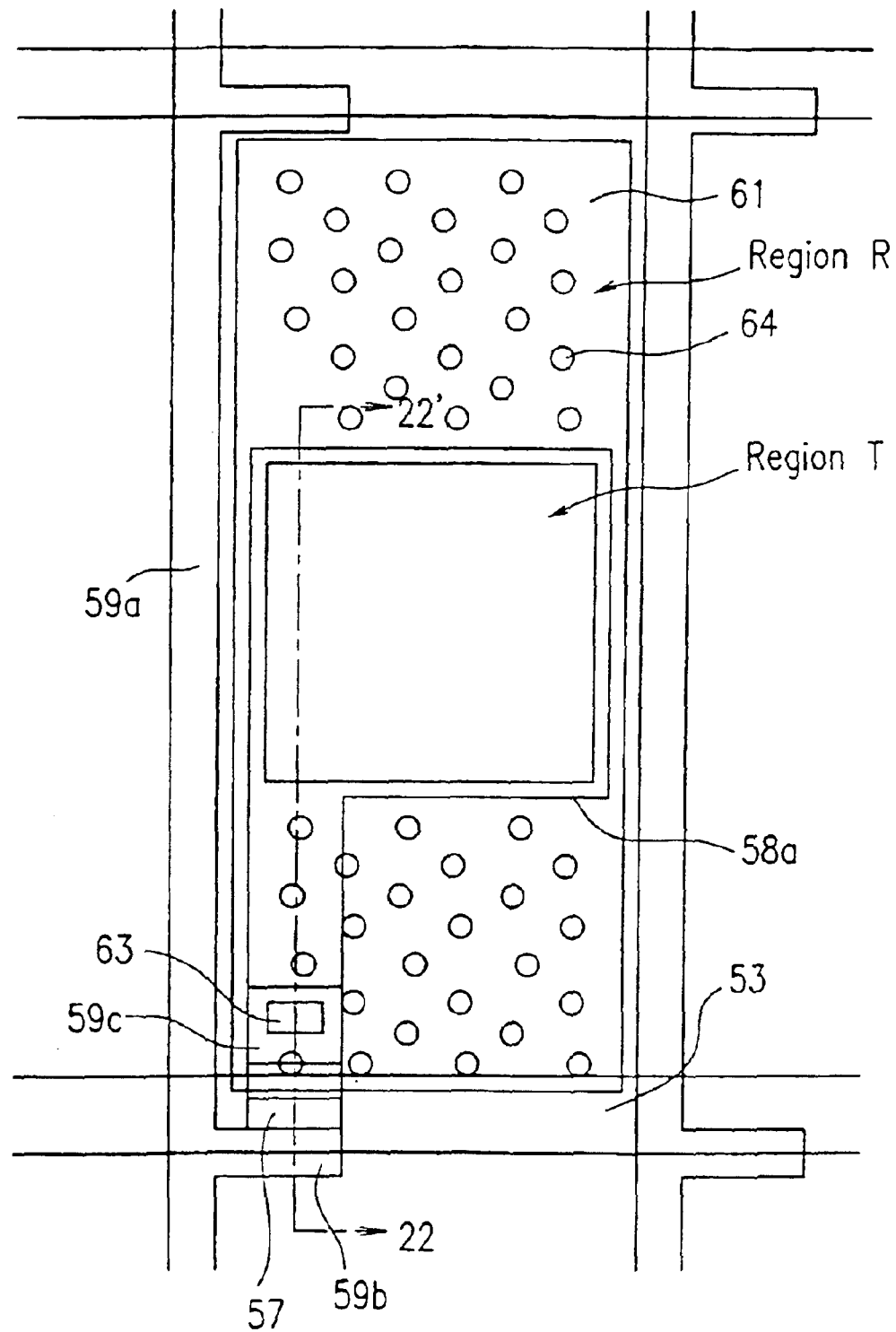
FIG. 21 is a plan view of an active matrix substrate of an LCD device in a sixth example according to the present invention.
Figure 22:
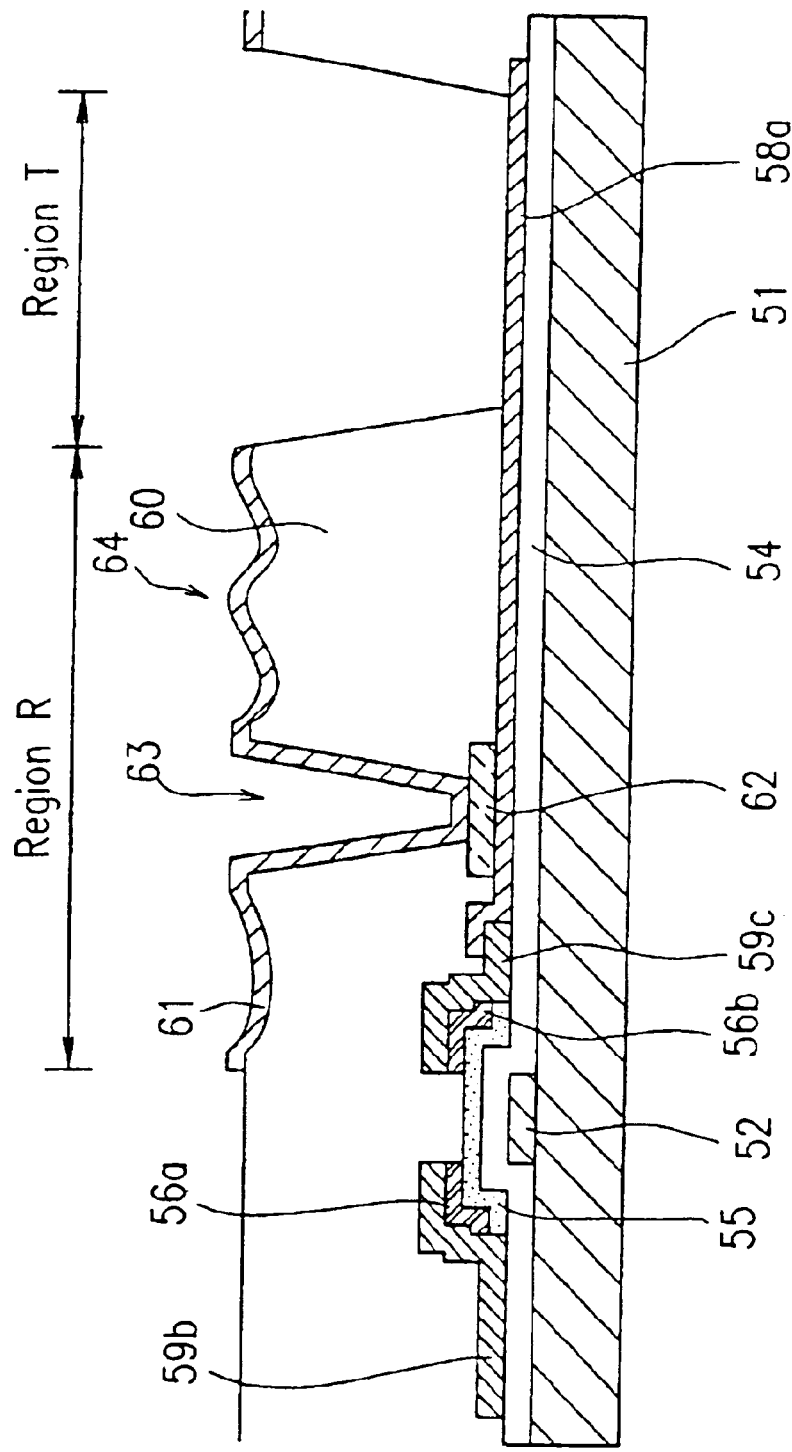
FIG. 22 is a cross-sectional view of the active matrix substrate shown in FIG. 21.

FIG. 21 is a plan view of an active matrix substrate of the LCD device in the sixth example corresponding to one pixel area. FIG. 22 is a cross-sectional view of the LCD device taken along line 22–22' in FIG. 21.

As shown in FIGS. 21 and 22, a plurality of gate lines 53 and a plurality of source lines 59a are provided so as to perpendicular to each other on a transparent insulating plate (not shown) formed of a glass or plastic material. A TFT 57 is provided in the vicinity of each of intersections of the gate lines 53 and the source lines 59a. A drain electrode 59c of the TFT 57 is connected to a reflective electrode 61 and a transmissive electrode 58a which act as a pixel electrode together. A portion of the LCD device having the pixel electrode as a top layer thereof has a region T (transmissive region) having a relatively high light transmittance and a region R (reflective region) having a relatively high light reflectance when seen from above the LCD device.

Although not shown, an alignment layer for aligning liquid crystal molecules is provided on the active matrix substrate shown in FIG. 21.

LCD devices in the sixth and the following examples includes the above-described active matrix substrate and a counter substrate including a transmissive electrode and an alignment layer. When necessary, a color filter, a phase compensation element or a polarizer can be provided.

The region T is rectangular and located at a center of the pixel electrode. In cross-section, the region T includes a plurality of layers formed of materials having a high light reflectance and also includes the transmissive electrode 58a as the top layer connected to the drain electrode 59c of the TFT 57. The region R surrounds the region T and includes the reflective electrode 61 as the top layer. The reflective electrode 61 is formed of Al or an Al-containing alloy having a high light reflectance and connected to the drain electrode 59c of the TFT 57. Due to such a structure, the region R can reflect the incident light. The reflective electrode 61, which has a wave-like surface, scatters incident light to an appropriate range of directions.

A liquid crystal material used in the LCD device in the sixth example is the guest-host liquid crystal material ZLI2327 (produced by Merck & Co., Inc.) containing a black pigment and also containing an optically active substance S-811 (produced by Merck & Co., Inc.) at a ratio of 0.5%.

As shown in FIG. 22, the TFT 57 includes a gate insulating layer 54, a semiconductor layer 55, semiconductor contact layers 56a and 56b, a source electrode 59b, the drain electrode 59c, and a gate electrode 52 on which the above-mentioned elements are provided sequentially. The gate electrode 52 is branched from each of the gate lines 53 (FIG. 21).

The drain electrode 59c is connected to the transmissive electrode 58a which is a part of the pixel electrode in the region T. In the region R, an interlayer insulating layer 60 and the reflective electrode 61 are provided sequentially on the transmissive electrode 58a. The reflective electrode 61 is electrically connected to the transmissive electrode 58a through a contact hole 63 formed in the interlayer insulating layer 60. The reflective electrode 61 and the transmissive electrode 58a form the pixel electrode for applying a voltage to the liquid crystal material. The transmissive electrode 58a and the reflective electrode 61 are not directly connected to each other but are connected via a conductive metal layer 62 formed of Ti.

The transmissive electrode 58a can be covered with the interlayer insulating layer 60 when the reflective electrode 61 is formed by patterning (a method for producing the LCD device will be described later in detail). Accordingly, ITO and Al cause electrocorrosion, thereby effectively preventing inconveniences such as line disconnection. In the case where the interlayer insulating layer 60 is formed on the transmissive electrode 58a with a relatively small thickness so as to completely cover the transmissive electrode 58a, electrocorrosion is prevented from occurring between ITO and Al after the LCD device is produced.

In this example, the metal layer 62 is formed of Ti, but the same effect is obtained as long as the metal layer 62 is formed of a conductive material other than Al, for example, Cr, Mo, Ta, or W. Alternatively, the reflective electrode 61 is formed of an Al-containing alloy containing a metal material added thereto having a higher potential than Al, for example, W, Ni, Pd, V or Zr, in lieu of forming the metal layer 62. In this case also, the electrocorrosion between ITO and Al after the production of the LCD device is prevented. For example, the electrocorrosion is more effectively prevented by adding about 5.0 wt. % of W to Al.

A method for producing the LCD device in this example will be described with reference to FIGS. 23A through 23E.

Figure 23A:
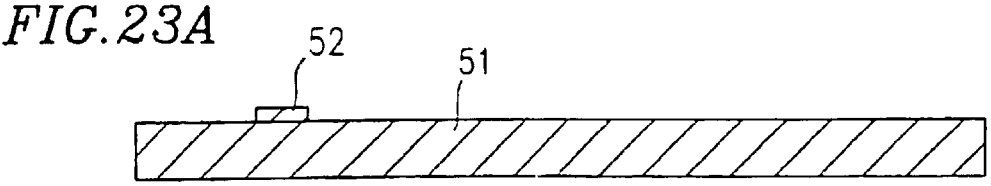
FIGS. 23A through 23E are cross-sectional views illustrating a method for forming the active matrix substrate shown in FIGS. 21 and 22.

As shown in FIG. 23A, a conductive thin film is formed on the insulating plate 51 and patterned into a prescribed shape by photolithography, thereby forming the gate electrode 52 and the gate line (not shown). In this example, the insulating plate 51 is formed of glass, and the gate electrode 52 and the gate line are formed of Ta. The insulating plate 51 can be formed of plastics or the like in lieu of glass, and the gate electrode 52 and the gate line can be formed of other conductive materials such as, for example, Al, Cr, Mo, W, Cu, or Ti.

Figure 23B:
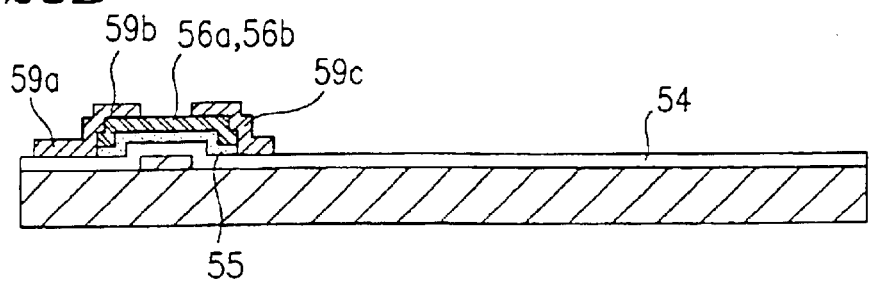

Next, as shown in FIG. 23B, the gate insulating layer 54 of $SiN_x$, the semiconductor layer 55 of a-Si, and a P-doped $n^+$-a-Si layer for the semiconductor contact layers 56a and 56b are sequentially formed by CVD, and then patterned by photolithography.

Then, a conductive layer is formed and patterned by photolithography into a prescribed shape, thereby forming the source line 59a, the source electrode 59b and the drain electrode 59c. The conductive layer is formed of a Cr-containing material in this example, but can be formed of other conductive materials such as, for example, Al, Mo, Ta, W, Cu or Ti.

Figure 23C:
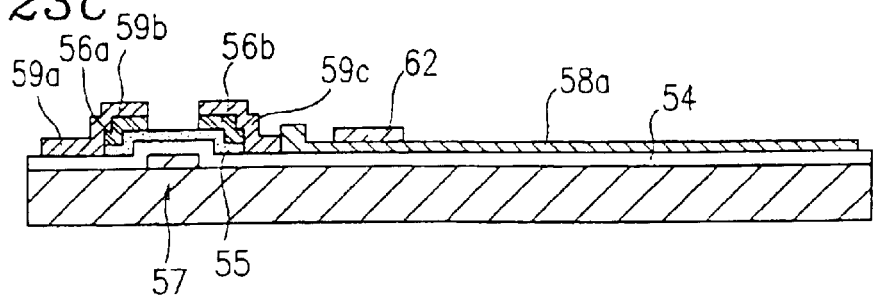

Then, as shown in FIG. 23C, a light-transmissive conductive layer is formed and patterned by photolithography, thereby forming the transmissive electrode 58a. The transmissive electrode 58a is formed of ITO in this example.

Then, a metal layer is formed and patterned by photolithography, thereby forming the metal layer 62. The metal layer 62 is used for connecting the transmissive electrode 58a and the reflective electrode 61 to be formed later. The metal layer 62 is formed of Ti in this example, but can be formed of other conductive materials other than Ti such as, for example, Cr, Mo, Ta or W.

Then, the P-doped $n^+$-a-Si layer is etched using the source electrode 59b and the drain electrode 59c as masks, thereby forming the semiconductor contact layers 56a and 56b. In this manner, the TFT 57 is completed.

The source electrode 59b and the drain electrode 59c can overlap the transmissive electrode 58a.

Figure 23D:
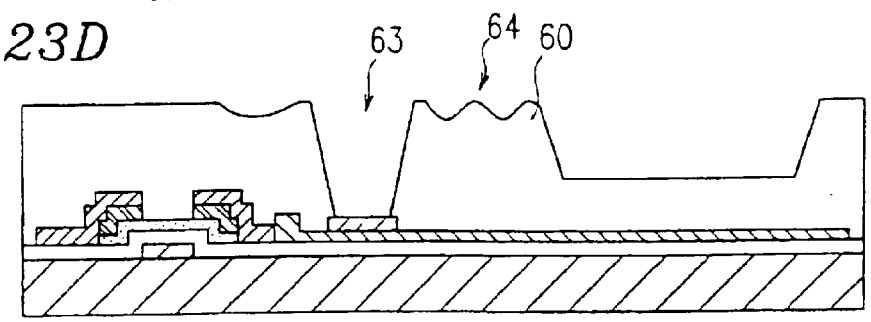

Next, as shown in FIG. 23D, the interlayer insulating layer 60 is formed. The interlayer insulating layer 60 is patterned by photolithography to form the contact hole 63 and to remove a part of the interlayer insulating layer 60 in the region T. Simultaneously, a surface of the interlayer insulating layer 60 in the region R (on which the reflective electrode 61 is to be formed) is formed wave-like.

By removing the part of the interlayer insulating layer 60 in the region T, the transmittance of the region T can be improved. However, the interlayer insulating layer 60 is not completely removed but remains at a certain thickness. This prevents electrocorrosion when the reflective electrode 61 is formed by patterning. In other words, the orientation state of the liquid crystal molecules can be substantially the same within each pixel area.

The surface of the interlayer insulating layer 60 in the region R appears to have a plurality of round protrusions 64 when seen from above. In cross-section, the surface area of the interlayer insulating layer 60 slowly fluctuates. When the reflective electrode 61 is formed on such a wave-like surface, the incident light is reflected by the wave-like surface of the reflective electrode 61 efficiently and scattered in an appropriate range of directions. The shape of the wave-like surface can be optimally determined in accordance with desired display characteristics. In the case where it is not necessary to scatter the light, the surface need not be wave-like.

The interlayer insulating layer 60 is formed of a single layer (thickness: 2.5 $\mu$m) of an organic resin in this example, but can be formed of a plurality of laminated layers of different materials. A relatively thick single layer of an organic resin as in this example is advantageous in that generation of a parasitic capacitance is avoided even when the reflective electrode 61 partially overlaps the TFT 57. As a result, the display quality is improved and the numerical aperture is raised. A relatively thick organic resin layer also facilitates formation of the wave-like surface.

Alternatively, the interlayer insulating layer 60 can be formed of a general inorganic layer such as, for example, $SiN_x$. Such a layer is advantageous in obtaining a high insulation although being relatively thin, but is disadvantageous in that formation of the wave-like surface is difficult. When it is not necessary to form the wave-like surface due to the desired display characteristics, such a layer is preferable.

Figure 23E:
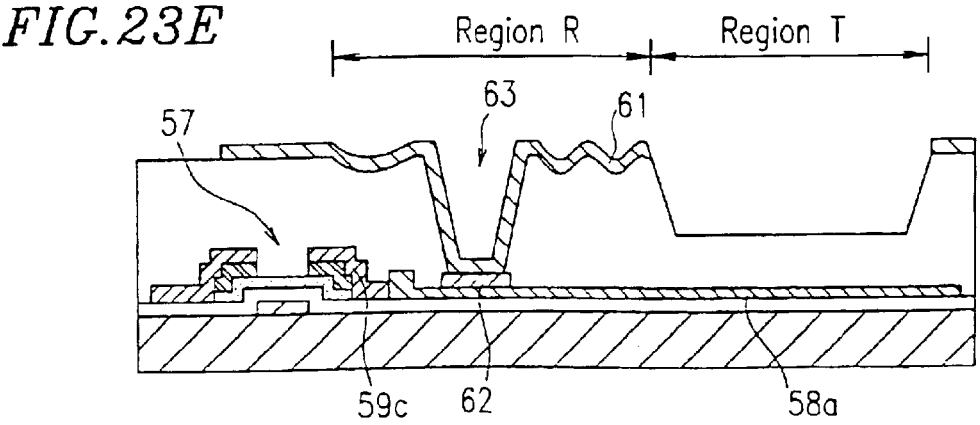

As shown in FIG. 23E, an Al layer is formed and patterned, thereby forming the reflective electrode 61 in the region R. The reflective electrode 61 is electrically connected to the transmissive electrode 58a and the drain electrode 59c of the TFT 57 through the contact hole 63 and the metal layer 62. The reflective electrode 61 is formed of Al in this example, but can be formed of other Al-containing alloys or conductive materials having a high light reflectance.

Thus, the active matrix substrate shown in FIGS. 21 and 22 is completed.

Although not shown, an alignment layer is formed on top of the active matrix substrate. The active matrix substrate equipped with the alignment layer is combined with a counter substrate including a transmissive electrode and equipped with an alignment layer. A liquid crystal material is injected into the gap between the two substrates. Thus, the LCD device in the sixth example is completed. When necessary, a color filter or a phase compensation element can be added.

As described above, a liquid crystal material used in the LCD device in this example is the guest-host liquid crystal material ZLI2327 (produced by Merck & Co., Inc.) containing a black pigment and also containing an optically active substance S-811 (produced by Merck & Co., Inc.) at a ratio of 0.5%.

In this example, the satisfactory display characteristics is obtained by setting the area ratio to the region T:region T=40:60. The area ratio is not limited to this but can be appropriately changed in accordance with the transmittance and reflectance of the regions T and R and the use of the LCD device. In this example, only one region T is provided at the center of the pixel area. A plurality of regions T can be provided, and the region T can be of any other shape.

In the LCD devices in the second embodiment, a pixel electrode includes a region T having a relatively high light transmittance located at a center thereof and a region R having a relatively high light reflectance arranged around the region T. Due to such a structure, the LCD device utilizes ambient light and illuminating light with less loss compared to the conventional LCD devices using a half-mirror. Moreover, the LCD devices in the second embodiment solve the problem of the conventional transmission-type LCD device that the visibility is lowered due to the surface reflection when the ambient light is bright and also the problem of the conventional reflection-type LCD device that satisfactory display is not obtained due to the lowered brightness when the ambient light is dark. In other words, the LCD devices in the second embodiment provide satisfactory display regardless of the ambient light intensity without requiring the dispersion in the light utilization factor due to the dispersion in the reflection characteristics to be controlled as precisely as in the case of the conventional reflection-type LCD devices.

The LCD device in this example can be produced with the general electrode and line materials and conditions used in the conventional transmission-type LCD devices and reflection-type LCD devices. The complicated conditions required for the conventional LCD devices using a half-mirror are not necessary. Accordingly, the LCD device in this example is produced relatively easily with satisfactory reproducibility. Moreover, the display characteristics, which are difficult with the conventional LCD devices using a half-mirror, can be performed relatively easily.

EXAMPLE 7

An LCD device in a seventh example according to the present invention will be described.

Figure 24:
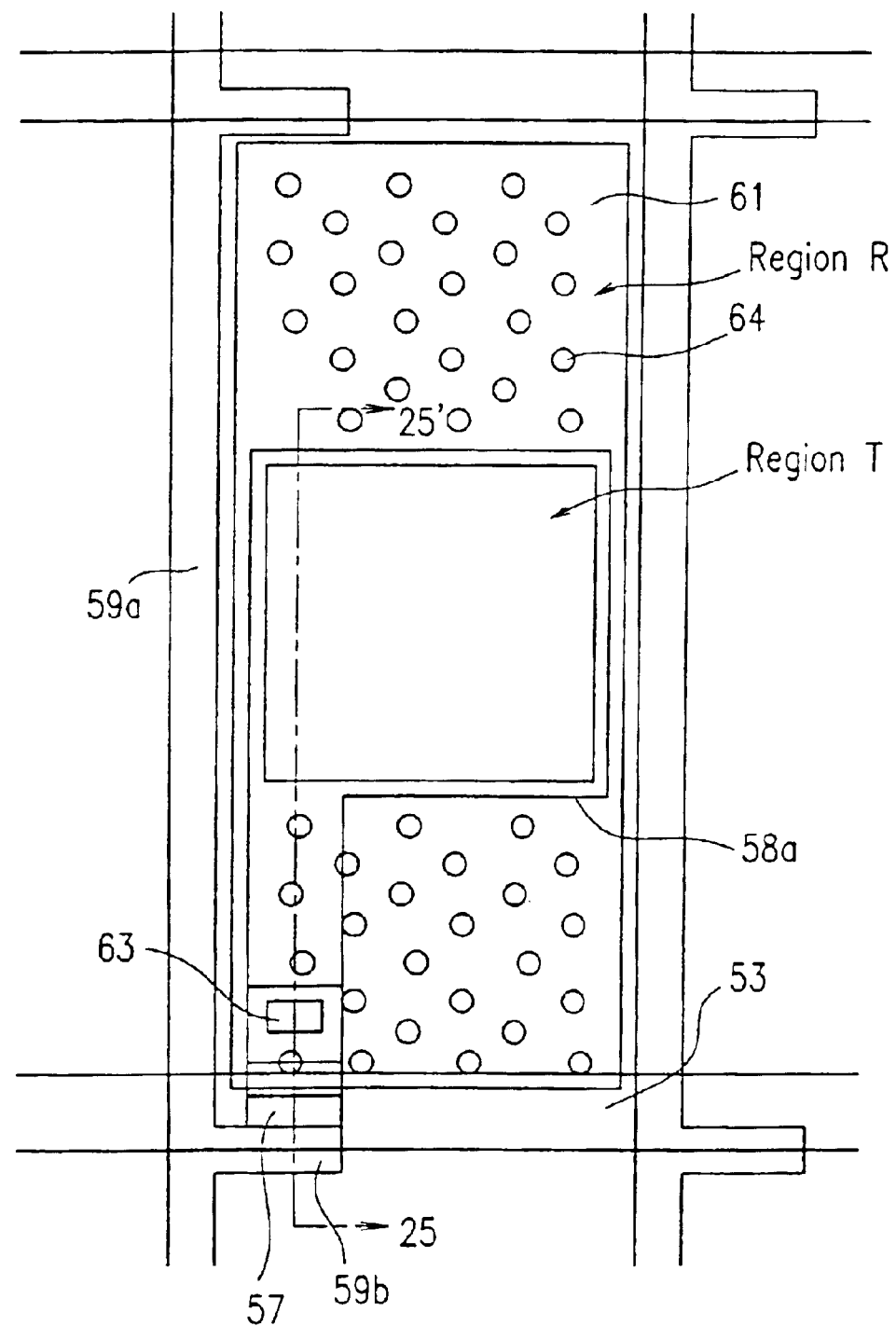
FIG. 24 is a plan view of an active matrix substrate of an LCD device in a seventh example according to the present invention.

FIG. 24 is a plan view of an active matrix substrate of the LCD device in the seventh example corresponding to one pixel area. FIG. 25 is a cross-sectional view of the LCD device taken along line 25–25' in FIG. 24.

The LCD device in the seventh example is different from the LCD device in the sixth example in the structure regarding the electric connection between the reflective electrode 61 as a part of the pixel electrode and the TFT 57 and the production method regarding the structure.

As shown in FIGS. 24 and 25, the drain electrode 59c of the TFT 57 is connected to the transmissive electrode 58a. The transmissive electrode 58a acts as a part of the pixel electrode for applying a voltage to the liquid crystal material in the region T. In the region R, the interlayer insulating layer 60 and the reflective electrode 61 are provided on the transmissive electrode 58a. The reflective electrode 61 is directly connected to the drain electrode 59c through the contact hole 63. The reflective electrode 61 also acts as a part of the pixel electrode. As in the sixth example, the transmissive electrode 58a formed of ITO is not directly connected to the reflective electrode 61 formed of Al. Due to such a structure, the TFT 57 is electrically connected to these materials with certainty without any undesirable possibility of electrocorrosion or the like, while utilizing the high reflectance of the ambient light in the region R and the high transmittance of the light from the backlight in the region T.

In this example, the electrocorrosion of ITO and Al is prevented. The present invention is effectively applicable to any combination of different materials which tend to cause electrocorrosion.

Hereinafter, the active matrix substrate shown in FIGS. 24 and 25 will be described.

The process until the semiconductor layer 55 and a layer to be the semiconductor contact layers 56a and 56b are formed is performed in the same manner as in the sixth example.

Then, a conductive layer is formed and patterned by photolithography, thereby forming the source line 59a, the source electrode 59b, the drain electrode 59c and a connecting metal layer 59d. The conductive layer is formed of a Cr-containing material in this example, but can be formed of other conductive materials such as, for example, Al, Mo, Ta, W, Cu or Ti.

Then, the transmissive electrode 58a is formed so as to partially overlap the connecting metal layer 59d. Alternatively, the connecting metal layer 59d can partially overlap the transmissive electrode 58a. In this example also, the transmissive electrode 58a is formed of ITO.

The source line 59a, the source electrode 59b, the drain electrode 59c and the connecting metal layer 59d can be formed on the transmissive electrode 58a.

Then, the interlayer insulating layer 60 is formed in the same manner as in the sixth example, and is patterned by photolithography to form the contact hole 63 and to remove a part of the interlayer insulating layer 60 in the region T. Then, the reflective electrode 61 is formed. In this example also, the reflective electrode 61 is formed of Al.

As can be appreciated, in this example, the transmissive electrode 58a formed of ITO is not directly connected to the reflective electrode 61 formed of Al. Due to such a structure, generation of malfunction due to electrocorrosion between ITO and Al is prevented at the contact portion, thus to improve the reliability. The metal layer 62, which is formed of the same material of the source electrode 59b, can be formed relatively easily.

EXAMPLE 8

In an eighth example, another methods for producing the LCD device described in the seventh example will be described with reference to FIG. 26A through 26C.

Figure 26A:
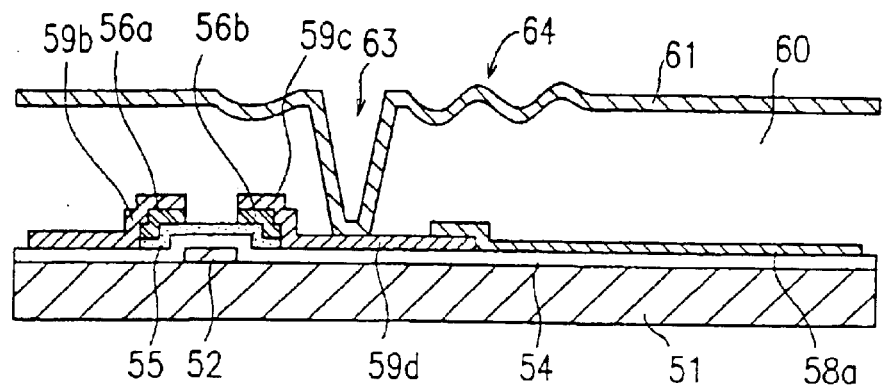
FIGS. 26A through 26C are cross-sectional views illustrating a method for forming an active matrix substrate of an LCD device in an eighth example according to the present invention.
Figure 26B:
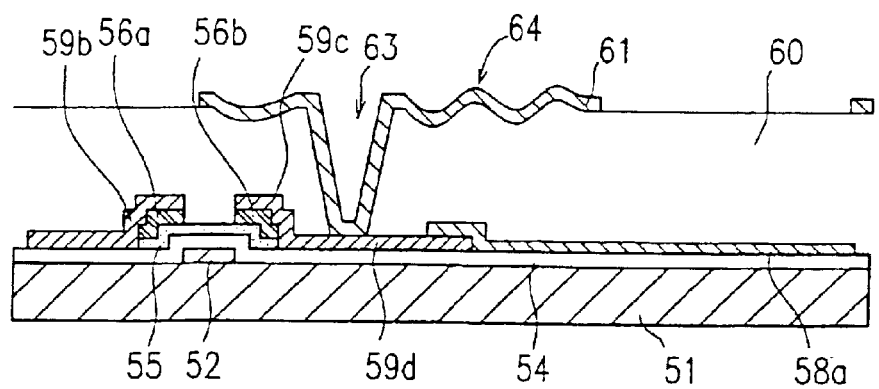
Figure 26C:
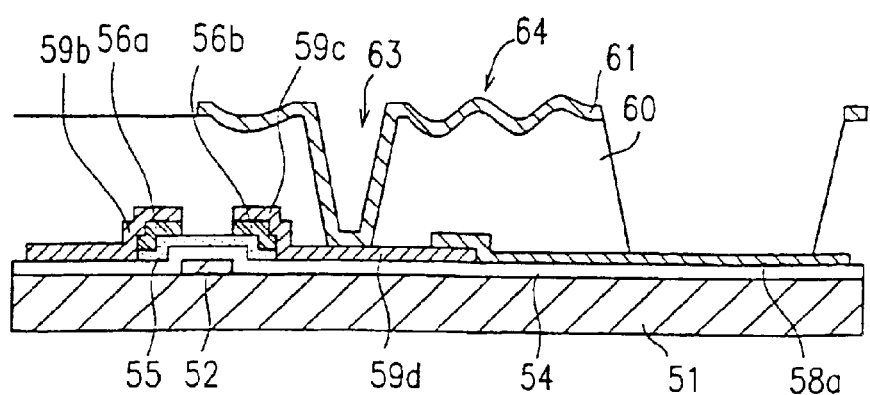

FIGS. 26A through 26C, corresponding to FIG. 25, are cross-sectional views illustrating a method for producing the LCD device described in the seventh example.

The process until the formation of the interlayer insulating layer 60 is performed as described in the seventh example.

Then, as shown in FIG. 26A, a part of the interlayer insulating layer 60 is removed by photolithography, thereby forming the contact hole 63. In the same step, the surface of the interlayer insulating layer 60 in the region R is formed wave-like so that the incident light is scattered by the surface. Unlike the seventh example, a part of the interlayer insulating layer 60 in the region T is not removed.

On the surface of the interlayer insulating layer 60, an Al layer or an Al-containing alloy layer is formed. The interlayer insulating layer 60 is formed of a single organic resin layer in this example, but can be formed of a plurality of layers of different materials. The surface of the interlayer insulating layer 60 need not be wave-like.

Then, as shown in FIG. 26B, the Al layer is patterned by photolithography, thereby forming the reflective electrode 61.

Next, as shown in FIG. 26C, the interlayer insulating layer 60 is removed in a part or the entirety of the region T.

In this manner, the active matrix substrate shown in FIGS. 24 and 25 is completed.

An LCD device having such an active matrix substrate is operable both in the transmission mode and the reflection mode simultaneously. The reflective electrode 61 formed of Al and the transmissive electrode 58a formed of ITO are not directly connected to each other after the LCD device is completed and thus do not cause electrocorrosion. Therefore, malfunction by electrocorrosion is prevented, thus improving the reliability of the LCD device. During the production process also, electrocorrosion is prevented since the transmissive electrode 58a is not exposed to an etchant while the reflective electrode 61 is formed by patterning.

EXAMPLE 9

An LCD device in a ninth example according to the present invention will be described.

The LCD device in the ninth example is different from the LCD device in the seventh and eighth examples in the order of forming the transmissive electrode 58a and the drain electrode 59c and in the step of forming the contact hole 63.

Figure 27A:
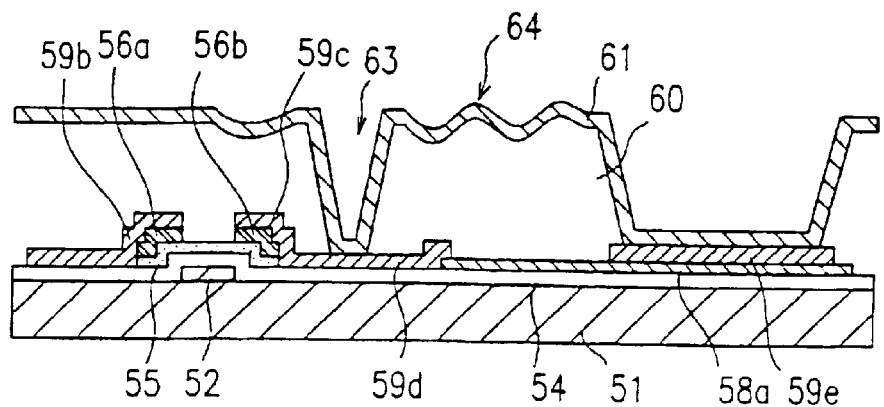
FIGS. 27A through 27C are cross-sectional views illustrating a method for forming an active matrix substrate of an LCD device in a ninth example according to the present invention.
Figure 27B:
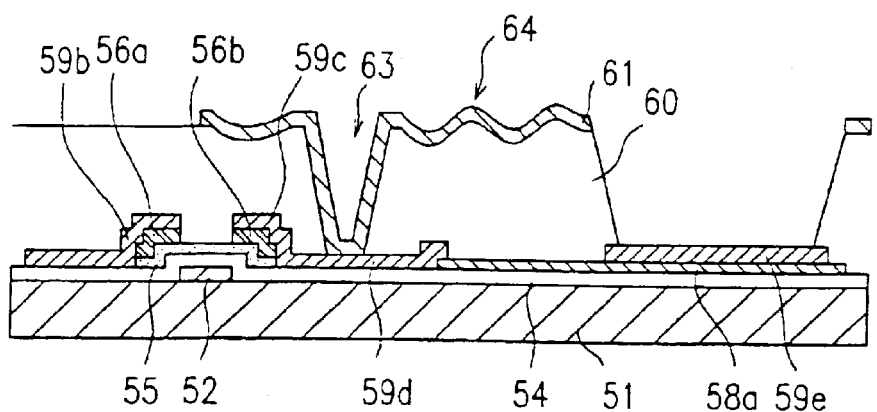
Figure 27C:
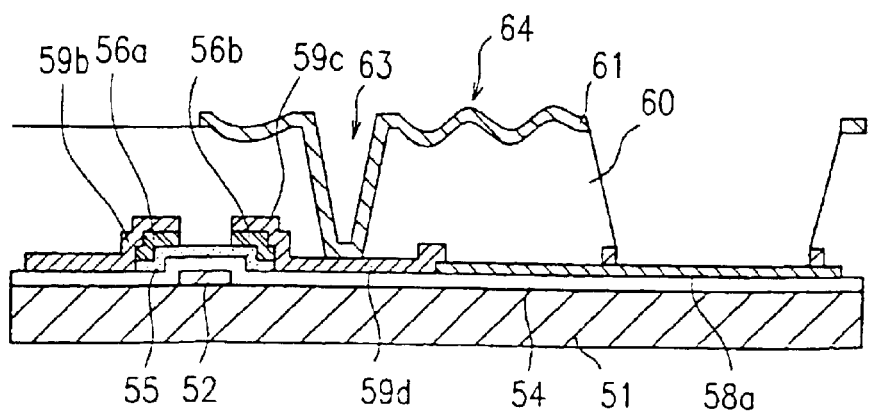

FIGS. 27A through 27C, corresponding to FIG. 25, are cross-sectional views illustrating a method for producing the LCD device in the ninth example.

The process until the formation of a layer to be the semiconductor contact layers 56a and 56b is performed as described in the sixth and seventh examples.

As shown in FIG. 27A, a light-transmissive conductive layer is formed and patterned by photolithography, thereby forming the transmissive electrode 58a. In this example, the transmissive electrode 58a is formed of ITO.

Then, a conductive layer is formed and patterned by photolithography, thereby forming the source line 59a, the source electrode 59b, the drain electrode 59c, the connecting metal layer 59d, and a metal layer 59e for the region T. The source electrode 59b is branched from the source line 59a. The drain electrode 59c, the connecting metal layer 59d and the metal layer 59e for the region T are electrically connected to one another. The conductive layer is formed of a Ta-containing material in this example, but can be formed of other conductive materials such as, for example, Al, Cr, Mo, W, Cu or Ti.

Then, etching is performed using the source electrode 59b and the drain electrode 59c as masks, thereby forming the semiconductor conduct layers 56a and 56b. Thus, the TFT 57 is completed.

Next, the interlayer insulating layer 60 is formed. The contact hole 63 is formed and also a part of the interlayer insulating layer 60 in the region T is removed by photolithography. In the same step, the surface of the interlayer insulating layer 60 in the region R is formed wave-like so as to scatter the incident light. On the surface, an Al layer or an Al-containing alloy layer is formed. The interlayer insulating layer 60 is formed of a single organic resin layer in this example, but can be formed of a plurality of layers of different materials. The surface of the interlayer insulating layer 60 need not be wave-like.

As shown in FIG. 27B, the Al or Al-containing alloy layer is formed by photolithography, thereby forming the reflective electrode 61.

Then, as shown in FIG. 27C, the layer 59e in the region T is partially or entirely removed by photolithography or by etching using the reflective electrode 61 as a mask. Alternatively, the layer 59e can be etched while the reflective electrode 61 is formed by patterned by etching.

As described above, in this example, the reflective electrode 61 formed of Al is not directly connected to the transmissive electrode 58a formed of ITO. Accordingly, electrocorrosion between Al and ITO is prevented after the LCD device is completed, and thus malfunction by electrocorrosion is also prevented, thus to improve the reliability. During the production process also, electrocorrosion is prevented since the transmissive electrode 58a is not exposed to an etchant while the reflective electrode 61 is formed by patterning.

EXAMPLE 10

An LCD device in a tenth example according to the present invention will be described.

The LCD device in the tenth example is different from the LCD device in the seventh and eighth examples in that the structure of the transmissive electrode 58a and the TFT 57 and in the step forming the contact hole 63.

Figure 28A:
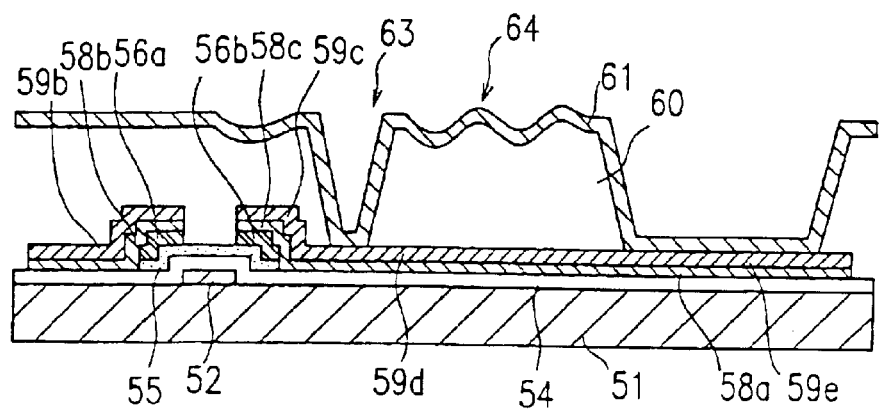
FIGS. 28A through 28C are cross-sectional views illustrating a method for forming an active matrix substrate of an LCD device in a tenth example according to the present invention.
Figure 28B:
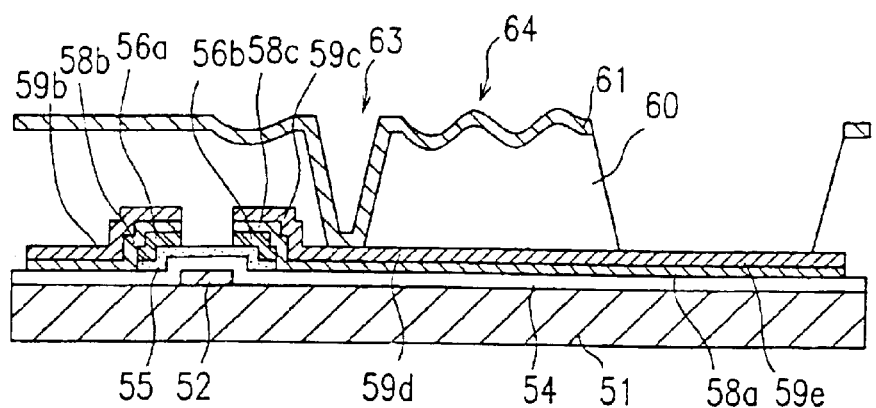
Figure 28C:
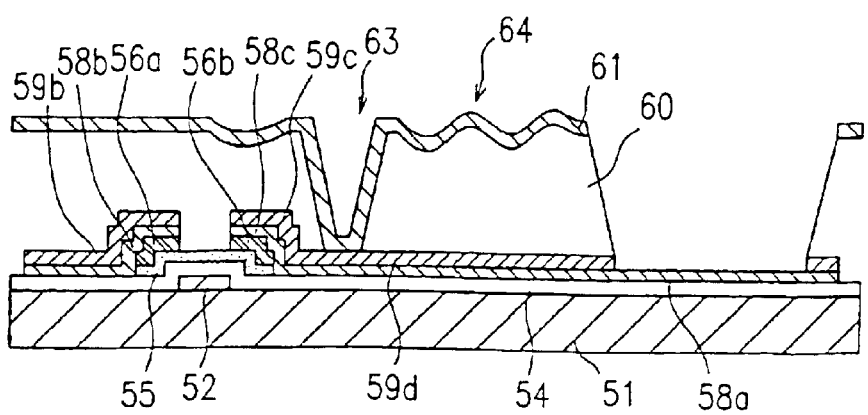

FIGS. 28A through 28C, corresponding to FIG. 25, are cross-sectional views illustrating a method for producing the LCD device in the tenth example.

The process until the formation of a layer to be the semiconductor contact layers 56a and 56b is performed as described in the sixth and seventh examples.

As shown in FIG. 28A, a light-transmissive conductive layer and a metal layer are sequentially formed. The metal layer is patterned by photolithography, thereby forming an upper half of the source line 59a, an upper half of the source electrode 59b, an upper half of the drain electrode 59c, the connecting metal layer 59d, and the metal layer 59e for the region T. Then, the light-transmissive conductive layer is patterned in the same patterns as those of the source line 59a, an upper half of the source electrode 59b, an upper half of the drain electrode 59c, the connecting metal layer 59d, and the metal layer 59e. Thus, a lower half of the source line, a lower half of the source electrode 58b, a lower half of the drain electrode 58c, and the transmissive electrode 58a.

As can be appreciated from the above, the source line, the source electrode and the drain electrode have a two-layer structure. Even when a disconnection or any other malfunction occurs in one of the two layers, a normal signal is sent through the other layer, thus realizing normal display.

In this example, the light-transmissive conductive layer is formed of ITO and the metal layer is formed of a Ta-containing material. The light-transmissive conductive layer can be etched successively from the metal layer or can be etched, after the mask for the metal layer is removed, using a separate mask.

Next, etching is performed using the source electrode 59b/58b and the drain electrode 59c/58c as masks, thereby forming the semiconductor contact layers 56a and 56b. Thus, the TFT 57 is completed.

Then, the interlayer insulating layer 60 is formed. The contact hole 63 is formed and also a part of the interlayer insulating layer 60 in the region T is removed by photolithography. In the same step, the surface of the interlayer insulating layer 60 in the region R is formed wave-like so as to scatter the incident light. On the surface, an Al layer or an Al-containing alloy layer is formed. The interlayer insulating layer 60 is formed of a single organic resin layer in this example, but can be formed of a plurality of layers of different materials. The surface of the interlayer insulating layer 60 need not be wave-like.

As shown in FIG. 28B, the Al or Al-containing alloy layer is formed by photolithography, thereby forming the reflective electrode 61.

Then, as shown in FIG. 28C, the layer 59e in the region T is partially or entirely removed by photolithography or by etching using the reflective electrode 61 as a mask. Alternatively, the layer 59e can be etched while the reflective electrode 61 is formed by patterned by etching.

As described above, in this example, the reflective electrode 61 formed of Al is not directly connected to the transmissive electrode 58a formed of ITO. Accordingly, electrocorrosion between Al and ITO is prevented after the LCD device is completed, and thus malfunction by electrocorrosion is also prevented, thus to improve the reliability. During the production process also, electrocorrosion is prevented since the transmissive electrode 58a is not exposed to an etchant while the reflective electrode 61 is formed by patterning. Furthermore, since the pixel electrode (transmissive electrode 58a) is formed in the same step as the other lines and electrodes, the production method is simplified.

The pixel electrode (transmissive electrode 58a) is formed in the same step as the source line, the source electrode and the drain electrode in this example, but can be formed in the same step as the gate line and the gate electrode. In lieu of the transmissive electrode 58a, the reflective electrode can be formed in the same step as the other lines and electrodes.

EXAMPLE 11

An LCD device in an eleventh example according to the present invention will be described. Also described is a structure of a terminal section and a method for forming the same.

The LCD device in the eleventh example is different from the LCD device in the sixth through tenth examples in that the transmissive electrode 58a is provided in the same layer as the gate electrode and the gate line.

Figure 29A:
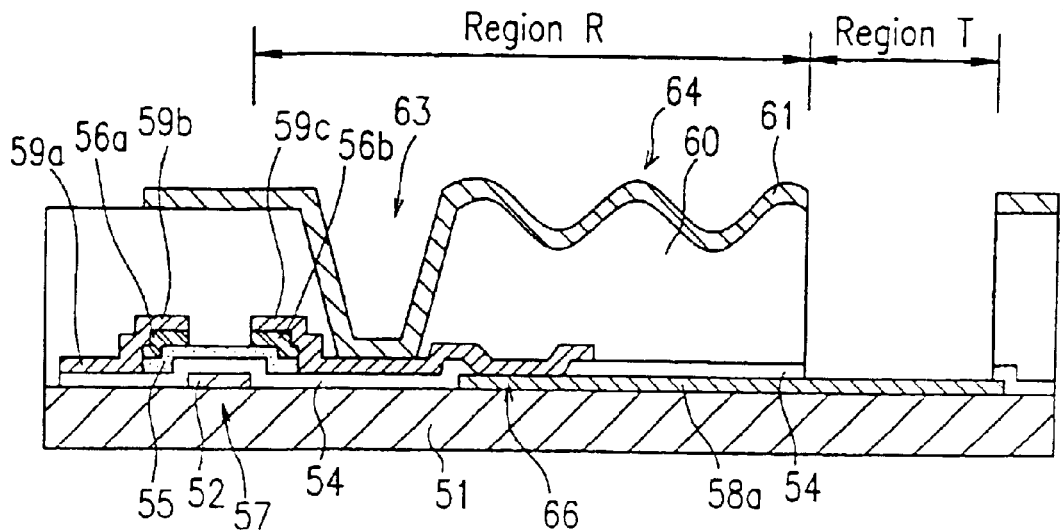
FIGS. 29A through 29C are cross-sectional views illustrating a method for forming an active matrix substrate of an LCD device in an eleventh example according to the present invention.
Figure 29B:
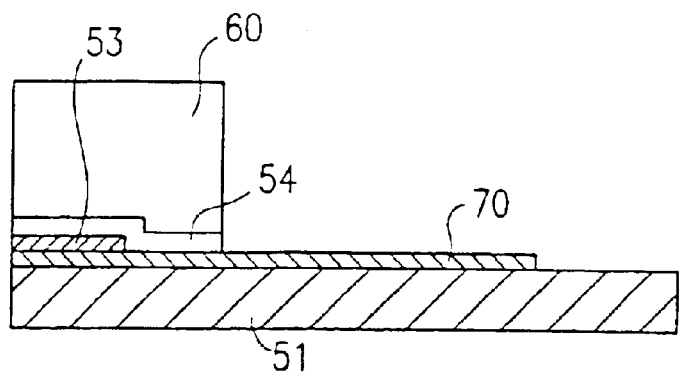
Figure 29C:
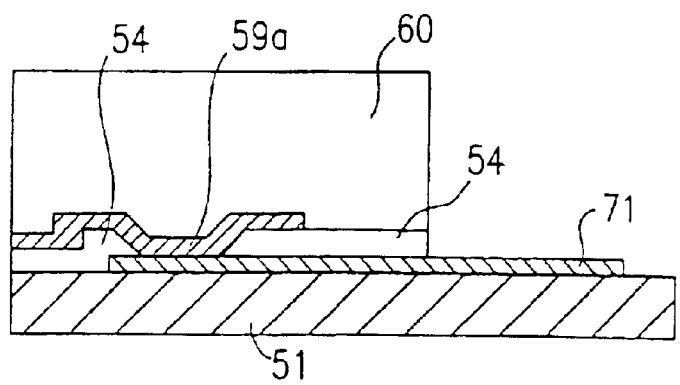

FIGS. 29A through 29C are cross-sectional views illustrating a method for producing the LCD device in the eleventh example, especially the active matrix substrate and the terminal section of the LCD device. FIG. 29A, corresponding to FIG. 25, shows a structure of a display section of the LCD device. FIG. 30 is a plan view of the LCD device in the eleventh example. FIG. 29B, which is a cross-sectional view of the LCD device taken along line 29B–29B' in FIG. 30, shows a terminal structure of a gate terminal section. FIG. 29C, which is a cross-sectional view of the LCD device taken along line 29C–29C' in FIG. 30, shows a terminal structure of a source terminal section.

As shown in FIG. 29A, the TFT 57 is provided on the insulating plate 51. The transmissive electrode 58a is provided in the same layer as the gate electrode 52 of the TFT 57 and the gate line (not shown). The drain electrode 59c is connected to the reflective electrode 61 through the contact hole 63 in the interlayer insulating layer 60 and also connected to the transmissive electrode 58a through a contact hole 63 formed in the gate insulating layer 54.

According to such a structure, after the transmissive electrode 58a is formed but before the reflective electrode 61 is completely formed in the same pixel area as the transmissive electrode 58a, at least the transmissive electrode 58a is covered with the gate insulating layer 54. Therefore, generation of electrocorrosion due to the potential difference between the electrode 58a and 61 is prevented.

In the gate and source terminal sections shown in FIGS. 29B and 29C also, a gate line (70 and 53) and a source line 71 which are formed in the same layer as the transmissive electrode 58a are covered with the gate insulating layer 54 and the interlayer insulating layer 60. Accordingly, the gate line (70 and 53) and the source line 71 are covered with the insulating layers until the reflective electrode 61 is completely formed on the interlayer insulating layer 61. Thus, electrocorrosion between the gate line 70+53/source line 71 and the reflective electrode 61 formed of different metal materials is prevented.

With reference to FIGS. 31A through 31E and 32A through 32C, a method for producing the LCD device in the eleventh example will be described regarding the display section.

Figure 31A:
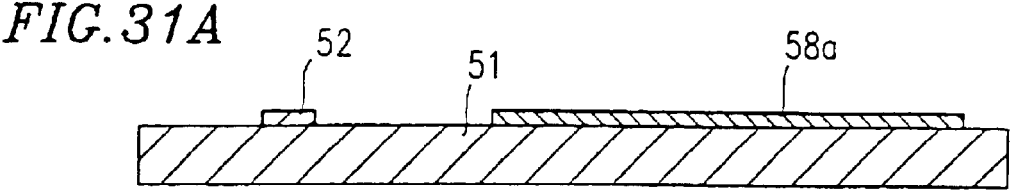
FIGS. 31A through 31E and 32A through 32C are cross-sectional views illustrating a method for forming a display section of the LCD device in the eleventh example.

As shown in FIG. 31A, a light-transmissive conductive layer is formed on the insulating plate 51 and patterned by photolithography, thereby forming the transmissive electrode 58a. In this example, the insulating plate 51 is formed of glass, and the transmissive electrode 58a is formed of ITO.

Then, the gate electrode 52 and the gate line (not shown) are formed by forming a layer on the insulating plate 51 and patterning the layer by photolithography. The gate electrode 52 and the gate line are formed of a Ta-containing material in this example, but can be formed of other conductive materials such as, for example, Al, Cr, Mo, W, Cu or Ti.

The gate electrode 52 and the gate line can be formed before the transmissive electrode 58a.

Figure 31B:
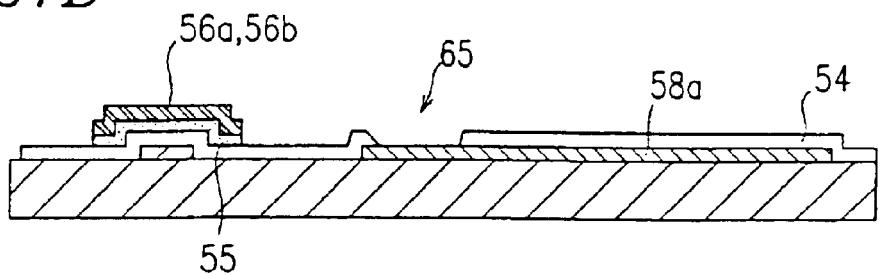

Then, as shown in FIG. 31B, the gate insulating layer 54 of $SiN_x$, the semiconductor layer 55 of a-So, and a P-doped $n^+$-a-So layer for the semiconductor contact layers 56a and 56b are sequentially formed by CVD, and then patterned by photolithography.

The contact hole 63 is formed in the gate insulating layer 54 for electrically connecting the transmissive electrode 58a and the drain electrode 59c to be formed later to each other.

The gate insulating layer 54 on the gate terminal (FIG. 29B) and the source terminal (FIG. 29C) in the gate and source terminal sections can be removed in the same step.

Figure 31C:
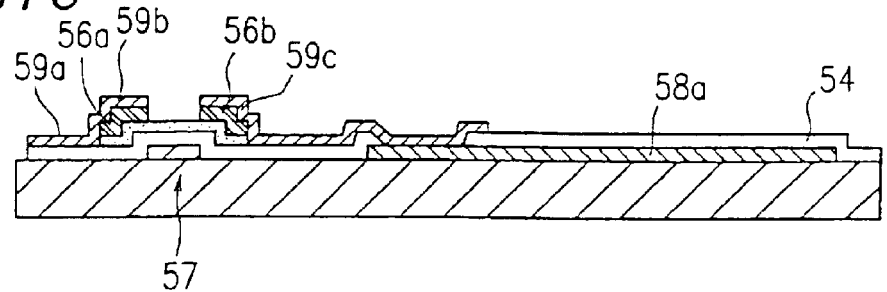

Next, as shown in FIG. 31C, a conductive layer is formed and patterned by photolithography, thereby forming the source line 59a, the source electrode 59b and the drain electrode 59c. The conductive layer is formed of a Cr-containing material in this example, but can be formed of other conductive materials such as, for example, Al, Mo, Ta, W, Cu or Ti.

Then, etching is performed using the source electrode 59b and the drain electrode 59c, thereby forming the semiconductor contact layers 56a and 56b. Thus, the TFT 57 is completed.

Figure 31D:
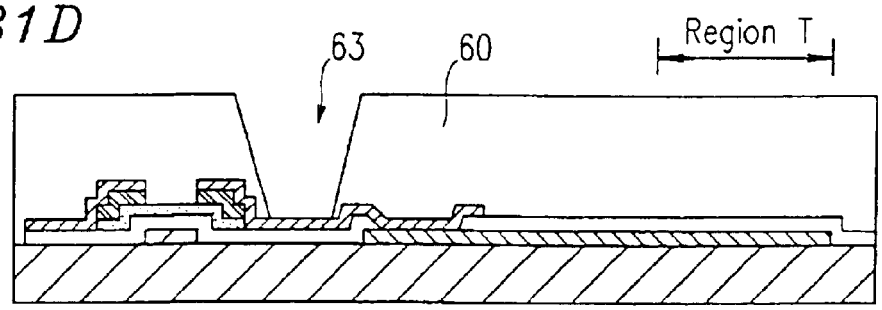

As shown in FIG. 31D, the interlayer insulating layer 60 is formed, and the contact hole 63 is formed in the interlayer insulating layer 60 by photolithography. A part of the interlayer insulating layer 60 in the region T is not removed in this step, but after the reflective electrode 61 is formed.

Figure 31E:
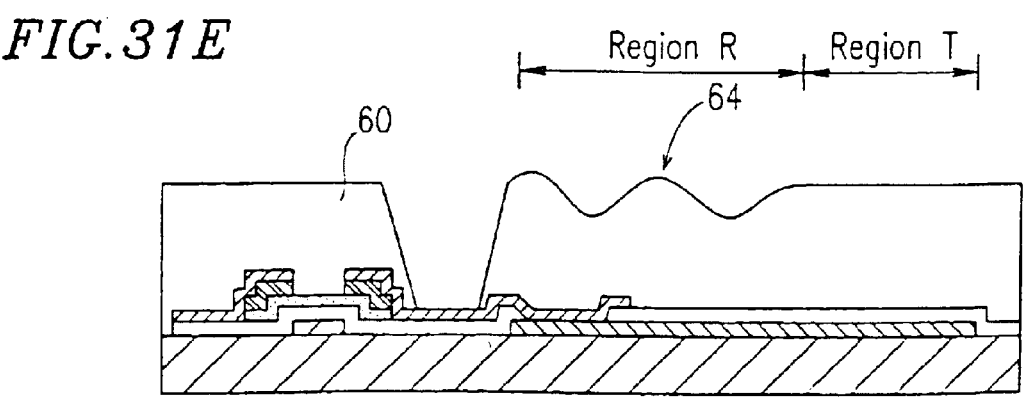

As shown in FIG. 31E, the surface of the interlayer insulating layer 60 is formed wave-like by photolithography.

The interlayer insulating layer 60 is formed of a single layer of an organic insulating material in this example, but can be formed of a plurality of layers of different materials. The surface of the interlayer insulating layer 60 need not be wave-like.

Figure 32A:
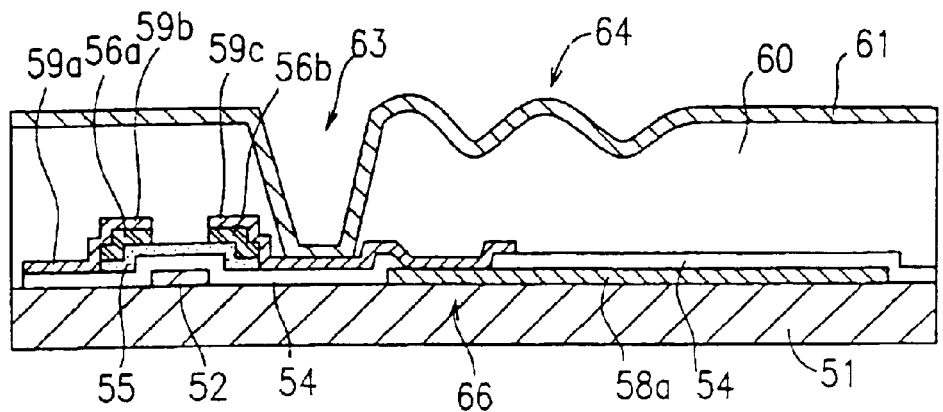

Then, as shown in FIG. 32A, a conductive layer having a relatively high reflectance is formed on the surface of the interlayer insulating layer 60.

Figure 32B:
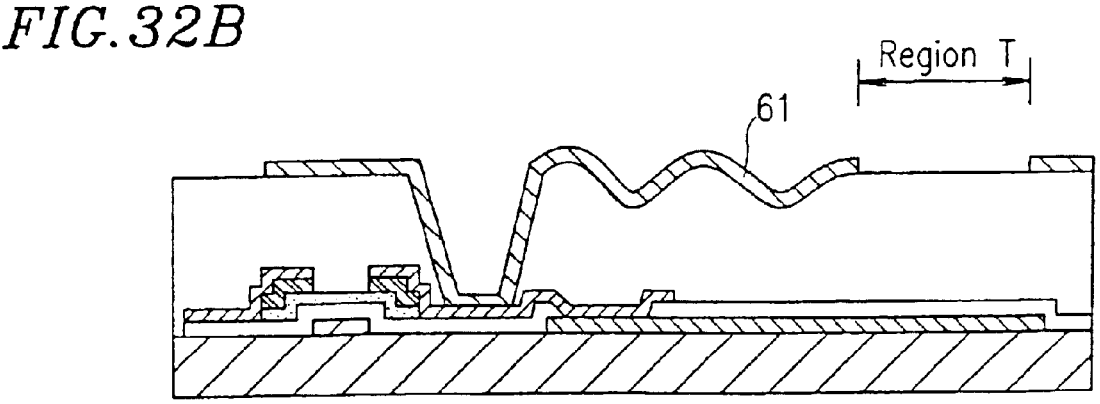

As shown in FIG. 32B, the conductive layer is patterned by photolithography, thereby forming the reflective electrode 61. The reflective electrode 61 is not formed at least in the region T.

Figure 32C:
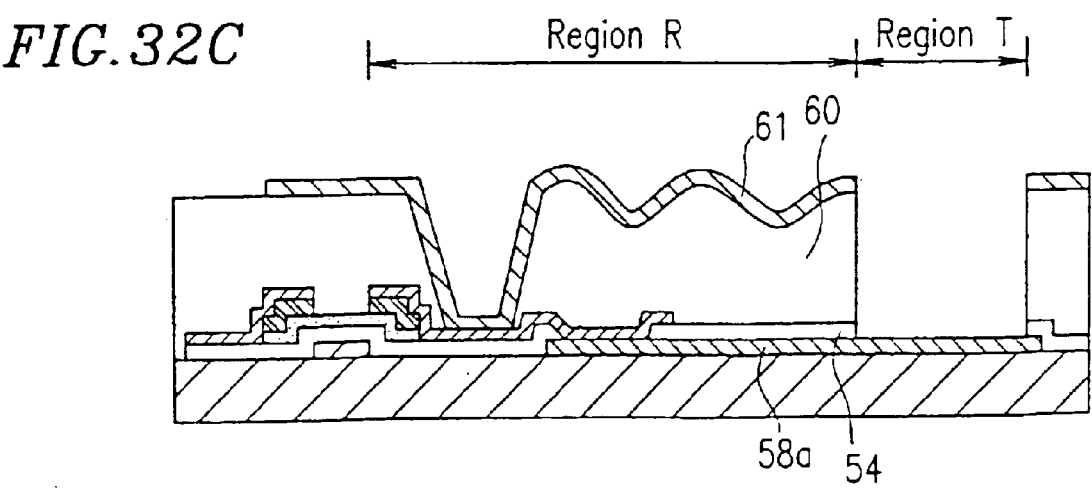

Then, as shown in FIG. 32C, the part of the interlayer insulating layer 60 in the region T is removed. A part of the gate insulating layer 54 in the region T is also removed. Both the insulating layers 54 and 60 are preferably removed from the region T since the layers may undesirably cause a voltage drop, thus preventing sufficient voltage to the liquid crystal material. Especially in the case where a voltage is applied across the liquid crystal material by the transmissive electrode 58a and the reflective electrode 61 which are electrically connected to each other, the existence of the insulating layers in the region T causes a difference between the voltages applied across the liquid crystal material in the region T and the region R and thus is not preferable.

In this manner, the active matrix substrate shown in FIG. 29A is completed.

An alignment layer is formed on the active matrix substrate, and alignment treatment is performed to the alignment layer when necessary. Then, the active matrix substrate is combined with a counter electrode. A liquid crystal material is injected into the gap between the substrates. Thus, the LCD device in the eleventh example is completed.

With reference to FIGS. 33A through 33F, a method for forming the gate terminal section will be described. The gate terminal section can be formed in the same steps as those of the display section.

Figure 33A:
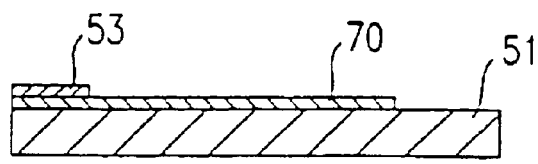
FIGS. 33A through 33F are cross-sectional views illustrating a method for forming a gate terminal section of the LCD device in the eleventh example.

As shown in FIG. 33A, a light-transmissive conductive layer acting as a lower layer 70 of the gate line is formed on the insulating plate 51. In the same step, the transmissive electrode 58a (FIG. 31a) is formed in the display section. An upper layer 53 of the gate line is formed on the lower layer 70. Thus, the lower layer 70 and the upper layer 53 of the gate line are electrically connected to each other (corresponding to the step shown in FIG. 31A).

Figure 33D:
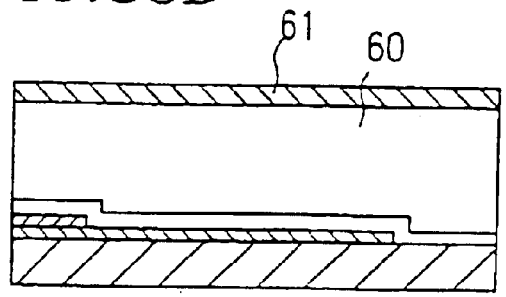
Figure 33B:
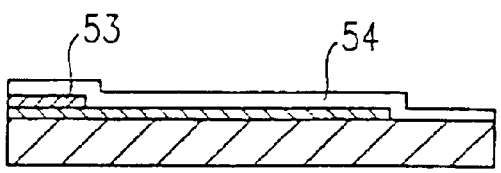

As shown in FIG. 33B, the gate insulating layer 54 is formed on the gate line and the gate terminal (corresponding to the step shown in FIG. 31B). A part of the gate insulating layer 54 on the gate terminal is not removed in this step but later.

Then, the TFT 57 is completed in the display section (FIG. 31C).

Figure 33E:
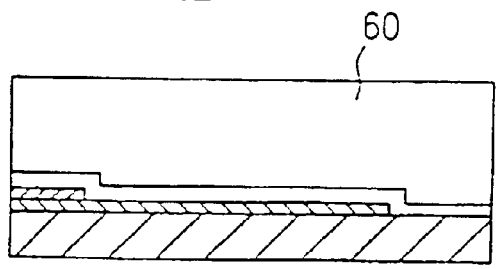
Figure 33C:
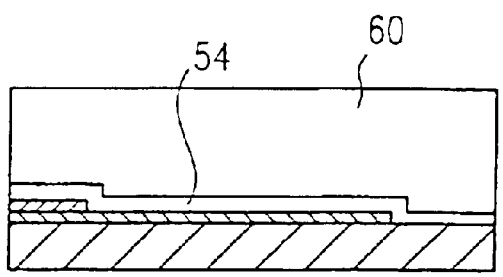

As shown in FIG. 33C, the interlayer insulating layer 60 is formed on the gate insulating layer 54 (corresponding to the step shown in FIG. 31D).

As shown in FIG. 33D, a conductive layer used for the reflective electrode 61 is formed on the interlayer insulating layer 60 (corresponding to the step shown in FIG. 32A).

As shown in FIG. 33E, the conductive layer is patterned to form the reflective electrode 61 (FIG. 32B) in the display section. Accordingly, a part of the conductive layer in the gate terminal section is removed.

Figure 33F:
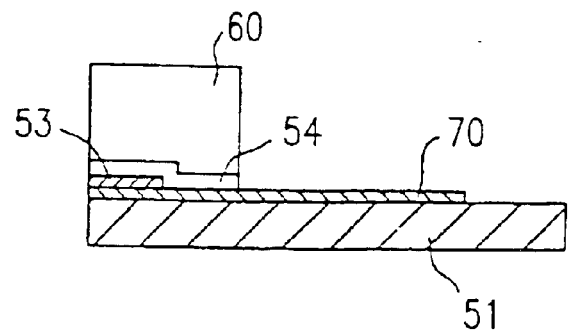

As shown in FIG. 33F, a part of the gate insulating layer 54 and a part of the interlayer insulating layer 60 which are on the gate terminal are removed. In the same step, the part of the gate insulating layer 54 and the interlayer insulating layer 60 in the region T are removed in the display section (FIG. 32C).

As described above, in the gate terminal section as well as in the display section, the terminal and the gate line are covered with the gate insulating layer 54 and the interlayer insulating layer 60 until the reflective electrode 61 is completely formed. Thus, electrocorrosion between the gate terminal/gate line and the reflective electrode 61 formed of different metal materials is prevented.

The source terminal section (FIG. 29C) can be formed in the same manner in the same steps as those of the display section. Thus, electrocorrosion is prevented.

Figure 34A:
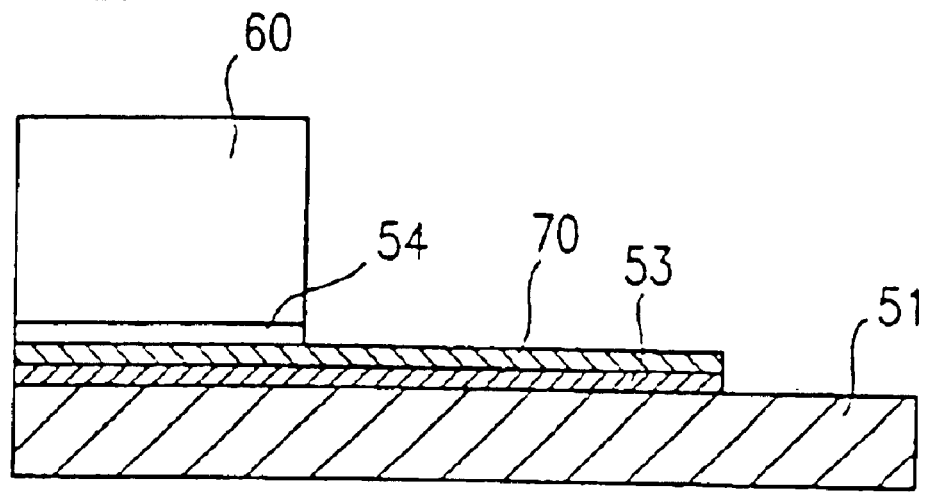
FIG. 34A is a cross-sectional view of a gate terminal section of an LCD device in a modification of the eleventh example.
Figure 34B:
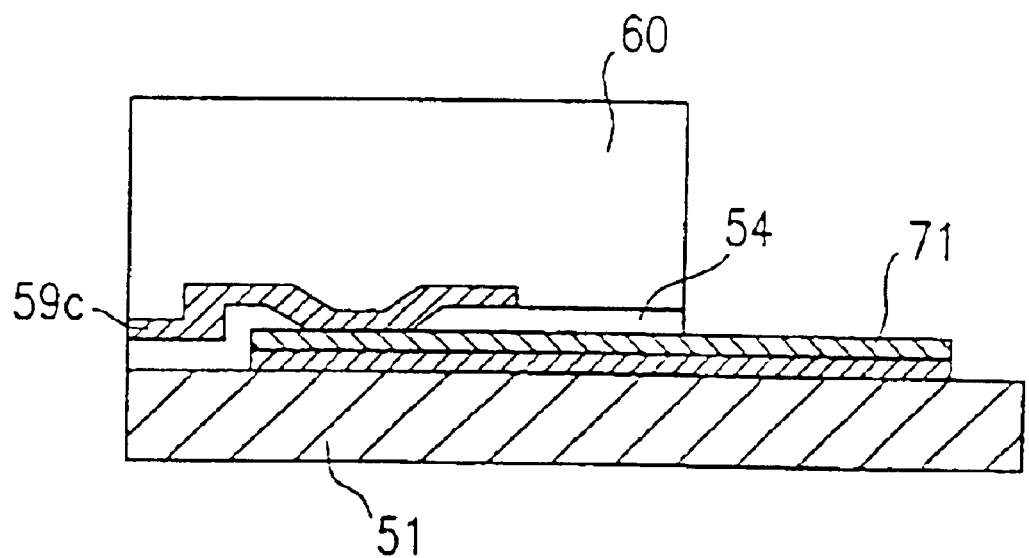
FIG. 34B is a cross-sectional view of a source terminal section of an LCD device in a modification of the eleventh example.

In the case where, in the display section, the gate electrode 52 and the gate line are formed before the transmissive electrode 58a, electrocorrosion is effectively prevented. FIG. 34A shows a cross-sectional view of the gate terminal section formed in this manner, and FIG. 34B shows a cross-sectional view of the source terminal section formed in this manner. Both the gate line and the source both have a two-layer structure formed of a gate or source material and a transmissive material.

In this structure also, the gate and source lines are covered with at least by a gate insulating layer until the reflective electrode is completely formed. Thus, electrocorrosion is effectively prevented.

EXAMPLE 12

After the step described with reference to FIG. 31C, the steps shown in FIGS. 35A through 35C can be alternatively used. Electrocorrosion is effectively prevented in such a method.

Figure 35A:
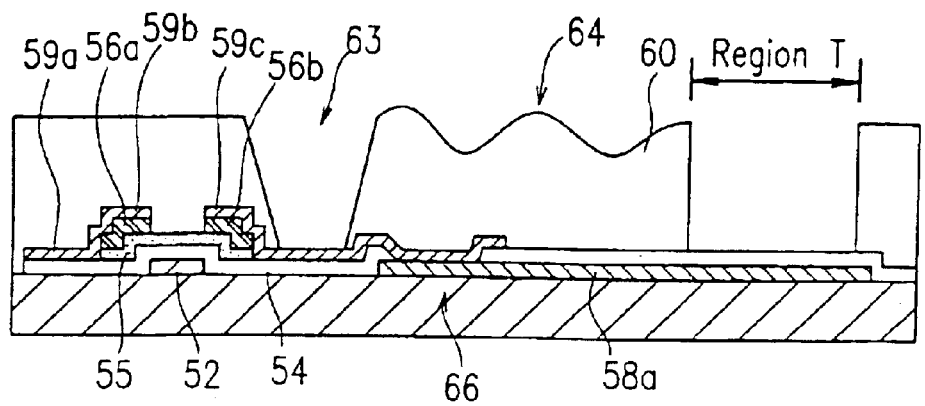
FIGS. 35A through 35C are cross-sectional view of a method for producing an LCD device in a twelfth example according to the present invention.

As shown in FIG. 35A, the interlayer insulating layer 60 is formed. The contact hole 63 is formed in the interlayer insulating layer 60 by photolithography. In the same step, a part of the interlayer insulating layer 60 in the region T is removed. The surface of the interlayer insulating layer 60 is formed wave-like.

Figure 35B:
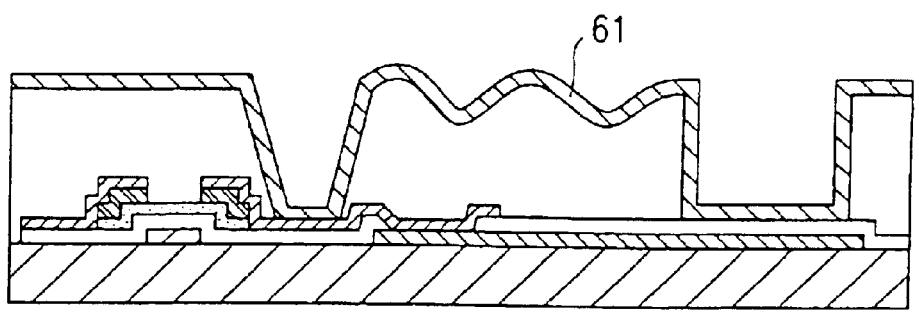

Next, as shown in FIG. 35B, a conductive layer is formed on the surface of the interlayer insulating layer 60.

Figure 35C:
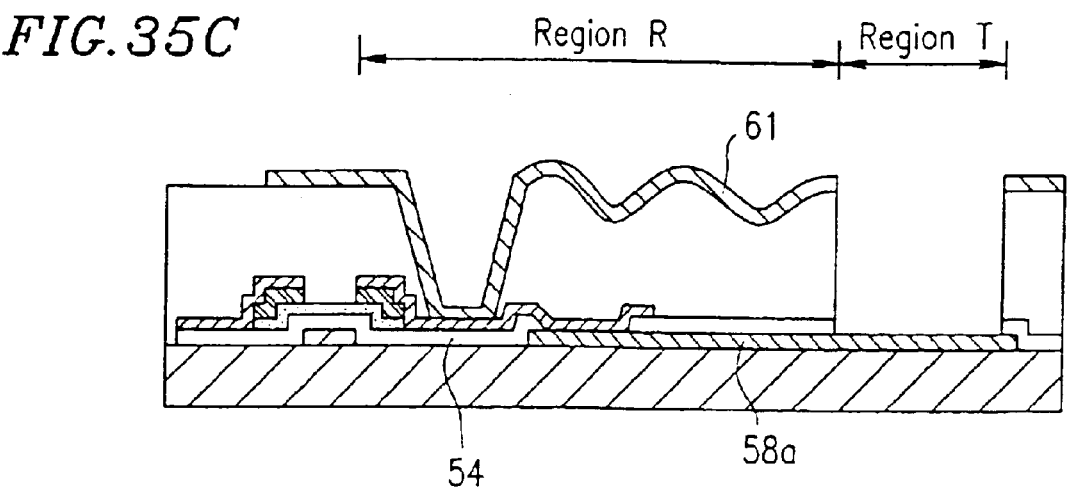

As shown in FIG. 35C, the conductive layer is patterned so as to remove a part thereof in the region T, thereby forming the reflective electrode 61.

According to such a method, the transmissive electrode 58a is covered with the gate insulating electrode 54 until the reflective electrode 61 is completely formed. Thus, electrocorrosion between the reflective electrode 61 and the transmissive electrode 58a which are formed of different metal materials is effectively prevented. However, the transmissive electrode 58a is covered only by the gate insulating layer 54 in this method. Accordingly, the method described with reference to FIGS. 31A through 31E and 32A through 32C is more effective in preventing electrocorrosion.

Since the part of the interlayer insulating layer 60 in the region T is removed in the same step of forming the contact hole 63, the number of steps is reduced compared to the method described above with reference to FIGS. 31A through 31E and 32A through 32C.

EXAMPLE 13

An electrode structure for matching the electro-optical characteristics of the reflective region and the transmissive region in a transmission- and reflection-type LCD device according to the present invention will be described. There are two methods for matching the electro-optical characteristics (voltage-brightness characteristics) of the reflective region and the transmissive region. According to one method, the thickness of the liquid crystal layer in the reflective region is changed from the thickness of the liquid crystal in the transmissive region. According to the other method, different levels of voltages are applied across the liquid crystal layer in the reflective region and the transmissive region.

Figure 36:
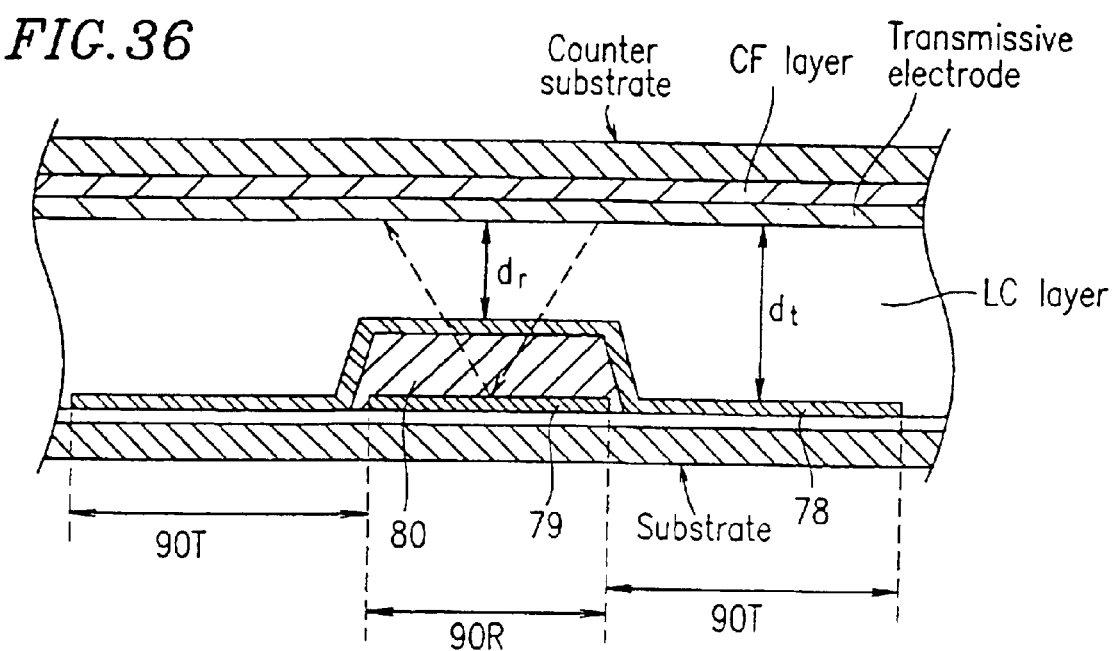
FIG. 36 is a cross-sectional view of an LCD device produced by one method in a thirteenth example according to the present invention.

The first method will be described with reference to FIG. 36. FIG. 36 schematically shows a cross-sectional view of one pixel area of the LCD device according to the present invention. The LCD device includes a counter substrate including a color filter layer and a transmissive electrode (counter electrode), another substrate including a reflective region 90R and a transmissive region 90T, and a liquid crystal layer interposed between the two substrates. The transparent electrode is provided in the vicinity of the liquid crystal layer, and the color filter layer is provided outside the transparent electrode with respect to the liquid crystal layer. The reflective region 90R and the transmissive region 90T are provided in the vicinity of the liquid crystal layer. Needless to say, the color filter can be eliminated.

The reflective region 90R includes a transmissive electrode 78 (e.g., ITO), a reflective layer 79 (e.g., Al), and a transparent interlayer insulating layer 80 (e.g., polymeric resin) provided on the reflective layer 79. The transmissive region 90T includes the transmissive electrode 78. The thickness dr of the liquid crystal layer in the reflective region 90R and the thickness dt of the liquid crystal layer in the transmissive region 90T are independently adjusted by changing the thickness of the interlayer insulating layer 80 in each region.

Light used for display in the transmissive region is transmitted once through the liquid crystal layer having a thickness of dt, whereas light used for display in the reflective region is transmitted twice through the liquid crystal layer having a thickness of dr. In order to match the retardation by the liquid crystal layer in the reflective region with the retardation by the liquid crystal layer in the transmissive region, the thicknesses dt and dr are preferably set so as to achieve the relationship dt=2·dr. For display in the reflective region, however, light incident on the reflective layer 79 at an angle as indicated by dashed arrows is also used. Therefore, the relationship dt>2·dr is more preferable.

Figure 37A:
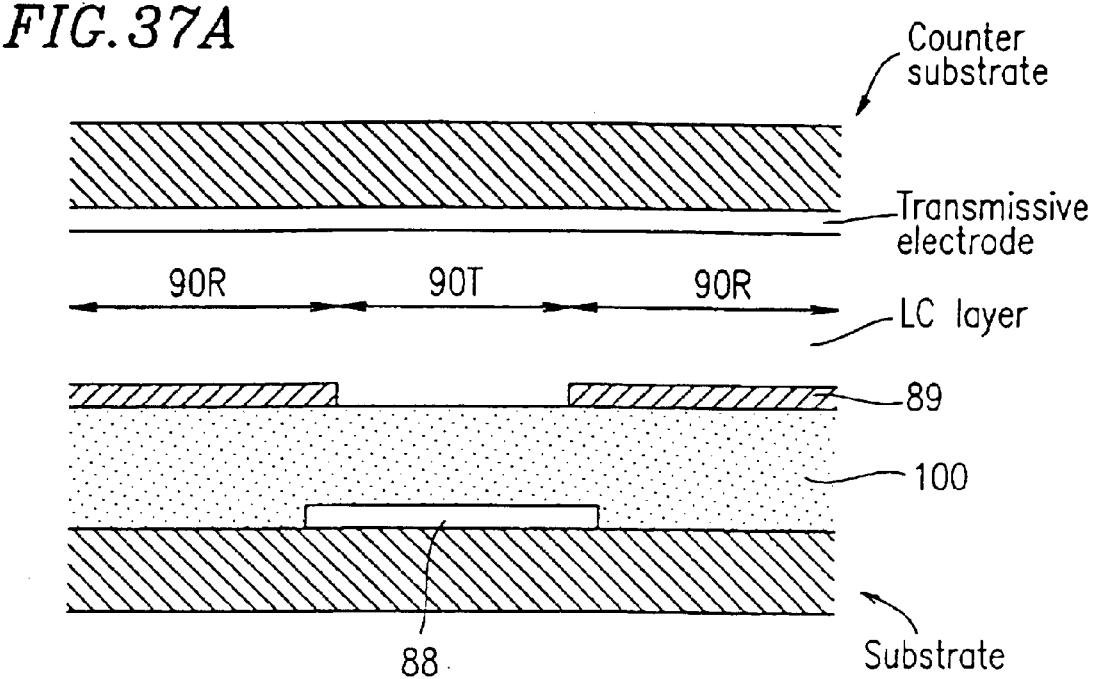
FIG. 37A is a cross-sectional view of an LCD device produced by another method in a thirteenth example according to the present invention.
Figure 37B:
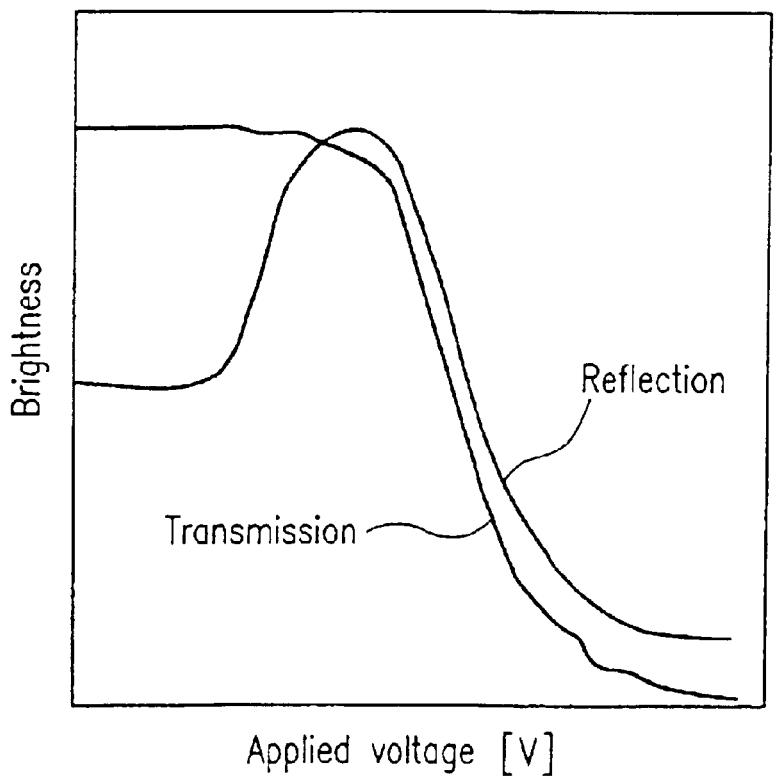
FIG. 37B is a graph illustrating the voltage-brightness relationship of the LCD device shown in FIG. 37A.

The second method will be described with reference to FIGS. 37A, 37B, 38A and 38B. FIG. 37A is a cross-sectional view of one pixel area of the LCD device according to the present invention. FIG. 37B is a graph illustrating the electro-optical characteristics of the LCD device shown in FIG. 37A.

As shown in FIG. 37A, the LCD device includes a counter substrate including a transmissive electrode (counter electrode), another substrate including a reflective region 90R and a transmissive region 90T, and a liquid crystal layer interposed between the substrates. The counter electrode is provided in the vicinity of the liquid crystal layer, and the reflective region 90R and the transmissive region 90T are provided in the vicinity of the liquid crystal layer.

The reflective region 90R includes a transmissive electrode 88 (e.g., ITO), a reflective electrode 89 (e.g., Al), and a transparent interlayer insulating layer 100 (e.g., polymeric resin) provided on the transmissive layer 88. Since the thickness of the reflective electrode 89 is smaller than the thickness of the liquid crystal layer, the thickness of the liquid crystal layer is substantially the same in the reflective region 90R and the transmissive region 90T. Accordingly, the retardation by the liquid crystal layer is different between the reflective region 90R and the transmissive region 90T. As a result, the electro-optical characteristics in the reflective region 90R and the transmissive region 90T are different as shown in FIG. 37B.

Figure 38A:
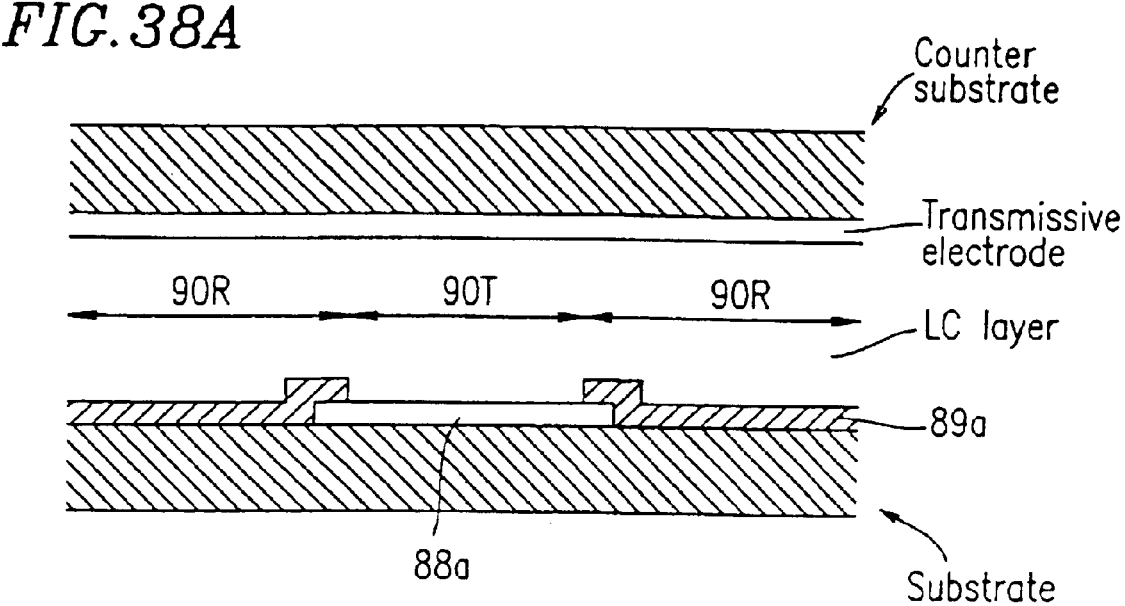
FIG. 38A is a cross-sectional view of an LCD device produced by a comparative method.
Figure 38B:
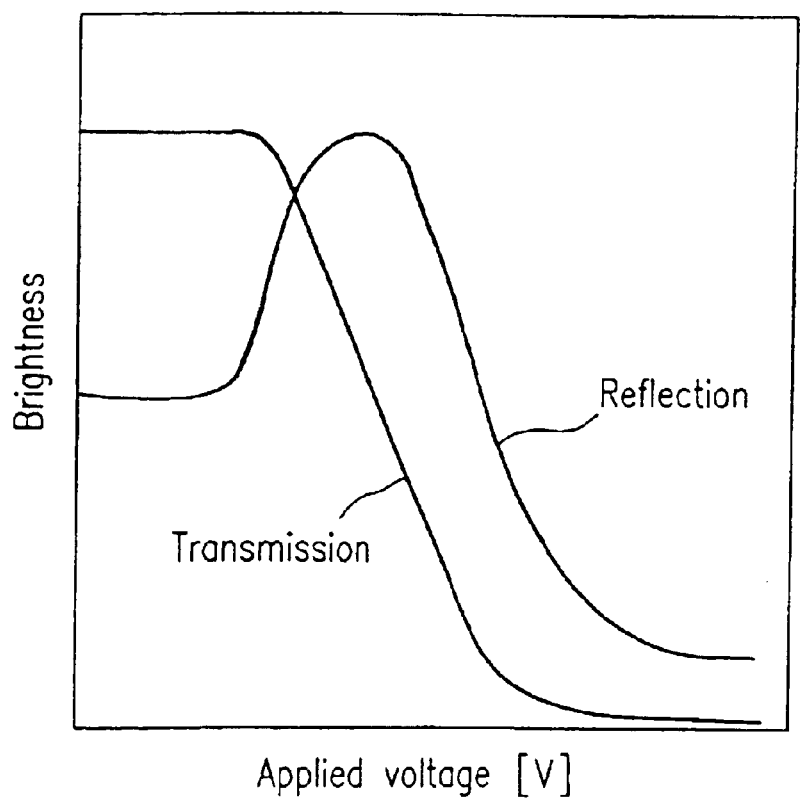
FIG. 38B is a graph illustrating the voltage-brightness relationship of the LCD device shown in FIG. 38A.

This phenomenon will be described with reference to FIGS. 38A and 38B. FIG. 38A schematically shows a cross-sectional view of one pixel area of the LCD device, which is different from the LCD device shown in FIG. 37A in that the latter does not include an interlayer insulating layer. FIG. 38B is a graph illustrating the electro-optical characteristics of the LCD device shown in FIG. 38A. In the LCD device shown in FIG. 38A, the thickness of the liquid crystal layer is substantially the same in the reflective region 90R and the transmissive region 90T. An identical level of voltage is applied across the liquid crystal layer by a transmissive electrode 88a and a reflective electrode 89a in the reflective region 90R and in the transmissive region 90T. Accordingly, the retardation by the liquid crystal layer is significantly different between in the reflective region 90R and the transmissive region 90T. Therefore, the electro-optical characteristics are significantly different in the reflection mode and the transmission mode.

In contrast, in the LCD device shown in FIG. 37A, the voltage is applied across the liquid crystal layer by the transmissive electrode 88 in the transmissive region 90T through the interlayer insulating layer 100. The interlayer insulating layer 100 separates the capacitance. Even when the same level of voltage is supplied from a driving circuit (not shown) to the transmissive electrode 88 and the reflective electrode 89, the voltage applied in the transmissive region 90T is smaller than the voltage applied in the reflective region 90R. Therefore, as shown in FIG. 37B, the voltage-brightness curve in the transmission mode is shifted toward the higher voltage, i.e., closer to the voltage-brightness curve in the reflection mode. As can be appreciated from this, the voltage-brightness characteristics in the reflection mode and transmission mode can be matched to each other by adjusting the thickness, and/or the dielectric constant of the interlayer insulating layer 100.

The structure in which the thickness of the liquid crystal layer in the transmissive region and the reflective region are adjusted can also be applied to the electrode structure shown in FIG. 22.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device for displaying an image and including a plurality of pixels, the liquid crystal display device comprising:
   a first substrate, a second substrate, and a liquid crystal layer interposed between at least the first substrate and the second substrate;
   a pixel region corresponding to one of the plurality of pixels;
   wherein the pixel region includes a reflection region having light reflectivity and a transmission region having light transmissivity;
   wherein light from the reflection region and transmitted light from the transmission region are utilized in displaying the image;
   wherein the reflection region includes a reflection layer including a surface comprising concave and/or convex portions; and
   wherein the reflection region substantially surrounds the transmission region, and wherein in the pixel region a shortest distance between the transmission region and a first bus line corresponding to the pixel region is less than a shortest distance between the transmission region and a second bus line corresponding to the pixel region.

2. The liquid crystal display device of claim 1, wherein the transmission region is located in a central portion of the pixel region.

3. The liquid crystal display device of claim 1, wherein the first bus line is a source line and the second bus line is a gate line.

4. The liquid crystal display device of claim 1, wherein the transmission region is substantially rectangular in shape.

5. The liquid crystal display device of claim 1, wherein the reflection region entirely surrounds the transmission region on all sides as viewed from above.

6. The liquid crystal display device of claim 1, wherein the first and second bus lines are in electrical communication with a thin film transistor (TFT) for the pixel region, and wherein the reflection layer is in electrical communication with the thin film transistor for the pixel region.

7. The liquid crystal display device of claim 1, wherein the reflection layer is at least partially formed on an interlayer insulating film.

8. The liquid crystal display device of claim 7, wherein the interlayer insulating film has a wave-like upper surface.

9. The liquid crystal display device of claim 7, wherein the interlayer insulating film has a plurality of round protrusions on a surface thereof.

10. The liquid crystal display device of claim 7, wherein the interlayer insulating film comprises a layer comprising organic resin material.

11. The liquid crystal display device of claim 1, further comprising an insulating layer located at least partially between the reflection layer and a transmissive electrode of at least the transmission region.

12. The liquid crystal display device of claim 1, further comprising a first compensation film on a first side of the liquid crystal layer, and a second compensation film on a second side of the liquid crystal layer.

13. The liquid crystal display device of claim 12, wherein at least one of the compensation films comprises a quarter-wave plate.

14. A liquid crystal display device comprising:
a first substrate, a second substrate, and a liquid crystal layer interposed between at least the first and second substrates;
a pixel region comprising a reflection region having light reflectivity and a transmission region having light transmissivity;
wherein light from the reflection region and transmitted light from the transmission region are utilized in displaying images;
wherein the reflection region comprises a reflection layer including a surface comprising concave and/or convex portions;
a first bus line and a second bus line each in electrical communication with a transistor for the pixel region;
wherein the reflection region substantially surrounds the transmission region, and wherein a shortest distance between the transmission region and the first bus line is less than a shortest distance between the transmission region and the second bus line.

15. The liquid crystal display device of claim 14, wherein the first bus line is a source line and the second bus line is a gate line.

16. The liquid crystal display device of claim 14, wherein the transmission region is substantially rectangular in shape, and wherein the transmission region is located at least in a central area of the pixel region.

17. The liquid crystal display device of claim 14, wherein the reflection region entirely surrounds the transmission region on all sides as viewed from above.

18. The liquid crystal display device of claim 14, wherein the reflection layer is in electrical communication with the transistor through a contact hole defined in an interlayer insulator.

19. The liquid crystal display device of claim 14, wherein the reflection layer is at least partially formed on an interlayer insulating film, and wherein the interlayer insulating film comprises organic material and has a wave-like upper surface.

20. A liquid crystal display device comprising:
a first substrate, a second substrate, and a liquid crystal layer interposed between at least the first and second substrates;
a pixel region comprising a reflection region having a reflection layer and light reflectivity, and a transmission region having light transmissivity;
wherein light from the reflection region and transmitted light from the transmission region are utilized in displaying images;
a first bus line and a second bus line each in electrical communication with a transistor for the pixel region;
wherein the reflection region substantially surrounds the transmission region, and wherein a distance between the transmission region and the first bus line is less than a distance between the transmission region and the second bus line.

21. The liquid crystal display device of claim 20, wherein the first bus line is a source line and the second bus line is a gate line.

22. The liquid crystal display device of claim 20, wherein the transmission region is substantially rectangular in shape, and wherein the transmission region is located at least in a central area of the pixel region.

23. The liquid crystal display device of claim 20, wherein the reflection region entirely surrounds the transmission region on all sides as viewed from above.

24. The liquid crystal display device of claim 20, wherein the reflection layer is in electrical communication with the transistor through a contact hole defined in an interlayer insulator.

25. The liquid crystal display device of claim 20, wherein the reflection layer is at least partially formed on an interlayer insulating film, and wherein the interlayer insulating film comprises organic material and has a wave-like upper surface.

26. A liquid crystal display device comprising:
a first substrate, a second substrate, and a liquid crystal layer interposed between at least the first and second substrates;
a first bus line and a second bus line each in electrical communication with a transistor for a pixel region;
the pixel region comprising a first region and a second region, the first region having light reflectivity and including a reflection layer with a surface having concave and/or convex portions, and the second region comprising a transmissive electrode in electrical communication with the transistor, and wherein the reflection layer is provided in the first region but not in the second region;
wherein one of the first and second regions substantially surrounds the other of the first and second regions, and wherein said other of the first and second regions is located closer to the first bus line than to the second bus line.

27. The liquid crystal display device of claim 26, wherein the first bus line is a source line and the second bus line is a gate line.

28. The liquid crystal display device of claim 26, wherein the reflection layer is in electrical communication with the transistor through a contact hole defined in an interlayer insulator.

29. The liquid crystal display device of claim 26, wherein the reflection layer is at least partially formed on an interlayer insulating film, and wherein the interlayer insulating film comprises organic material and has a wave-like upper surface.

30. A method of making a liquid crystal display device for displaying an image, the method comprising:

provding a first substrate, a second substrate, and a liquid crystal layer interposed between at least the first substrate and the second substrate;

providing a pixel region that includes a reflection region having light reflectivity and a transmission region having light transmissivity;

wherein light from the reflection region and transmitted light from the transmission region are to be utilized in displaying images;

forming the reflection region so as to include a reflection layer including a surface comprising concave and/or convex portions; and forming the reflection and transmission regions so that the reflection region substantially surrounds the transmission region, and wherein in the pixel region a shortest distance between the transmission region and a first bus line corresponding to the pixel region is less than a shortest distance between the transmission region and a second bus line corresponding to the pixel region.

31. The method of claim 30, wherein the first bus line is a source line and the second bus line is a gate line.

32. The method of claim 30, wherein the transmission region is substantially rectangular in shape.

* * * * *